US012645501B2

(12) United States Patent
White et al.

(10) Patent No.: US 12,645,501 B2
(45) Date of Patent: Jun. 2, 2026

(54) SYSTEMS AND METHODS FOR EDGE RESOURCE DEMAND LOAD SCHEDULING

(71) Applicant: DELL PRODUCTS L.P., Round Rock, TX (US)

(72) Inventors: William Jeffery White, Plano, TX (US); Said Tabet, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 468 days.

(21) Appl. No.: 18/366,555

(22) Filed: Aug. 7, 2023

(65) Prior Publication Data

US 2024/0303130 A1      Sep. 12, 2024

Related U.S. Application Data

(63) Continuation-in-part of application No. 18/355,351, filed on Jul. 19, 2023.

(60) Provisional application No. 63/450,237, filed on Mar. 6, 2023.

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/505* (2013.01)

(58) Field of Classification Search
CPC .... G06F 9/4806; G06F 9/4837; G06F 9/4843; G06F 9/4882; G06F 9/505; G06F 9/5083
See application file for complete search history.

(56) References Cited

U.S. PATENT DOCUMENTS

| | | | |
|---|---|---|---|
| 8,386,495 B1 | 2/2013 | Sandler et al. | |
| 10,169,101 B2 | 1/2019 | Banerjee et al. | |
| 10,698,717 B2 | 6/2020 | Tang et al. | |
| 10,977,078 B2 * | 4/2021 | Rehman ............... | G06F 9/5038 |
| 11,171,831 B2 | 11/2021 | Patel et al. | |
| 11,228,527 B2 | 1/2022 | Bangalore Krishnamurthy | |
| 11,356,349 B2 | 6/2022 | Cui et al. | |
| 11,836,656 B2 | 12/2023 | Cai et al. | |
| 11,966,788 B2 | 4/2024 | MacDonald et al. | |
| 12,250,159 B2 | 3/2025 | Chaurasia et al. | |
| 2004/0103387 A1 | 5/2004 | Teig et al. | |
| 2023/0138568 A1 * | 5/2023 | Singh .................... | G06F 9/4881 |
| | | | 718/104 |
| 2023/0185472 A1 | 6/2023 | Higginson et al. | |

(Continued)

OTHER PUBLICATIONS

Notice of Allowance mailed Sep. 3, 2025 for U.S. Appl. No. 18/366,490, 20 pages.

(Continued)

*Primary Examiner* — Andy Ho
(74) *Attorney, Agent, or Firm* — BAUGH LAW, LLC

(57) ABSTRACT

Managing the resource demand load for edge systems is significantly more complex than for other systems, such as cloud environments. Edge resource demand load scheduling systems and methods are disclosed that can ensure that edge systems operate smoothly and efficiently while balancing multiple scheduling objectives. Scheduling techniques disclosed herein may utilize heuristic rules for candidate edge system selection (e.g., utilizing ARMA/ARIMA averages and/or service level objectives) and modified best fit decreasing (mBFD) assignment/allocation techniques.

20 Claims, 38 Drawing Sheets

<u>1400</u>

(56) References Cited

U.S. PATENT DOCUMENTS

| | | |
|---|---|---|
| 2023/0244537 A1 | 8/2023 | Wang |
| 2023/0409871 A1 | 12/2023 | Xu et al. |
| 2024/0095090 A1 | 3/2024 | Saito et al. |
| 2024/0205165 A1* | 6/2024 | Smith .................... H04L 41/16 |
| 2024/0220639 A1 | 7/2024 | Sahu et al. |
| 2024/0259879 A1 | 8/2024 | Ranganath et al. |
| 2024/0303121 A1 | 9/2024 | White et al. |
| 2024/0303124 A1 | 9/2024 | White et al. |
| 2024/0303127 A1 | 9/2024 | White et al. |
| 2024/0303128 A1 | 9/2024 | White et al. |
| 2024/0303129 A1 | 9/2024 | White et al. |
| 2024/0303130 A1 | 9/2024 | White et al. |
| 2024/0303134 A1 | 9/2024 | White et al. |
| 2024/0305535 A1 | 9/2024 | White et al. |

OTHER PUBLICATIONS

Non-Final Office Action (2676), including List of Ref. Cited by Examiner and Considered by Examiner, dated Jan. 23, 2026, in U.S. Appl. No. 18/366,507 (24 pgs).

Non-Final Office Action (2677), including List of Ref. Cited by Examiner and Considered by Examiner, dated Jan. 23, 2026, in U.S. Appl. No. 18/366,520 (23 pgs).

Non-Final Office Action (2678), including List of Ref. Cited by Examiner and Considered by Examiner, dated Jan. 23, 2026, in U.S. Appl. No. 18/366,538 (23 pgs).

Liu, M., Wan, Y., Lin, Z., Lewis, F.L., Xie, J., Jalaian, B.A. (2021). Computational Intelligence in Uncertainty Quantification for Learning Control and Differential Games In: Vamvoudakis, K.G., Wan, Y., Lewis, F.L., Cansever, D. (eds) Handbook of Reinforcement Learning and Control. Studies in Systems, Decision and Control, vol. 325. Springer Cham. https://doi.org/10.1007/978-3-030-60990-0_13 (34 pages ).

Ghorbani, Amir, Yifan Wang, Yanzhi Xue, Massoud Pedram, and Paul Bogdan. "Prediction and Control of Bursty Cloud Workloads: A Fractal Framework." University of Southern California, 2014. https://dx.doi.org/10.1145/2656075.2656095 (9 pages).

Ali-Eldin, Ahmed, et al. "The Hidden Cost of the Edge: A Performance Comparison of Edge and Cloud Latencies." Proceedings of the International Conference for High Performance Computing, Networking, Storage and Analysis (SC '21), 2021, https://doi.org/10.1145/3458817.3476142 (15 pages).

Tirmazi, Muhammad, et al. "Borg: the Next Generation." Proceedings of the Fifteenth European Conference on Computer Systems (EuroSys '20), Apr. 27-30, 2020, Heraklion, Greece ACM, New York, NY, USA, 2020, pp. 1-14. https://doi.org/10.1145/3342195.3387517 (14 pages).

Feng, Yihui, et al. "Scaling Large Production Clusters with Partitioned Synchronization." Proceedings of the 2021 USENIX Annual Technical Conference (USENIX ATC '21) Jul. 14-16, 2021. https://www.usenix.org/conference/atc21/presentation/feng-yihui. (16 pages).

Xie, Junfei, et al. "M-PCM-OFFD: An effective output statistics estimation method for systems of high dimensional uncertainties subject to low-order parameter interactions." Mathematics and Computers in Simulation, vol. 159, 2019, pp. 93-118. https://doi.org/10.1016/j.matcom.2018.10.010. (26 pages).

Wiki contributors. "Erlang distribution." Wikipedia, The Free Encyclopedia, Mar. 21, 2025, https://en.wikipedia.org/wiki/Erlang_distribution. Accessed Mar. 21, 2025. (6 pages).

Toczé, Klervie, et al. "Edge Workload Trace Gathering and Analysis for Benchmarking." Proceedings of the 2022 IEEE 6th International Conference on Fog and Edge Computing (ICFEC), 2022, pp. 34-41. https://doi.org/10.1109/ICFEC54809.2022.00012. (8 pages).

Qiu, Haoran, et al. "FIRM: An Intelligent Fine-grained Resource Management Framework for SLO-Oriented Microservices." Proceedings of the 14th USENIX Symposium on Operating Systems Design and Implementation (OSDI), 2020, pp. 805-825. https://www.usenix.org/conference/osdi20/presentation/qiu. (22 pages).

Wang et al. "The Cost of Cloud, a Trillion Dollar Paradox." Andreessen Horowitz, May 27, 2021, https://a16z.com/the-cost-of-cloud-a-trillion-dollar-paradox/ (12 pages).

Kolosov, Oleg, et al. "Benchmarking in the Dark: On the Absence of Comprehensive Edge Datasets." Proceedings of the 2nd USENIX Workshop on Hot Topics in Edge Computing (HotEdge), 2020. https://www.usenix.org/conference/hotedge20/presentation/kolosov. (11 pages).

Wiki contributors. "Jensen-Shannon divergence." Wikipedia, The Free Encyclopedia, Mar. 21, 2025, https://en.wikipedia.org/wiki/Jensen%E2%80%93Shannon_divergence. Accessed Mar. 21, 2025. (6 pages).

Salem, Osman, Farid Nait-Abdesselam, and Ahmed Mehaoua. "Anomaly Detection in Network Traffic using Jensen-Shannon Divergence." Proceedings of the IEEE International Conference on Communications (ICC), 2012, pp. 5200-5204. IEEE. https://doi.org/10.1109/ICC.2012.6364602. (6 pages).

Soos, Gabor, Daniel Ficzere, and Pal Varga. "Towards Traffic Identification and Modeling for 5G Application Use-Cases." Electronics, vol. 9, No. 4, 2020, p. 640. https://doi.org/10.3390/electronics9040640. (32 pages).

Sisworo. "On Holder Exponents." Jurnal Matematika dan Sains (JMS), vol. 4, No. 3, 1999, pp. 244-259. https://www.researchgate.net/publication/309421576_On_Holder_Exponents. (3 https://www.researchgate.net/publication/309421576_On_Holder_Exponents. (34 pages).

Response to Non-Final Office Action, filed Jan. 25, 2026, U.S. Appl. No. 18/366,507. (18 pgs).

Response to Non-Final Office Action, filed Jan. 25, 2026, U.S. Appl. No. 18/366,520. (16 pgs).

Response to Non-Final Office Action, filed Jan. 25, 2026, U.S. Appl. No. 18/366,538. (17 pgs).

Non-Final Office Action (2674), including List of Ref. Cited by Examiner and Considered by Examiner, dated Dec. 12, 2025, in U.S. Appl. No. 18/366,461 (22 pgs).

Response to Non-Final Office Action, filed Dec. 14, 2025, U.S. Appl. No. 18/366,461. (15 pgs).

Non-Final Office Action (2673), including List of Ref. Cited by Examiner and Considered by Examiner, dated Jan. 28, 2026, in U.S. Appl. No. 18/355,351 (47 pgs).

Notice of Allowance (2nd) mailed Feb. 13, 2025 for U.S. Appl. No. 18/366,490, 10 pages.

Notice of Allowance (2nd) mailed Feb. 25, 2026 for U.S. Appl. No. 18/366,461, 7 pages.

Notice of Allowance (2nd) mailed Feb. 25, 2026 for U.S. Appl. No. 18/366,549, 13 pages.

Notice of Allowance mailed Feb. 13, 2026 for U.S. Appl. No. 18/366,549, 32 pages.

Notice of Allowance mailed Feb. 3, 2026 for U.S. Appl. No. 18/366,461, 7 pages.

Response to Non-Final Office Action, filed Feb. 22, 2026, U.S. Appl. No. 18/355,351. (20 pgs).

Notice of Allowance, including References Considered by Examiner, mailed Mar. 13, 2026 for U.S. Appl. No. 18/366,507, 15 pages.

Notice of Allowance, including References Considered by Examiner, mailed Mar. 13, 2026 for U.S. Appl. No. 18/366,520, 20 pages.

Notice of Allowance, including References Considered by Examiner, mailed Mar. 13, 2026 for U.S. Appl. No. 18/366,538, 20 pages.

Supplemental Notice of Allowance (3rd) mailed Mar. 10, 2026 for U.S. Appl. No. 18/366,461, 2 pages.

* cited by examiner

<u>400</u>

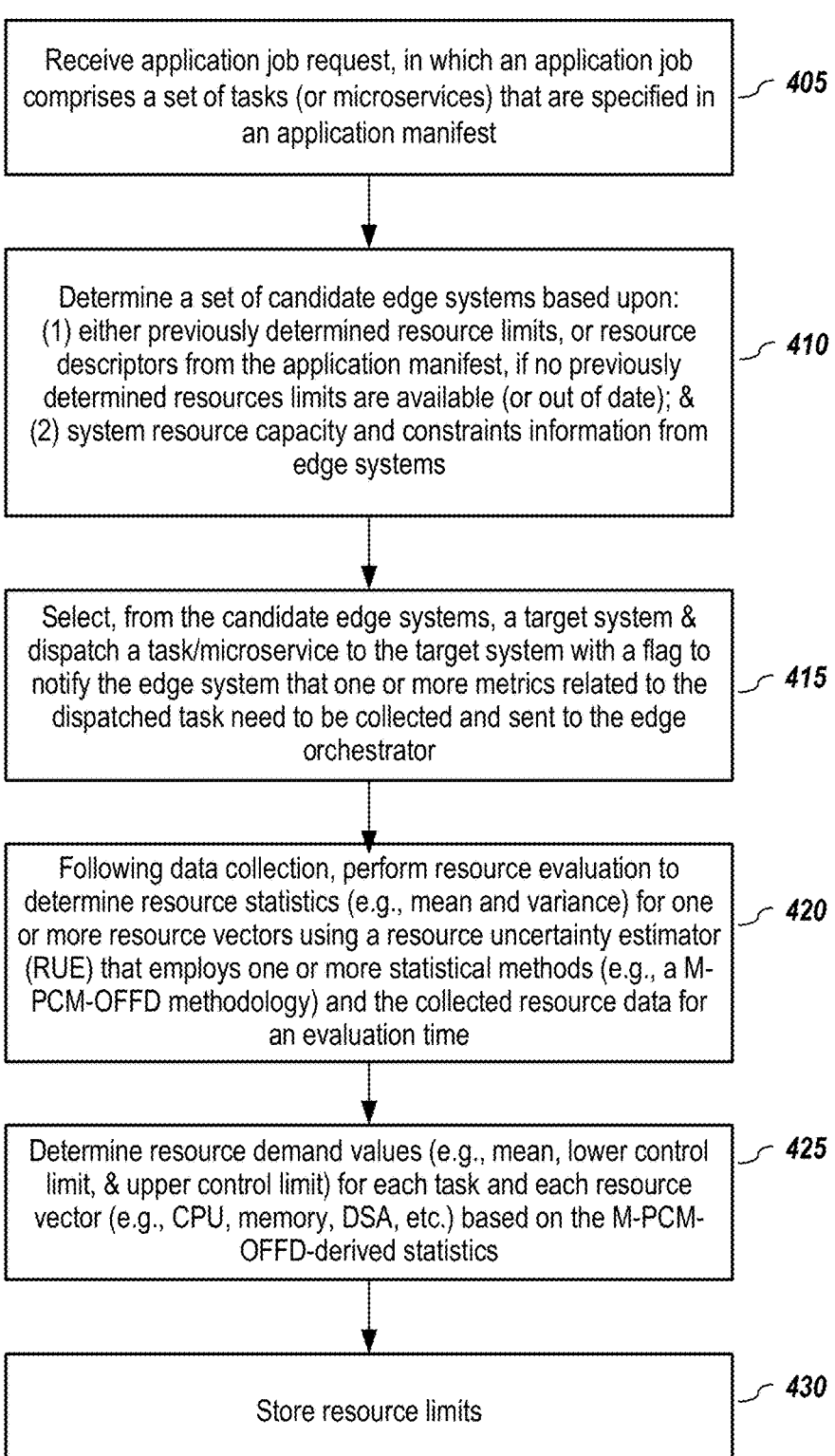

Receive application job request, in which an application job comprises a set of tasks (or microservices) that are specified in an application manifest ⟋ 405

Determine a set of candidate edge systems based upon: (1) either previously determined resource limits, or resource descriptors from the application manifest, if no previously determined resources limits are available (or out of date); & (2) system resource capacity and constraints information from edge systems ⟋ 410

Select, from the candidate edge systems, a target system & dispatch a task/microservice to the target system with a flag to notify the edge system that one or more metrics related to the dispatched task need to be collected and sent to the edge orchestrator ⟋ 415

Following data collection, perform resource evaluation to determine resource statistics (e.g., mean and variance) for one or more resource vectors using a resource uncertainty estimator (RUE) that employs one or more statistical methods (e.g., a M-PCM-OFFD methodology) and the collected resource data for an evaluation time ⟋ 420

Determine resource demand values (e.g., mean, lower control limit, & upper control limit) for each task and each resource vector (e.g., CPU, memory, DSA, etc.) based on the M-PCM-OFFD-derived statistics ⟋ 425

Store resource limits ⟋ 430

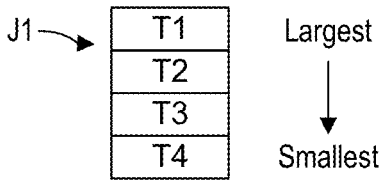
J1 → T1 / T2 / T3 / T4    Largest → Smallest
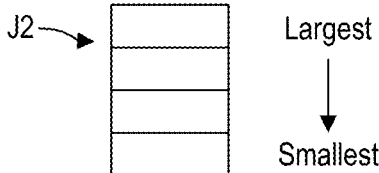
J2 →    Largest → Smallest
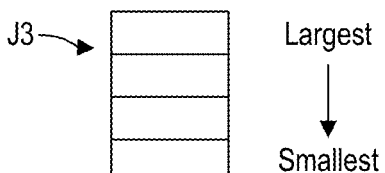
J3 →    Largest → Smallest
FIG. 12C

1300

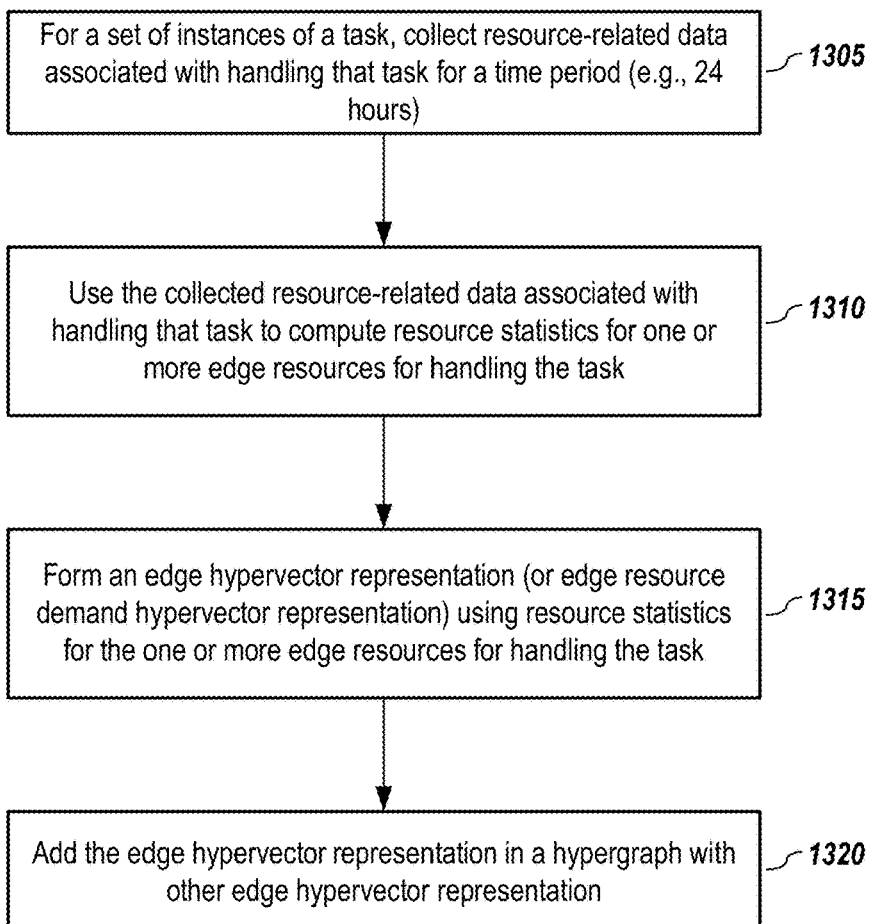

For a set of instances of a task, collect resource-related data associated with handling that task for a time period (e.g., 24 hours) ⟋ 1305

Use the collected resource-related data associated with handling that task to compute resource statistics for one or more edge resources for handling the task ⟋ 1310

Form an edge hypervector representation (or edge resource demand hypervector representation) using resource statistics for the one or more edge resources for handling the task ⟋ 1315

Add the edge hypervector representation in a hypergraph with other edge hypervector representation ⟋ 1320

FIG. 13

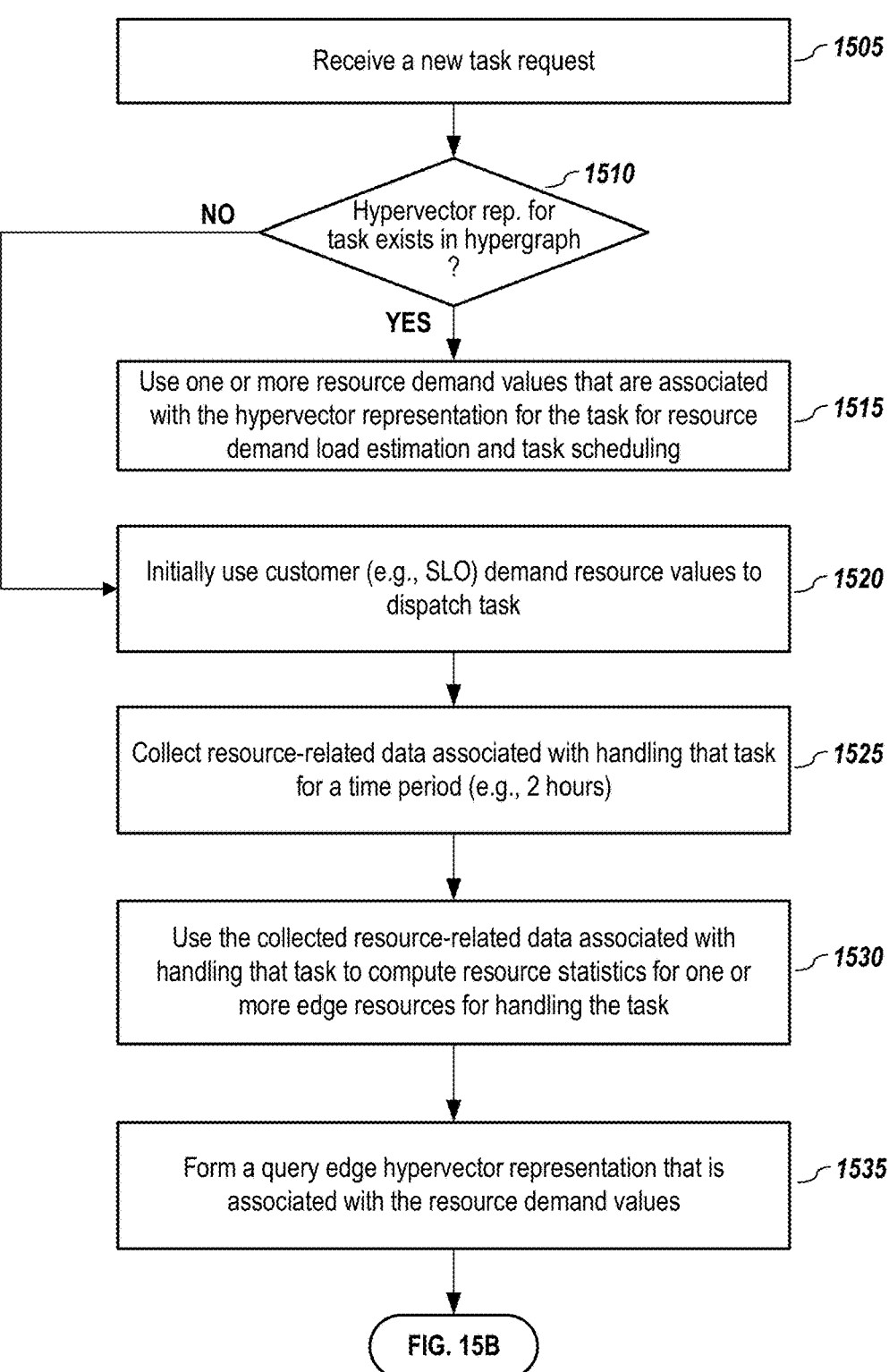

_1500A_

Receive a new task request — 1505

Hypervector rep. for task exists in hypergraph ? — 1510

NO

YES

Use one or more resource demand values that are associated with the hypervector representation for the task for resource demand load estimation and task scheduling — 1515

Initially use customer (e.g., SLO) demand resource values to dispatch task — 1520

Collect resource-related data associated with handling that task for a time period (e.g., 2 hours) — 1525

Use the collected resource-related data associated with handling that task to compute resource statistics for one or more edge resources for handling the task — 1530

Form a query edge hypervector representation that is associated with the resource demand values — 1535

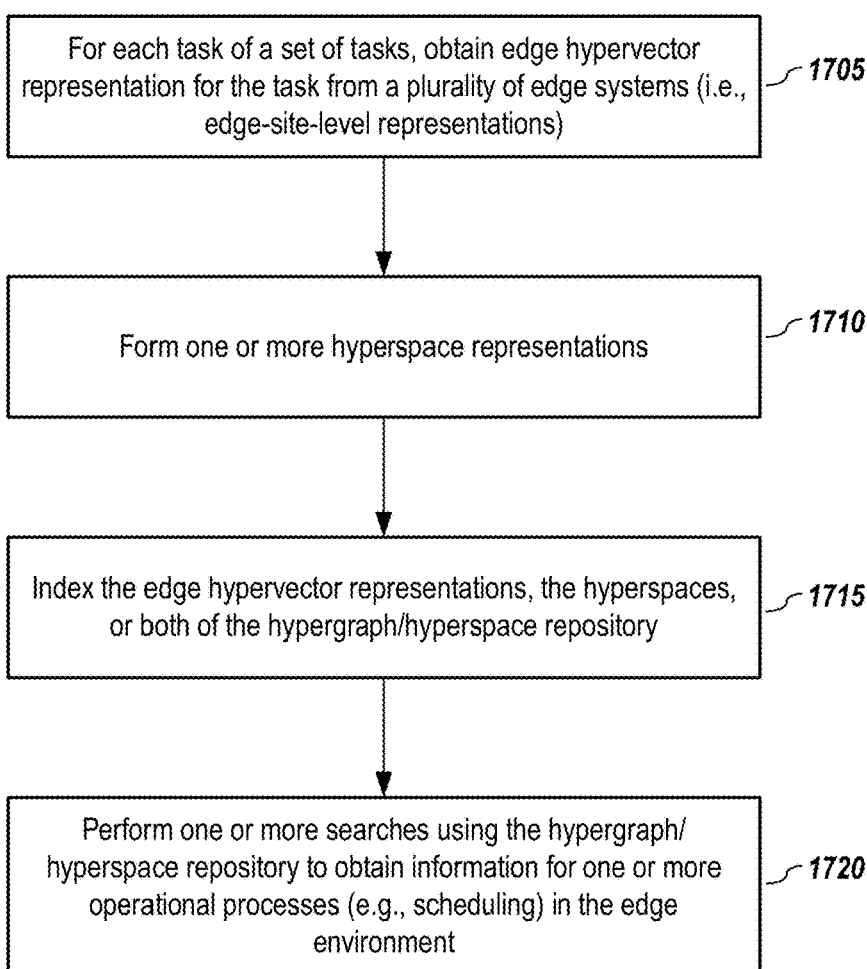

For each task of a set of tasks, obtain edge hypervector representation for the task from a plurality of edge systems (i.e., edge-site-level representations) ⟋ 1705

Form one or more hyperspace representations ⟋ 1710

Index the edge hypervector representations, the hyperspaces, or both of the hypergraph/hyperspace repository ⟋ 1715

Perform one or more searches using the hypergraph/ hyperspace repository to obtain information for one or more operational processes (e.g., scheduling) in the edge environment ⟋ 1720

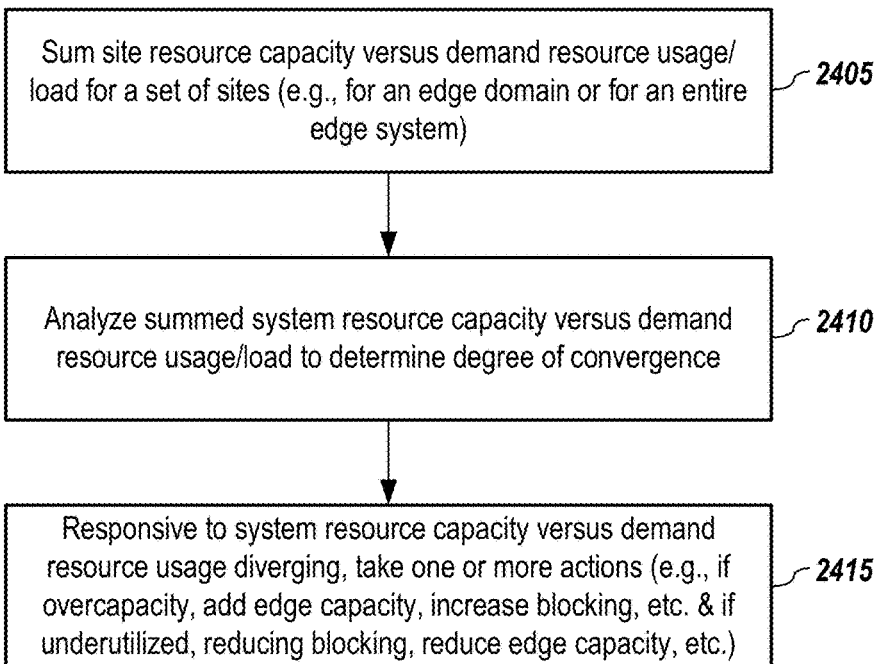

Sum site resource capacity versus demand resource usage/ load for a set of sites (e.g., for an edge domain or for an entire edge system)    2405

Analyze summed system resource capacity versus demand resource usage/load to determine degree of convergence    2410

Responsive to system resource capacity versus demand resource usage diverging, take one or more actions (e.g., if overcapacity, add edge capacity, increase blocking, etc. & if underutilized, reducing blocking, reduce edge capacity, etc.)    2415

Using linear regression trend analysis to gauge trend(s) in demand resource load versus system capacity (i.e., at a resource level, site level, regional level, etc.) to predict capacity exhaustion and required new capacity placement _⌐ 2505

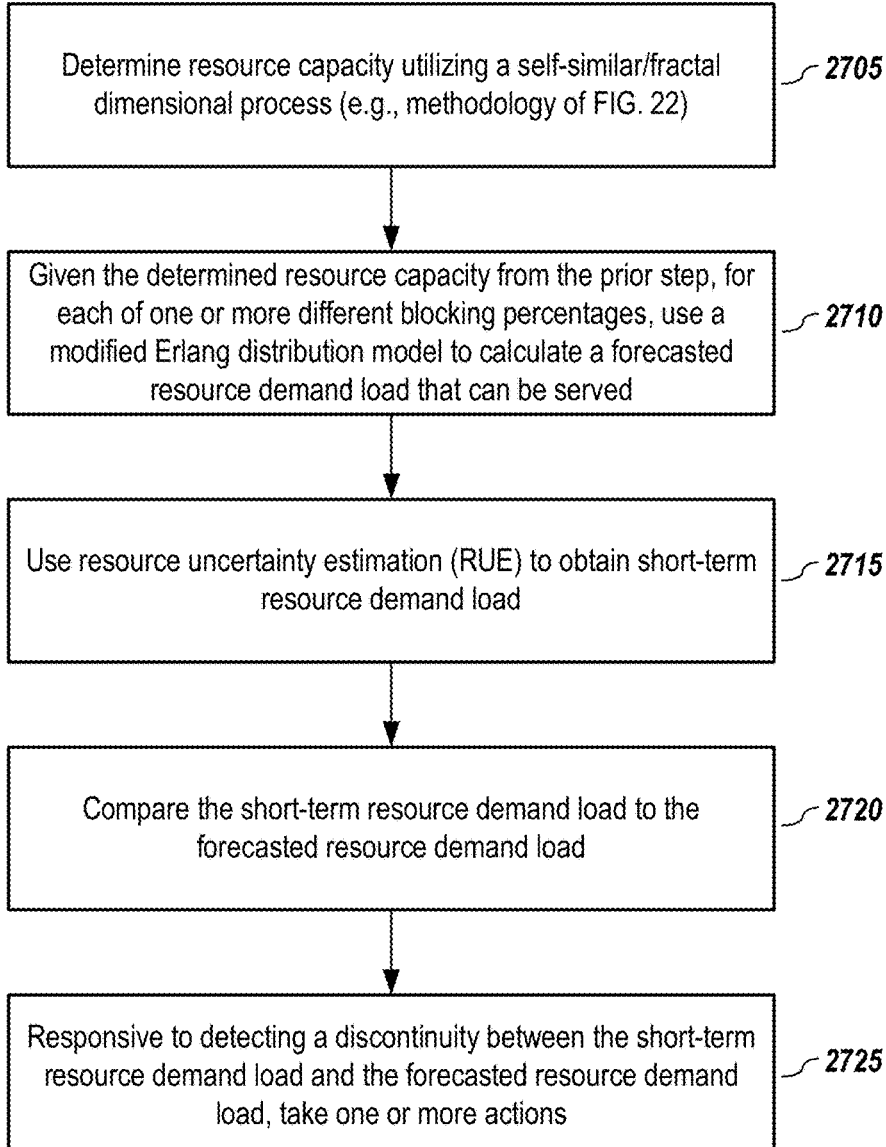

Determine resource capacity utilizing a self-similar/fractal dimensional process (e.g., methodology of FIG. 22) — 2705

Given the determined resource capacity from the prior step, for each of one or more different blocking percentages, use a modified Erlang distribution model to calculate a forecasted resource demand load that can be served — 2710

Use resource uncertainty estimation (RUE) to obtain short-term resource demand load — 2715

Compare the short-term resource demand load to the forecasted resource demand load — 2720

Responsive to detecting a discontinuity between the short-term resource demand load and the forecasted resource demand load, take one or more actions — 2725

SYSTEMS AND METHODS FOR EDGE RESOURCE DEMAND LOAD SCHEDULING

CROSS-REFERENCE TO RELATED APPLICATIONS

This patent application is related to and claims priority benefit under 35 USC § 119(e) to commonly-owned U.S. Pat. App. No. 63/450,237, filed on 6 Mar. 2023, entitled "EDGE RESOURCE UTILIZATION," and listing William Jeffery White and Said Tabet as inventors, which patent document is incorporated by reference herein in its entirety and for all purposes.

This patent application is a continuation-in-part of and claims priority benefit under 35 USC § 120 to commonly-owned U.S. patent application Ser. No. 18/355,351, filed on 19 Jul. 2023, entitled "EDGE DOMAIN-SPECIFIC ACCELERATOR VIRTUALIZATION AND SCHEDULING," and listing William Jeffery White and Said Tabet as inventors, which patent document is incorporated by reference herein in its entirety and for all purposes.

This patent application is also related to the following commonly-owned patent documents:

U.S. patent application Ser. No. 18/366,461, filed on 7 Aug. 2023, entitled "SYSTEMS AND METHODS FOR EDGE SYSTEM RESOURCE CAPACITY PERFORMANCE PREDICTION," and listing William Jeffery White and Said Tabet as inventors, which patent document is incorporated by reference herein in its entirety and for all purposes;

U.S. patent application Ser. No. 18/366,490, filed on 7 Aug. 2023, entitled "SYSTEMS AND METHODS FOR EDGE SYSTEM RESOURCE CAPACITY DYNAMIC POLICY PLANNING FRAMEWORK," and listing William Jeffery White and Said Tabet as inventors, which patent document is incorporated by reference herein in its entirety and for all purposes;

U.S. patent application Ser. No. 18/366,507, filed on 7 Aug. 2023, entitled "SYSTEMS AND METHODS FOR HYPERGRAPH EDGE RESOURCE DEMAND LOAD REPRESENTATION," and listing William Jeffery White and Said Tabet as inventors, which patent document is incorporated by reference herein in its entirety and for all purposes;

U.S. patent application Ser. No. 18/366,520, filed on 7 Aug. 2023, entitled "SYSTEMS AND METHODS FOR HYPERGRAPH EDGE RESOURCE DEMAND KNOWLEDGE MANAGEMENT," and listing William Jeffery White and Said Tabet as inventors, which patent document is incorporated by reference herein in its entirety and for all purposes;

U.S. patent application Ser. No. 18/366,538, filed on 7 Aug. 2023, entitled "SYSTEMS AND METHODS FOR CONTINUED EDGE RESOURCE DEMAND LOAD ESTIMATION," and listing William Jeffery White and Said Tabet as inventors, which patent document is incorporated by reference herein in its entirety and for all purposes; and U.S. patent application Ser. No. 18/366,549, filed on 7 Aug. 2023, entitled "SYSTEMS AND METHODS FOR EDGE RESOURCE DEMAND LOAD ESTIMATION," and listing William Jeffery White and Said Tabet as inventors, which patent document is incorporated by reference herein in its entirety and for all purposes.

BACKGROUND

A. Technical Field

The present disclosure relates generally to information handling systems. More particularly, the present disclosure relates to edge platforms.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multi-cloud edge platforms are large-scale distributed systems that enable organizations to manage and optimize their computing resources across multiple cloud environments and edge devices. Typically, these platforms strive to provide a unified framework for orchestrating, managing, and securing applications and infrastructure in a multi-cloud edge computing environment.

FIG. 1 graphically illustrates the relationships or hierarchy between different networking systems. As illustrated, functional edge systems 110 are closest in proximity to data sources and devices 105. Due to its proximity, functional edges 110 have the shortest latency (e.g., approximately $<2 \times 10^0$ milliseconds (ms)) but also comprise a vast number of sites, maybe 10's of millions of distinct sites. Each site services a relatively small geographic area—something in the order of ~10 square meters ($m^2$). Use cases for functional edges include but are not limited to autonomous driving, robotic control, metaverse, artificial intelligence/machine learning (AI/ML) inference, and data processing for real-time insights.

Moving away from the data source or end devices, far edges 115 are typically next in order. Far edges 115 experience slightly larger latencies (e.g., approximately $5 \times 10^0$ ms) than the functional edge 110, and they have fewer number of sites (e.g., in the millions). Far edges cover services area in the range of approximately 10's of square kilometers ($km^2$). Use cases for far edges include but are not limited to retail loss prevention, manufacturing quality, and smart grid protection.

Following the far edges 115 are typically near edges 120. Near edges 120 generally have latencies in the range of $2 \times 10^1$ ms and far fewer sites (e.g., tens of thousands of sites). Near edges have much larger services area—approximately $10^{2-3}$ $km^2$. Near edge uses include but are not limited inventory management, smart building automation, and physical security.

After the near edges is the core 125. The core networks 125 have latencies of approximately $5 \times 10^1$ ms and with sites numbering in the thousands. Core networks cover expansive service areas of approximately $10^4$ $km^2$. Core networks are typically used for AI model training, trend analysis, and data archiving.

Finally, there are cloud systems or networks 130. The cloud networks 130 have latencies of approximately $>10^2$ ms and have the fewest number of sites, typically in the range of a few hundred. Cloud networks cover expansive service areas of approximately $10^4$ $km^2$. Cloud networks are used for such operations as software development, search, e-commerce, web services, information technology (IT) services, AI training, data archiving, and data curation.

While multi-cloud edge platforms provide several features and benefits, edge systems are not without problems. Note that the applications closer to the data source (i.e., at the functional edge) deal with machine-to-machine workloads. As one moves further away from the functional edge systems, the applications become more and more human-to-machine workloads. Managing machine-to-machine workloads is more complex than human-to-machine workloads.

Another significant challenge for edge systems is operating many geographically distributed edge sites—each of which may have limited resources, particularly in comparison to cloud systems. Also challenging for edge systems is the nature of work. As noted above, edge systems tend to deal with machine-to-machine workloads, as opposed to user-to-machine workloads that cloud systems tend to handle. That is, edge systems primarily interface with machines, such as cameras, Internet-of-Things (IoT) devices, etc. Machine-to-machine workloads exhibit significantly more random behavior relative to workload demands involving end users. Limited resources at edge sites combined with the randomness of edge workload demands make handling resource demands for an edge site or sites extremely difficult.

Edge systems also experience challenges associated with application resource demand load scheduling. Various factors contribute to difficulty in application resource demand load scheduling for many edge systems. For instance, edge systems often lack access to resource usage state in near real time and often have smaller resource pools, which can hamper efficiency and can increase resource consumption spikes. As another example, edge systems experiencing high utilization can cause application queuing delay and/or application execution delay, which can limit the ability of edge systems to satisfy latency requirements. Furthermore, as noted above, edge systems typically manage machine-to-machine workloads, which can have higher uncertainty in resource utilization compared to human-to-machine workloads. Still further, edge systems often have statistically challenging inter-arrival patterns, which can exacerbate inefficiency, resource consumption spikes, queuing and/or execution delay, uncertainty, etc.

Accordingly, it is highly desirable to find new and better ways to handle the operations, management, and/or planning for edge systems.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts a methodology for estimating edge resource demand load, according to embodiments of the present disclosure.

FIG. 12A through FIG. 12H depict various aspects of orchestrating edge resource demand load scheduling, according to embodiments of the present disclosure.

FIG. 13 depicts a methodology for generating an edge hypervector representation for a hypergraph, according to embodiments of the present disclosure.

FIGS. 15A & 15B depict a methodology for generating an edge hypervector representation for a hypergraph, according to embodiments of the present disclosure.

FIG. 17 depicts a methodology for generating hypervectors/hyperspace representations that may be used in edge operations, according to embodiments of the present disclosure.

FIG. 24 depicts a methodology for analyzing system resource capacity versus demand resource usage/load for planning purposes, according to embodiments of the present disclosure.

FIG. 25 depicts a methodology for trend analysis to predict capacity exhaustion, according to embodiments of the present disclosure.

FIG. 27 depicts a methodology for proactively predicting edge resource capacity performance, according to embodiments of the present disclosure.

DETAILED DESCRIPTION OF EMBODIMENTS

Figure 1:
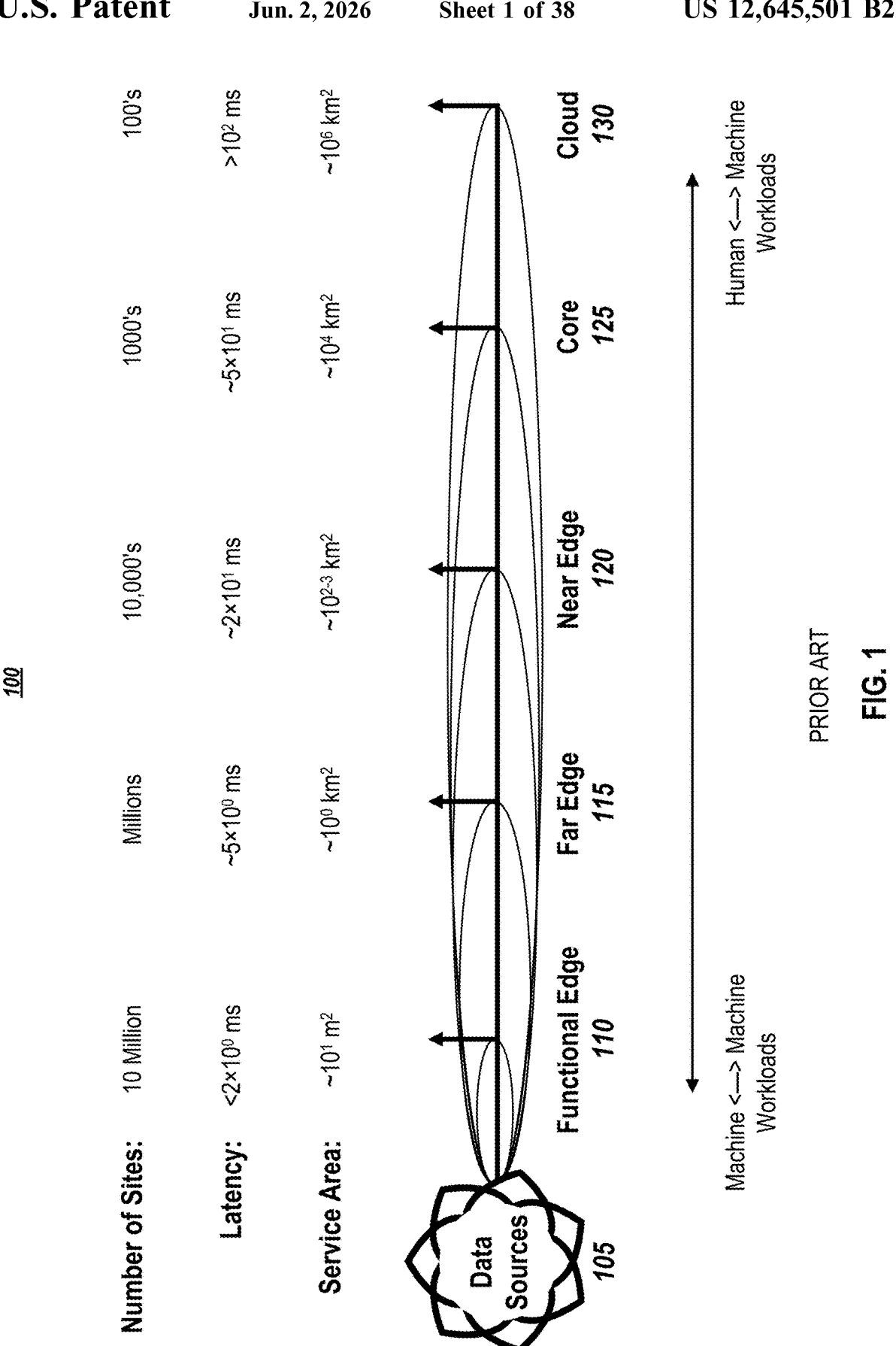
FIG. 1 depicts typical networking topology and taxonomy from functional edge systems through cloud infrastructures.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall also be noted that although embodiments described herein may be within the context of edge systems, aspects of the present disclosure are not so limited. Accordingly, the aspects of the present disclosure may be applied or adapted for use in other contexts.

A. General Overview

Multi-cloud edge platforms are large-scale distributed systems that enable organizations to manage and optimize their computing resources across multiple cloud environments and edge devices. Typically, these platforms strive to provide a unified framework for orchestrating, managing, and securing applications and infrastructure in a multi-cloud edge computing environment.

One of the primary functions of an edge orchestrator is to ensure efficient resource allocation and utilization within an edge environment. An edge orchestrator coordinates the deployment of applications and services to the most appropriate edge devices based on factors like proximity, available resources, network conditions, and performance requirements. By distributing workloads intelligently, the edge orchestrator aims to minimize latency, improve responsiveness, and optimize the overall performance of edge applications.

While multi-cloud edge platforms provide several features and benefits, edge systems and the edge orchestrator, in particular, have some non-trivial issues. Part of the challenge is a size issue—the sheer number of edge systems and their vast geographic distribution make orchestration daunting. To further add to the complexity, each edge site may have its own unique set of limited resources.

As noted previously, another challenge for edge systems and edge orchestration is the nature of work. Because edge systems tend to deal with machine-to-machine workloads—as opposed to human-to-machine workloads—edge systems are prone to experience significantly more random workload behaviors relative to workload demands involving humans as end users. Limited resources at an edge site combined with the randomness of workload demands make handling resource demands for an edge site or sites extremely difficult.

However, scheduling or resource allocation remains a critical function of an orchestration system. An application may be considered as a set of tasks, services, or microservices. Scheduling assigns applications (or some set of one or more tasks, services, or microservices associated with an application) to infrastructure systems. The scheduler may use several factors, such as constraints, user-provided directives, and/or application type to assign the applications to infrastructure. Scheduling methods may also consider current resource demand load usage and user provided estimates of resource demand load. This process functions well in clouds, IT, and core datacenters but tends to be inadequate for edge sites, where resources may not be reallocated to address load imbalances.

Another issue with resource allocation for edge systems is that edges do not normally have access to the resource usage state in real time or near real time. Generally, edge workloads are operating on a shared platform largely being moved from customized hardware. Users and edge orchestrators typically do not have good estimates on the resource demand usage of these workloads. Also, edges have smaller resource pools, which tend to result in less efficient operation with higher utilization spikes of resource consumption. Edges with high utilization will experience excessive application queuing delay and/or application execution delay, which limit the edge site's ability to execute assigned tasks within a required latency. Thus, an edge site can easily become mired, and an edge orchestrator may not be aware of this condition due to delayed or inaccurate usage data or estimates. The edge orchestrator may assign an already overcapacity edge site more tasks because it does not have accurate information about the true workload for the edge site; thereby exacerbating the problem.

Accordingly, to improve orchestration in an edge platform environment, depicted herein are embodiments of an elegant system resource capacity allocation framework plus highly accurate methodologies for predicting resource demand load. Embodiments comprise predictive resource demand load capability approaches, which may operate as part of an edge platform monitoring capability, that provide accurate estimates of resource demand consumption/usage to help facilitate accurate scheduling.

B. Edge Resource Demand Load Estimation Embodiments

In one or more embodiments, resource demand load may be thought of as the individual task/service resource (e.g., processing, memory, storage, network resources, domain specific accelerator (DSA), etc.) consumption of an application constituent service. It is a well-documented issue that microservices have numerous dependencies and can have a wide variance of performance as a result. This issue can be aggravated in edge environments by the limited resource pool and the coordinate nature of machine serving workloads. Edge orchestrators manage a vast number of devices. For example, edge orchestrators may manage 10,000-12,000 edge system endpoints (e.g., servers, networking devices, security appliances, firewalls, etc.) and may also extend to providing partial management for additional devices (e.g., Internet of Things (IoT) devices, etc.), which increases the overall number greatly. This situation creates a bifurcated need for edge orchestrators. They may make short-term decisions on the assignment of tasks/microservices to endpoints (usually within seconds) based on resource demand load estimates and also forecast long-term system resource capacity to predict exhaustion. Embodiments herein focus primarily on the short-term challenge of providing the orchestrator an accurate estimate of resource demand load for scheduling selection of edge endpoints.

One important requirement of an edge implementation is that it should provide a stable execution environment for applications. Edges may use a deployment pattern of elastic resource execution. Edges may deploy a minimum guaranteed resource level and maximum not-to-exceed resource level. The average of these levels may be used to provide an average level of execution. Accordingly, if an edge platform meets the output statistical characterization (e.g., a first moment (e.g., mean) and a second moment (e.g., variance)), it should provide stable operation within service level objectives (SLO). In one or more embodiments, the SLO, which may be user-defined as part of the application, may include such objectives are latency limits, performance limits, etc. SLOs are typically set per application (i.e., the same SLOs are set for the same application); however, SLOs may vary even for the same application.

As stated above, an application's microservices/tasks are problematic to estimate. Applications may be moving from operating on dedicated, bespoke infrastructure to executing in a shared edge environment. Also, the microservice/task nature of applications means that the execution of an application is non-uniform—severe spikes and valleys in resource demand can occur during the overall execution of an application depending upon the specific microservices/ tasking executed. In addition, there is an explosion of new edge applications. Furthermore, third-party estimates are typically unreliable—customer/developer estimates are notoriously inaccurate in any environment due to the focus on functional outcome performance and error-free operation/security. Lastly, edge presents a new and, in some ways, rigorous environment for application microservice operation. These estimates and planning problems are solved in other contexts, such as cloud environments, by overprovisioning resources by some threshold amount (e.g., approximately 20%) of a peak amount. This overprovisioning strategy, also known as resource slack or resource margin, may be permissible in cloud environments where there are fewer overall number of sites, easier ability to build in excess capacity, and better predictive values. However, this overprovisioning strategy may not be a viable strategy, physically, financially, and/or otherwise, in edge environments. Thus, user-provided demand load usage requirements cannot, in practice, be relied upon.

With that said, for edges to provide good service, the resource demand load should be estimated and estimated with some degree of accuracy. Current methods typically utilize regression analysis of machine learning (ML) neural network methods. However, the data for demand load for edges systems is multi-dimensional of a high degree. Regression analysis may not be tenable due to the lack of indicative data that would provide an accurate prediction of statistical outcomes. Also, edge workloads have highly variant performance making the data non-linear, which when combined with the high dimensionality of the data, makes analysis of it complex, time consuming, and less likely to converge to an optimal solution. In addition, the high dimensionality makes the state space immense; accurate predictive analysis requires complex models and large datasets (both training and validation datasets) for any such ML/NN models to converge—even if modern techniques such as autoencoders (e.g., Variational Autoencoder (VAE)/ Mask, etc.).

To address these issues, embodiments of a scheduling process and embodiments of a statistical technique—specifically, M-PCM-OFFD (Multivariate Probabilistic Collocation Method-Orthogonal Fractional Factorial Design) (which is described in J. F. Xie, Y. Wan, K. Mills, J. J. Filliben, Y Lei and Z. L. Lin, "M-PCM-OFFD: An effective output statistics estimation method for systems of high dimensional uncertainties subject to low-order parameter interactions," *Math. Comput. Simul.*, vol. 159, no. 1, pp. 93-118, May 2019, which is incorporated by reference herein in its entirety (hereinafter, the "M-PCM-OFFD document"); and Liu, M., Wan, Y., Lin, Z., Lewis, F. L., Xie, J., Jalaian, B. A. (2021), "Computational Intelligence in Uncertainty Quantification for Learning Control and Differential Games," in: Vamvoudakis, K. G., Wan, Y., Lewis, F. L., Cansever, D. (eds) Handbook of Reinforcement Learning and Control. Studies in Systems, Decision and Control, vol. 325. Springer, Cham (https://doi.org/10.1007/978-3-030-60990-0_13), which is incorporated by reference herein in its entirety—may be leveraged to derive a demand load resource requirement. M-PCM-OFFD is a framework that integrates Multivariate Probabilistic Collocation Method (M-PCM) and Orthogonal Fractional Factorial Design (OFFD) to achieve an effective and scalable output statistics estimation for systems with multiple uncertain inputs of known distribution. While Monte Carlo simulations may be able to produce accurate characterization, Monte Carlo methods require a significant number of simulations and/or input data to converge. In contrast, M-PCM-OFFD is a statistical framework that accelerates the estimate of the demand load usage statistical moments (e.g., mean and variance). The use of one or more implementations of M-PCM/OFFD in embodiments herein may be generally referred to as a resource uncertainty estimation (RUE) process or processes.

Figure 2:
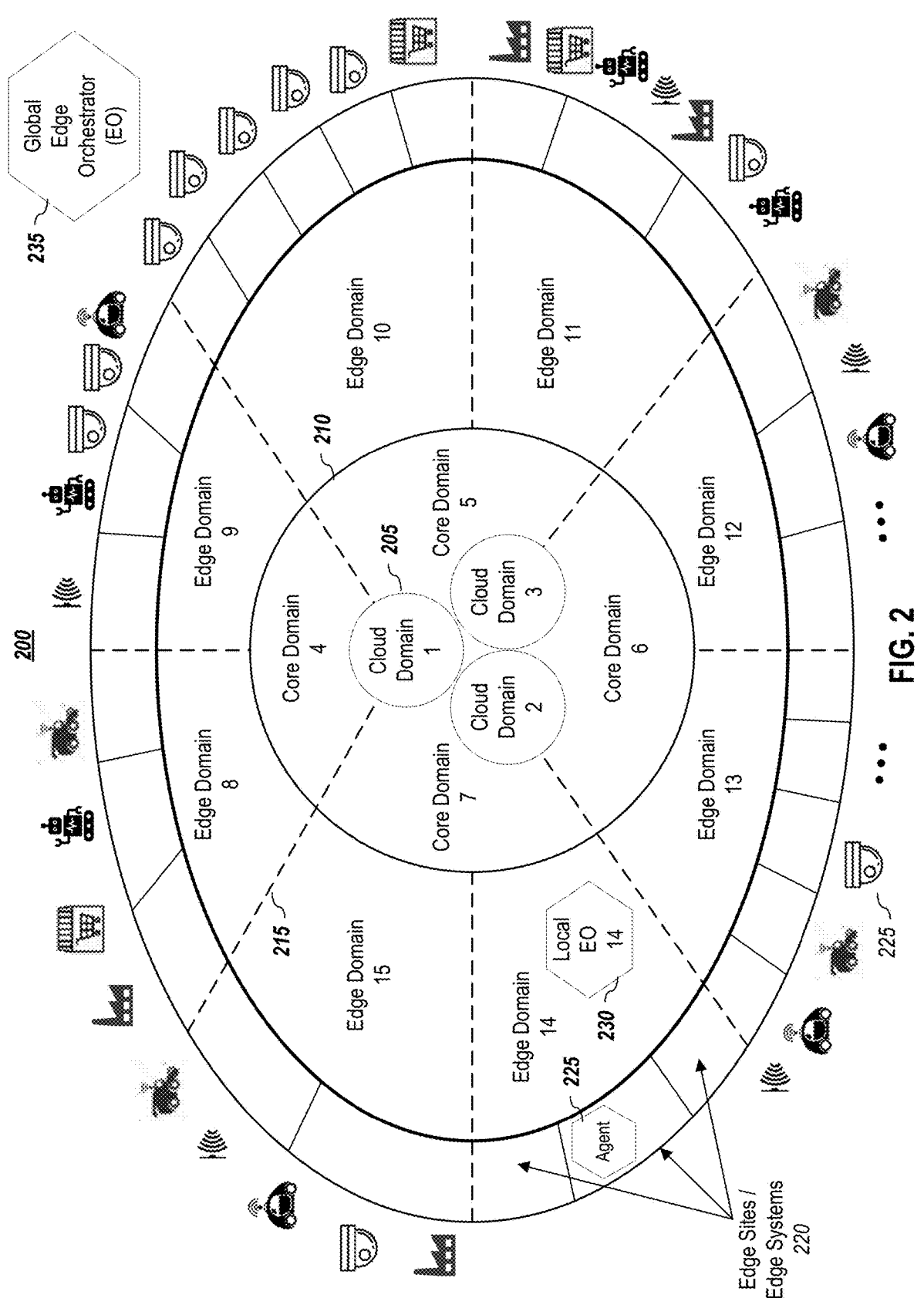
FIG. 2 depicts an example edge platform domain architecture topology, according to embodiments of the present disclosure.

FIG. 2 depicts an example edge platform domain architecture topology, according to embodiments of the present disclosure. As depicted in the example topology 200 of FIG. 2, at the center are multi-cloud domains (e.g., cloud domain 205). In one or more embodiments, the cloud domain may include or operate with an edge orchestrator, which may be multi-cloud and may be used to provision applications and software-defined infrastructure to a cloud.

Expanding outward from the cloud domains are one or more core domains (e.g., core domain 210), which may be centralized data centers. In one or more embodiments, the core domains may also include or operate with an edge orchestrator that may provision applications into core domains.

As illustrated in FIG. 2, a core domain may be associated with or may support one or more edge domains (e.g., edge domain 215). An edge domain may be considered as a collection of geographically dispersed sites that may be logically grouped under the control of an edge orchestrator. At the periphery of the topology are a number of edge sites (e.g., edge sites 220), which may service a large number of end devices (e.g., camera 225).

In one or more embodiments, an edge orchestrator, which ensures efficient resource allocation and utilization within an edge environment by coordinating deployment of applications and services, may reside in one or more of any of the domains or edge site(s). In the embodiment depicted in FIG. 2, aspects of the edge orchestrator functionality may be divided across the overall network 200. That is, the edge orchestrator may be a federated system with functionality divided or assigned to different regions of the network. In the embodiment of FIG. 2, a local edge orchestrator 230 resides in an edge domain (edge domain 14) and is responsible for or interacts with a corresponding set of edge systems 220. In one or more embodiments, each edge system may include an agent 225 that interfaces with the local edge orchestrator 230—although the agent 220 may interact with one or more other entities, such as other agents, other local edge orchestrators, and/or a global edge orchestrator 235. In one or more embodiments, the agent may also alert one or more edge orchestrators if its resources change (e.g., installation of additional and/or upgraded hardware, hardware failures, software changes, etc.).

Figure 3:
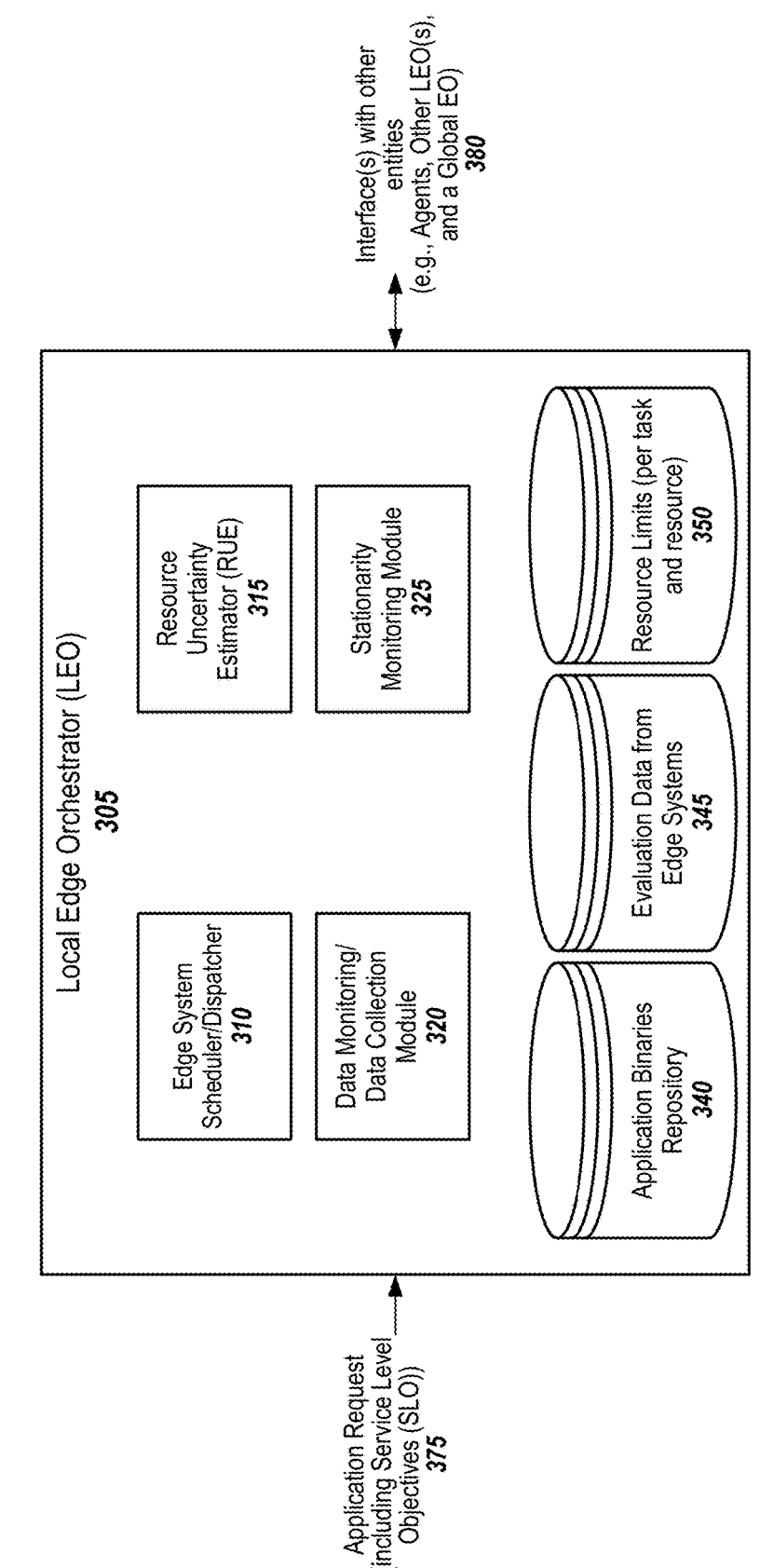
FIG. 3 depicts an example local edge orchestrator, according to embodiments of the present disclosure.

FIG. 3 depicts an example local edge orchestrator, according to embodiments of the present disclosure. In one or more embodiments, a local edge orchestrator comprises several functional components, including an edge system scheduler/ dispatcher 310, a data monitoring/data collection module 320, a resource uncertainty estimator (RUE) 315, and a stationarity monitoring module 325, and several databases or datastores of information, including an application binaries repository 340, a datastore of valuation data from edge systems 345, and a datastore of resource limits 350. It shall be noted that the local edge orchestrator 305 may comprise additional or fewer functional components and may comprise fewer or additional datastores. Also depicted in the embodiment of FIG. 3, the edge orchestrator 305 comprises one or more interfaces for communicating with one or more additional entities. For example, the local edge orchestrator 305 may communicate with one or more agents operating at edge systems, with one or more peer local edge orchestrators, and/or with a global edge orchestrator.

In one or more embodiments data monitoring/data collection module 320 directly and/or indirectly gathers data related to the fulfillment of application requests, including information about edge systems and their operations/performance and may include collecting data about its own operations and performance. Examples of information that may be collected/monitored include, but is not limited to, resources available at each edge system including CPUs specifications, memory specifications, storage specifications, domain specific accelerators (DSAs) specifications, software versions, firmware versions, load capacities, performance metrics, network interface specifications, etc. The collected/monitored information may be stored in one or more datastores at the local edge orchestrator (e.g., evaluation datastore 345) and/or elsewhere within the network.

In one or more embodiments, the edge system scheduler/dispatcher 310 may receive one or more application requests 375 and assigns the received application requests to edge systems. The edge system scheduler/dispatcher 310 may use one or more scheduling methods (e.g., bin packing methods, best fit decreasing method, etc.) and information about the application request, the edge systems, and their loadings to dispatch the application request to an edge system for fulfillment. Depending upon the embodiment (as explained in more detail below), the local edge orchestrator 305 may use data obtained by the data module 320 and information from an application request (e.g., information in the service level objectives (SLO)) or input from the resource uncertainty estimator (RUE) 315 to assign the task to an appropriate edge system.

In one or more embodiments, the local edge orchestrator 305 comprises a resource uncertainty estimator (RUE) 315 that uses collected/monitored information and one or more statistical methods to aid in resource scheduling/dispatching. In one or more embodiments, an implementation or implementations of M-PCM-OFFD may be used. Values obtained via the RUE may be stored in the resource limits datastore 350 for future use.

FIG. 4 depicts a methodology for estimating edge resource demand load, according to embodiments of the present disclosure. An application job request is received (405) by an edge orchestrator (e.g., a local edge orchestrator). An application job may comprise a set of tasks (or microservices) and service level objections (SLO), which may be specified in an application manifest. The application manifest may be part of the application job request that is received by the edge orchestrator or may be sent out-of-band. While the type, amount, and arrangement of information is a matter of implementation choice, in one or more embodiments, a manifest may comprise three main categories: (1) application manifest information; (2) data descriptors information; and (3) workload resource descriptor information.

In one or more embodiments, the application manifest information may comprise the following:

(1) Business-Level Attributes (Application Level):

Request Identification: (e.g., /Request ID/end-user Application Service Layer (ASL) identification)

Runtime Execution Identification: (e.g., /Cluster ID of previous deployed cluster/)

Order Directive: (e.g., /Create, Review, Update, Delete/-Request type)

Application: (e.g., /True, False/-Application request)

Runtime Env: (e.g., /True, False/-Runtime Environment K×S request)

Resource Commitment: (e.g., /Nonpremptible, Preemptible, Reservation/app resource assign type)

Input Latency: (e.g., /Low (<2 ms), M (<25 ms), H (None)/)

SLO-Application Response Latency: (e.g., /int (ms)/(e.g., target of 95% response latency over 5 minutes))

SLO-Availability Performance: (e.g., /int/-Target % success/measured over 5 minutes (total-error)/error)

SLO-Availability Uptime: (e.g., /int (s)/-Target Number of seconds uptime/total over 5 minutes as %)

Targeted Deployment: (e.g., /Edge, DataCenter, Cloud/can be multiple)

Location List: (e.g., /State, Metro, Common Language Location Identifier (CLLI)/list of locations including Edge/Cloud Designation)

App Uncertainty Resource Evaluation: (e.g., /True, False/if true application is being deployed for first time TRUE=Trigger Application Uncertainty Resource Estimation AURE+Fast association. If FALSE, use library resource parameters)

Expectation Policy: Customer specified outcome policy—Input Service Latency, Inter-service Latency, Inter-service bandwidth, scheduling efficiency, source coverage, maximize resource, none.

(2) Application/Task Level Attributes (Task-Level):

Name: (e.g., -/Application &+Runtime Name/Application ID)

App Template Tag: (e.g., /application template ID/Edge Orchestrator application template/binary Application Job)

Runtime Env PaaS (Platform as a Service) Template Tag: (e.g., /runtime template ID/Runtime Env template ID)

VM Template Tag: (e.g., /VM template ID that specifies VM specific parameters/)

Execution Priority: (e.g., /0=MCIE (Multi-Cloud Intelligent Edge) Ctrl,1=Operations-subcat, life/safety, rtops, nrtops,2=short-lived,3-Elastic Batch, no specified priority per task)

Task Location: (e.g., /Task Names by Location/List of component mservices by location TaskID)

Task Target Execution Time: (e.g., /Seconds of nominal runtime/Expected time of execution in seconds/list of tasks with expected runtime based on selected scalar compute)

Task Hdw (Hardware) Requirement: (e.g., /List of Tasks with specialized hdw acceleration DSA/)

Target ISA (Industry Standard Architecture) and Version: (e.g., /ISA that the Task is compiled/list of tasks and target ISA x86-64, ARM64, etc. /Per Task target ISA)

Target Hardware Platform: (e.g., /Intel, AMD, ARM-CortexA, ARM-Neoverse, RISC-V/target hardware platform based on chosen ISA)

Domain Specific Accelerator: (e.g., /GPU-ML, GPU-Graphics, FPGA/Type of DSA)

Domain Specific Accelerator Hardware Platform/generation: (e.g., /Nvidia-Volta, Nvidia-Ampere, Nvidia-T4, AMD-MI100, AMD-MI300, Intel/DSA Manufacturer)

OS-Virtualization Environment: (e.g., /Ubuntu, RHEL, Debian, ESXi, EEV/If virtual need to spec guest OS below)

Target Guest OS: (e.g., /Ubuntu, RHEL, Debian/if hypervisor is specified for Execution Environment type VM: /Number of VM's by Location/if required)

Edge Runtime Environment: (e.g., /K3s, K8sOS, K8sTZU, AZIOT, EKSAW, ANTHOS/)

Cloud Runtime Env: (e.g., /Kubernetes Services from Clouds (AKS, EKS, GKE)/)

Target Kube Docker Container Runtime Env: (e.g., /Alpine, Ubuntu, Suse/SLE Micro, RHEL/)

Security Cloud Credential: (e.g., /Address of time base secure credentials for cloud account access/)

(3) Service Template/Expectation Policy:

Order of Execution: (e.g., /Specified deployment order of services/optional)

Service Dependency Graph: (e.g., /Microservice Service Dependency Graph/MSD to build subsequent execution history graphs)

Job Execution Time Target: (e.g., /Execution time deadline for job/seconds total absolute time for set of tasks to execute, 0=undefined, number of seconds for complete job execution)

Affinity: (e.g., /Constraints that must be observed in Runtime Env Pod scheduling/constraints)

Sync Policy: (e.g., /Policy for number of tries to deploy/ 0-10, up to 10 times, 0=infinite retry)

Deploy Duration: (e.g., /time for completion of deploy before declaring failure/(seconds int))

Multi-Segment dependency: (e.g., /True, False/—does this have an off-platform dependency)

Success Criteria: (e.g., /Critical Services+Locations for successful completion/)

In one or more embodiments, the data descriptors information may comprise the following:

(1) Production Data Descriptors:

File-Dir: (e.g., /List of directories/fs mount points required for production of data by application/by location)

Object-Store: (e.g., /List of URLs/buckets required for production access to object store by application/by location)

Stream-Service: (e.g., /List of streaming services end points/by location)

(2) Consumption Data Descriptors:

File-Dir: (e.g., /List of directories/fs mount points and filename for consumption by application, and priority/ by location priority is the criticality of the file to execution (0—essential, 1—limited impact, 2—not essential)

Object-Store: (e.g., /List of urls required for consumption access to the object store by application and priority/by location priority is the criticality of the file to execution)

Streaming-Service: (e.g., /List of pub/sub streams to subscribe to and priority/List of pub/sub state vector sync or streaming messaging services to subscribe by priority)

Chaos Input Dataset: (e.g., /URL to a dataset that can be used by MCIE for Deploy Time Chaos test/URL)

In one or more embodiments, the workload resource descriptors information may comprise the following:

(1) Scalar Compute:

Performance: (e.g., /Task Name, CP Clock/Minimum Clock frequency)

Type: (e.g., /Task Name, CPU type, AMD, Intel, ARM, RISC-V/Type of CPU)

Sub-Type: /Task Name, Cascade Lake, AMD-Milan, ARM-Cortex A72 /

System-Qty: /Task Name, Location, Node-Host-VM system list, qty of core-vcore per system/if zero for a system no reservation, assume 0.5 core-vcore (2) Vector Compute:

Performance: (e.g., /Task Name, TeraFlops, TOP/Minimum TF or TOP)

Type: (e.g., /Task Name, DSA type, AMD, Nvidia, Xilinx, Type of CPU)

Sub-Type: (e.g., /Task Name, V100, A100, T4, MI200, MI300, Zynq /)

System-Qty: (e.g., /Task Name, Location, Node-Host system list, qty of DSA Memory in MiB or Logic Cells (FPGA)/if zero assume 256 MiB)

P2P: (e.g., /Task Name, NVLink, PCIE/Inter-GPU network type)

(3) Memory:

Type: (e.g., /Task Name, DRAM, HBM/Type of Memory)

Qty: (e.g., /Task Name, Location, Node-Host-VM system list, memory quantity in MIB /Amount of memory required)

(4) Network:

Type: (e.g., /Task Name, Ethernet, RDMA/Type of Networking)

Qty: (e.g., /Task Name, Location, Node-Host-VM system list, Avg Network Bandwidth in Mb/s, Peak Network Bandwidth/Level of bandwidth required)

Quality of Service (QoS): (e.g., /Task Name, Best Effort, Priority, Guaranteed/Relative QoS of network bandwidth)

(5) Storage:

Type: (e.g., /Task Name, HDD, NVME, PMEM/Type of Storage)

System-Qty: (e.g., /Task Name, Location, Node-Host-VM system list, qty of storage per system/Storage size by type and location)

(6) Cloud:

Location: (e.g., /Task Name, cloud native supported config options for above in cloud/)

As noted above, the job may comprise a set of tasks specified by the manifest application descriptors. In one or more embodiments, application binaries may be placed in an application repository (e.g., application binaries repository 340 in FIG. 3).

Given an application job request, the edge orchestrator system executes (410) a process to determine a set of candidate edge systems for fulfilling a task from the set of tasks based on the requirements specified in application manifest and the edge system resource capacities and constraints from the edge systems. In one or more embodiments, the set of candidate edges may be identified based upon: (1) system resource capacity information from a set of two or more edge systems; and (2) previously determined and deemed current resource demand values for the task; or, if no previously determined and deemed current resource demand values are available, one or more resource descriptors associated with the task. For example, if a task has already been processed and its resource demand values (e.g., lower control limit (LCL), mean, and upper control limit (UCL), although fewer, more, or different resource demand values may be used) would previously have been determined and stored (e.g., in the resource limits datastore 350 in FIG. 3). It shall be noted that, in one or more embodiments, a previously determined set of resource demand values for a task may be outdated (e.g., time since it was last determined exceeds a threshold amount of time, stationarity shifted, change in edge system, etc.), in which case the resource demand values may no longer be deemed current.

In one or more embodiments, the task is dispatched (415) to a target edge system selected from the candidate edge systems, in which the task is flagged to notify the target edge system to collect resource-related data associated with handling the task. In one or more embodiments, the edge orchestrator may target to provide an average performance that meets the service level objective(s), and an upper control limit (maximum) and a lower control limit (minimum guaranteed) may be set at a value (e.g., 34%) above and below a user/customer provided average/mean, which is provided in the manifest.

If needed, the target edge system supplies (e.g., via the agent) the collected data to the edge orchestrator. The collected data may be streamed to the edge orchestrator, may be sent in batches to the edge orchestrator, or both. Also, different metrics of the collected data may be provided to the edge orchestrator at different rates and/or in different ways. In one or more embodiments, the resource-related data associated with handling the task may comprise: (1) input work statistics (stream data subscribed to the task, database accesses, etc.); (2) output performance Service Level Objective (SLO) statistics (e.g., response latency, application performance(success/total), etc.); and (3) resource demand load consumption (e.g., CPU/Memory/Network/Storage/DSA).

Figure 5:
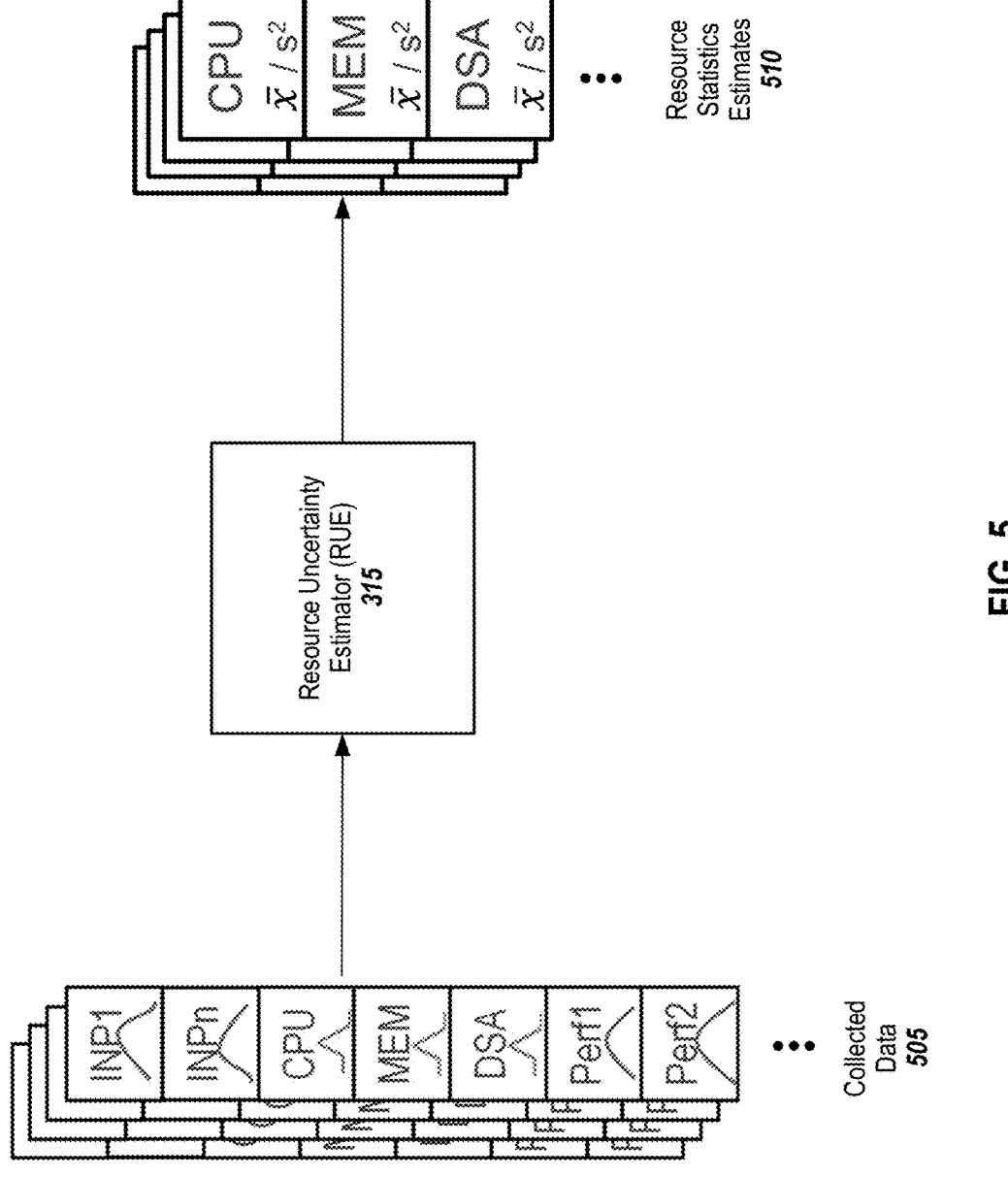
FIG. 5 graphically illustrates a methodology for using collected resource-related data and one or more statistical methodologies to determine resource statistics for an edge system, according to embodiments of the present disclosure.

In one or more embodiments, after receiving the resource-related data associated with handling the task that was collected by the target edge system, a dataset comprising the resource-related data associated with handling the task is used (420) to determine resource statistics for one or more edge resources for the task. For example, as graphically illustrated in FIG. 5, the RUE 315 may take as input the collected resource-related data 505 and use one or more statistical methodologies (e.g., M-PCM-OFFD, etc.) to determine (420) resource statistics 510 (e.g., mean, variance, and skewness—although different measures (e.g., other measures, more measures, or fewer measures) may be used) for each resource of a set of resources (e.g., CPU, memory, storage, network, DSA, etc.).

Given the resource statistics computed in the prior step, for the task, one or more resource demand values (or resource limits values) for one or more edge resources may be determined (425) using one or more of the resource statistics. These resource demand values may be stored (430) for use as "previously determined resource demand values" for the next time the task is received, provided the task arrives while these resource demand values are still deemed to be current.

It shall be noted that, when determining the resource statistics, resource-related data associated with handling the task collected from a plurality of instances of the target edge system handling the task over an evaluation time may be used. For example, data related to the handling of that task for a 24-hour period may be used in determining the resource statistics for that task. The resource-related data associated with handling the task may also be collected from a plurality of edge systems handling the task over an evaluation time.

It shall be noted that the methodology of FIG. 4 may be performed to obtain resource demand values for each task from the set of tasks associated with the application job request and may be performed for a set of application jobs.

In one or more embodiments, the one or more resource demand values for the task comprises, for each edge resource of a set of edge resources: a lower control limit for the edge resource, a mean for the edge resource, and an upper control limit for the edge resource—although different values (i.e., other values, more values, or fewer value) may be determined.

Figure 6:
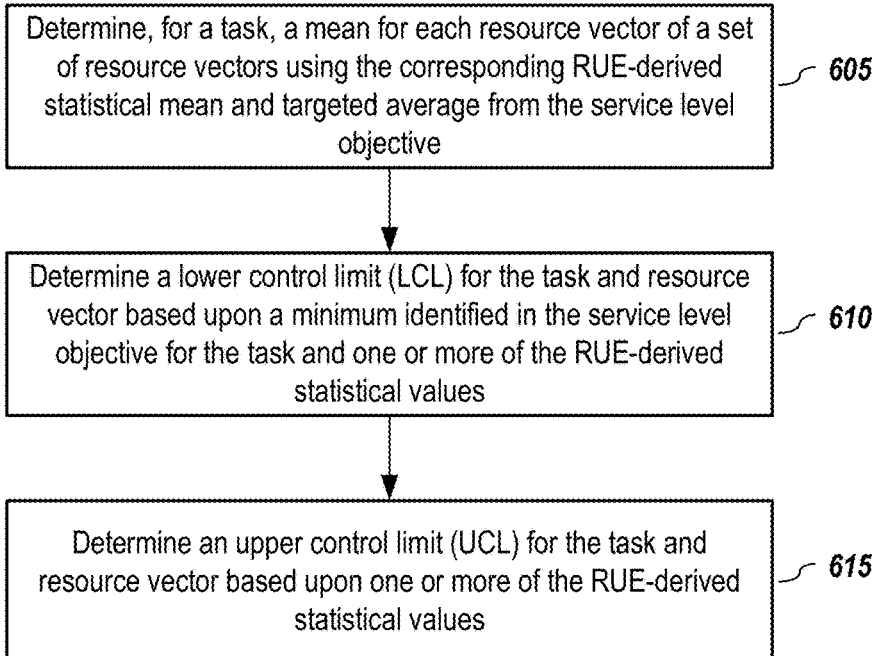
FIG. 6 depicts an example methodology for obtaining resource demand values, according to embodiments of the present disclosure.

FIG. 6 depicts an example methodology for obtaining resource demand values, according to embodiments of the present disclosure. In one or more embodiments, a mean (e.g., average resource utilization between a minimum level of resource determined for meeting the service level objective and a mean based on the statistical process of the resource uncertainty estimation) for each task and each resource vector may be determined (605) using a resource uncertainty estimation (RUE) process based on Multivariate-Probabilistic-Collocation-with-Orthogonal-Fractional-Factorial-derived statistical mean and a targeted average from the service level objectives for the task. In one or more embodiments, the RUE uses an MPC-OFF process to reduce the dimensionality of data to make the calculation of mean computationally tractable and select data points that define a mean (using OFF) to select datapoints that define the mean. See the M-PCM-OFFD document, cited above. It shall be noted that the RUE module may also determine a variance, a skewness, or both, and that these statistical values or moments represent a demand probability distribution for that resource for that task.

In one or more embodiments, the RUE process is applied to time series data, which may be collected from edge system host applications. In one or more embodiments, time series data is data related to the application/task utilization, such as CPU, memory, network, storage, and hardware accelerators. The time series is collected and may be stored in a time series database, such as Prometheus, which is a software application used for event monitoring and alerting. In addition, through the same collection input, time series data for application/task requests may be collected using techniques available from an edge orchestration system. In one or more embodiments, this information may be stored in a time series database, and these two datasets may be used for the RUE process of one or more embodiments of the present disclosure.

In one or more embodiments, a lower control limit (LCL) for a task and a resource vector may be based (610) upon a minimum identified in the service level objective for the task and one or more of the RUE-derived statistical values. For example, an LCL (e.g., a guaranteed minimum resource level) may be set to a level based on resource demand load that meets a minimum SLO objective. The time series data referenced above may be compared by the RUE process to a known and specified service level objective, which is defined for the task as a minimum amount of acceptable successful execution completion. The RUE may determine the estimated mean amount of resource required at the service level objective specified level of the execution.

In one or more embodiments, an upper control limit (UCL) for the task and resource vector may be determined (615) based upon one or more of the RUE-derived statistical values. For example, the UCL may be determined as based on the mean and the LCL (e.g., UCL=2×Mean−LCL) or set at 99% of the demand load probability density function (pdf) value for the resource, whichever is lower. In one or more embodiments, the pdf may be defined by the time series data previously described (above) and collected into the Prometheus database.

Figure 7:
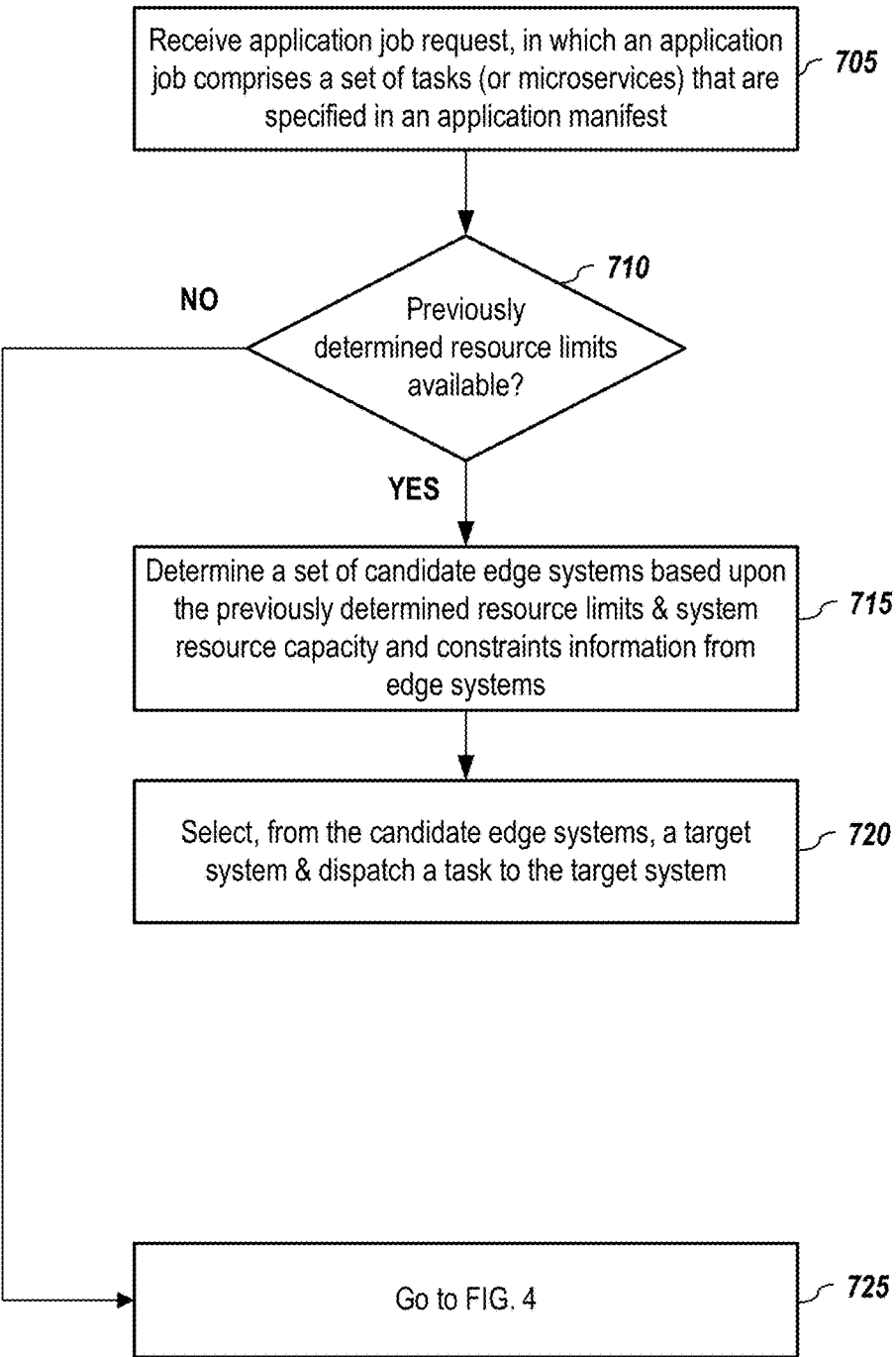
FIG. 7 depicts a methodology for using edge resource demand load estimations, according to embodiments of the present disclosure.

FIG. 7 depicts a methodology for using edge resource demand load estimations, according to embodiments of the present disclosure. In one or more embodiments, an application job request is received (705) by an edge orchestrator. The edge orchestrator may check (710) whether previously determined resource limits are available. If no previously determined resource limits are available (or are not deemed current/usable), a process the same as or similar to that disclosed in FIG. 4 may be performed (725) to collect data and estimate resource limits for future use.

If previously determined resource limits are available, the edge orchestrator may determine (715) a set of candidate edge systems based upon the previously determined resource limits and system resource capacity and constraints information from edge systems. That is, in one or more embodiments, given the previously determined resource limits, the edge orchestrator identifies a set of candidate edge system that have the capacity to meet those resource limits and that meets other criteria specified by the job request.

From the set of candidate edge systems, the edge orchestrator may select (720) an edge system to fulfil the task. In one or more embodiments, given a set of candidate systems, the edge orchestrator may use one or more additional criteria to select an edge system to fulfil the task. For example, the edge orchestrator may select the edge system with minimum qualifications for meeting the resource limits, thereby allowing edge systems with more capacity to be available in a larger job is received. One skilled in the art shall recognize that there are a number of methodologies that may be employed for selecting a final edge system from the set of candidate systems, any of which may be employed herein.

It shall be noted that embodiments provide several benefits. First, embodiments enable operationally derived values for demand load thereby allowing edge platform schedulers to reserve the minimum demand load resource reservation and maintain service level objectives.

Second, embodiments provide reliable estimates of application demand load and the statistical distribution in comparison to input and output distributions through the previously defined resource uncertainty estimation process (e.g., the MPCM-OFF calculations), which enables the setting of lower and upper control limits that ensure stable operation for the high-level (even a maximum) number of workloads.

Third, while other methods require far larger amounts of observational data to approximate statistics, the use of a M-PCM-OFFD framework is not only computationally efficient but can effectively operate with a limited set of data to characterize the distribution of resource demand load, input workload, and output performance metrics.

Fourth, embodiments may rapidly dispatch an application/task for initial determination of the resource-related statistics. And, after non-intrusive characterization processing of obtaining estimates of the resource-related statistics (or resource limits), the information may be reused for all new instances of the same application/task—with little or no impact to performance.

C. Embodiments of Stationarity Monitoring of Edge Resource Demand Load Characterizations Modern multi-cloud edge platforms operate as a large-scale heterogeneous distributed systems that run with functions such as orchestration, application management, infrastructure management, data management, and security control/policy. A significant challenge in edge systems is operating many geographically distributed and often heterogeneous edge sites—each of which typically has much more limited resources in comparison to cloud deployments.

One of the important functions of orchestration is scheduling. Scheduling assigns applications (or tasks or services in microservices design pattern) to edge systems. A scheduler may use one or more of several factors, such as constraints, user-provided directives, application type, among other factors to assign the tasks to specific edge infrastructure. As discussed in the prior section, scheduling methods may also consider current resource demand load usage and/or user-provided estimates of resource demand load. While these processes may function well in cloud, IT, and core datacenters where relatively abundant resources can be reallocated to address inadequate resources, at the edge, scheduling is much more challenging. Because edge systems have more limited resources and limited or no ability to load spread if overloaded, making demand load resource estimation and its accuracy central to the edge platform execution environment.

In highly distributed heterogeneous environments, edge workloads are operating on a shared platform largely being moved from customized hardware. User provided estimates are typically not very reliable because users will not generally have good estimates on the resource demand usage of these workloads. A lack of good resource demand estimates can be a serious problem for the proper operation of an edge platform. Testing methods to provide assurance of the correctness of these estimates should be efficient and continuous. Over longer timescales, it is well known that applications will be non-stationary; therefore, re-evaluations should be performed periodically, continuously, based upon one or more triggers, or some combination thereof.

However, as noted previously, application microservices/tasks are problematic to estimate—particularly in edge environments. Applications are moved from operating on dedicated bespoke infrastructure to executing in a shared edge environment. In addition, there is an explosion of new edge applications. Customer/developer estimates are notoriously inaccurate in any environment due to the focus on functional outcome performance and error-free operation/security. Furthermore, edge systems present new and, in some ways, rigorous environments for application microservice operation. These problems are solved in cloud settings by over-provisioning cloud resources by some amount (e.g., 20%), but such a strategy is not viable strategy for edge systems. Therefore, it may be generally assumed that user-provided demand load usage requirements are not reliable.

Current approaches for edge resource demand load estimation involve utilizing regression analysis and/or machine learning (ML) neural network methodologies and models. However, the high dimensionality of the data, the volume of the data, and the rapidity at which good estimates are needed make such approaches untenable as a practical matter—the high dimensionality of the data and the highly variant performances present non-linearities and will take excessive data and time to converge.

Accordingly, what are needed are systems and methods for edge platform monitoring to provide assurances that estimates of edge resource demand load may be relied upon.

Embodiments of the prior section primarily focused on the short-term challenge of providing a local edge orchestrator with accurate estimates of resource demand loads for scheduling selection of edge systems. However, the benefits achieved by using those estimates are reduced or negated if the estimates are no longer accurate. Thus, it is important that the veracity/validity of these estimates are checked to support the demand load characterizations and offer a stable edge execution environment.

One important requirement of an edge platform is to provide a stable execution environment for applications. Edges may use a deployment pattern of elastic resource execution. In one or more embodiments, edges may determine a minimum guaranteed resource level (e.g., LCL) and maximum not to exceed resource level (e.g., UCL), and the average of these levels may provide an average level of execution. If the platform has the correct output statistical characterization (e.g., first and second moments (i.e., mean and variance)), stable operation within a user's service level objections (SLO) is provided.

Figure 8:
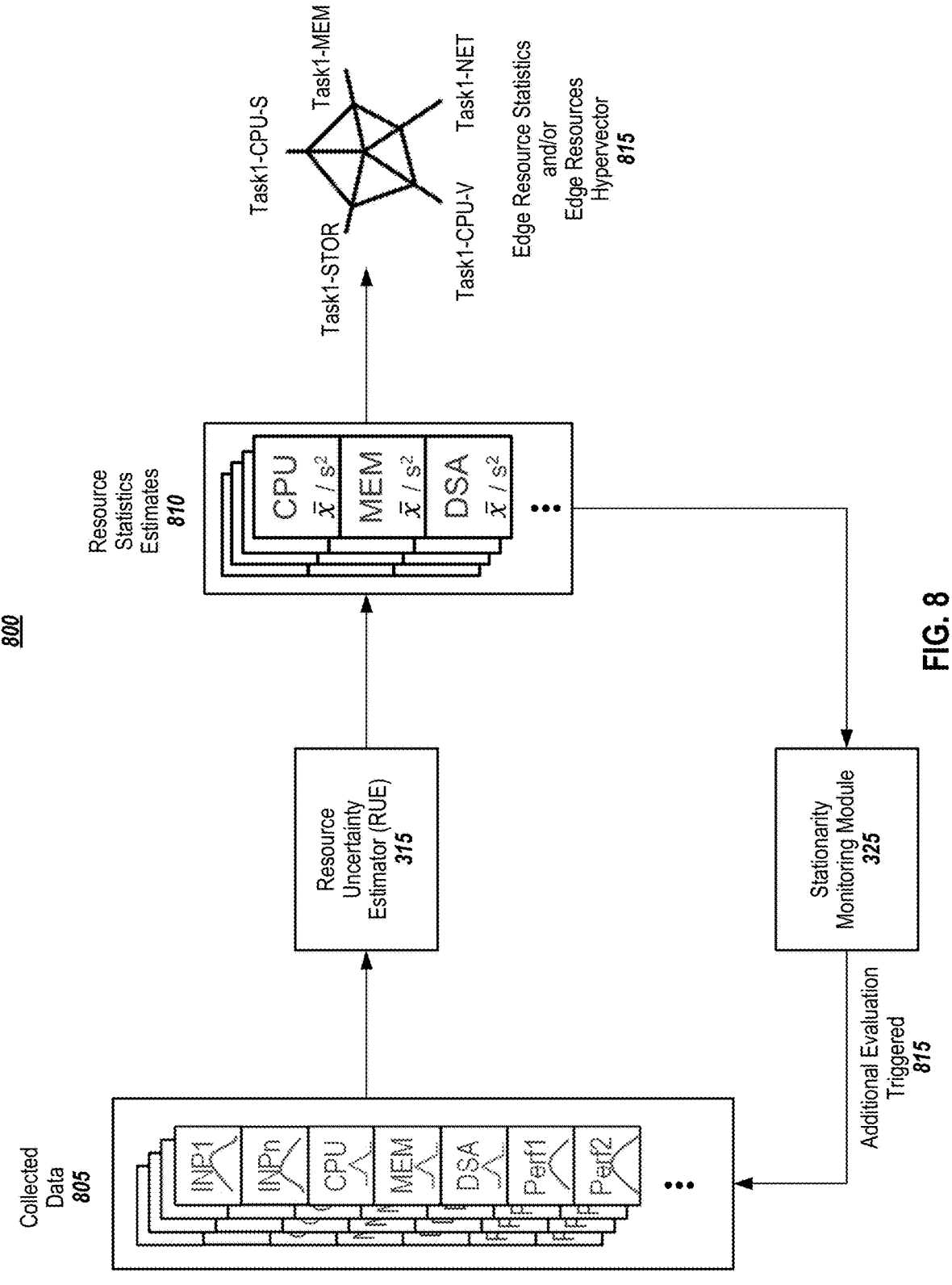
FIG. 8 graphically illustrates a methodology for monitoring validity of estimates, according to embodiments of the present disclosure.

FIG. 8 graphically illustrates a methodology for monitoring validity of estimates, according to embodiments of the present disclosure. As illustrated in FIG. 8, data 805 may be collected by a local edge orchestrator, by one or more edge systems, or a combination thereof. The data collection may be performed in the same or similar manner as described above with respect to the data monitoring/data collection module 320. In one or more embodiments, data collected outside of the operations of the data monitoring/data collection module 320 may also be utilized. One skilled in the art shall recognize that within the context of edge networks numerous metrics are monitored, often on a continuous basis. Such data may also be employed for monitoring of an edge system or systems.

As illustrated in FIG. 8, embodiments of the monitoring of edge resource demand load characterizations may leverage the scheduling process and statistical techniques of the RUE module 315 to derive a demand load resource requirement. For example, in one or more embodiments, a RUE methodology (e.g., an M-PCM-OFFD methodology and/or other statistical analysis methodology) may be employed to estimate output statistical values (e.g., resource statistics estimates 810) for edge systems with multiple inputs of known distributions. As discussed above, these resource statistics estimates 810 may be used to set resource limits (e.g., LCL, UCL, etc.) for various edge system resources (e.g., CPU, memory, storage, network, DSA, etc.). These edge resource limits per task may be stored individually as resource vectors or as an edge resource hypervector 815.

In one or more embodiments, a stationary monitoring module may take outputs 810 from the RUE module 315 and perform one or more stationary tests on one or more of the output estimates. By monitoring for accurate estimates, proper platform operations are maintained. An assumption of one or more of the methods of the RUE module (e.g., an M-PCM-OFF process) is stationary operation—that is, the dataset needs to be probabilistically stationary for effective estimation of metrics, such as mean, variance, skewness, etc. of workloads.

As previously stated, resource-related metrics (e.g., edge resource statistics) associated with handling of an application will not remain stationary for an extended time particularly when one considers the highly distributed and heterogeneous nature of edge domains and the long usage periods of times. For at least these reasons, it is important to gauge the stationarity of resource-related metrics to determine whether a full reassessment of those metrics is required.

In one or more embodiments, stationary testing may be performed by a stationarity data monitoring module 325, which may be part of the data monitoring/data collection module 320 or may be a separate module (e.g., module 325). In one or more embodiments, the module 325 performs this functionality periodically, continuously, based upon one or more triggers (e.g., detected changes to an edge system), or some combination thereof.

In one or more embodiments, as part of its operation, the stationarity monitoring module 325 may seek to develop a set of one or more windows for retesting by characterizing drift from the stationary operation. Based upon conditions and timings of detected drift, a stationarity monitoring module 325 may develop one or more appropriate testing timings. Once a non-valid test is detected, an additional evaluation may trigger (815) the collection or monitoring of data so that resource-related statistics may be updated. This process supports the production of more accurate estimates.

In one or more embodiments, to test for stationarity, one or more stationarity methods may be used. Two widely known methods that may be used include Kwiatkowski-Phillips-Schmidt-Shin (KPSS) and Augmented Dickey-Fuller (ADF). In one or more embodiments, a KPSS method is applied, and the test is used around a deterministic trend as it is more computationally efficient. In one or more embodiments, two or more stationary test methods may be combined to provide more reliability for detecting drift in stationarity of a metric.

Figure 9:
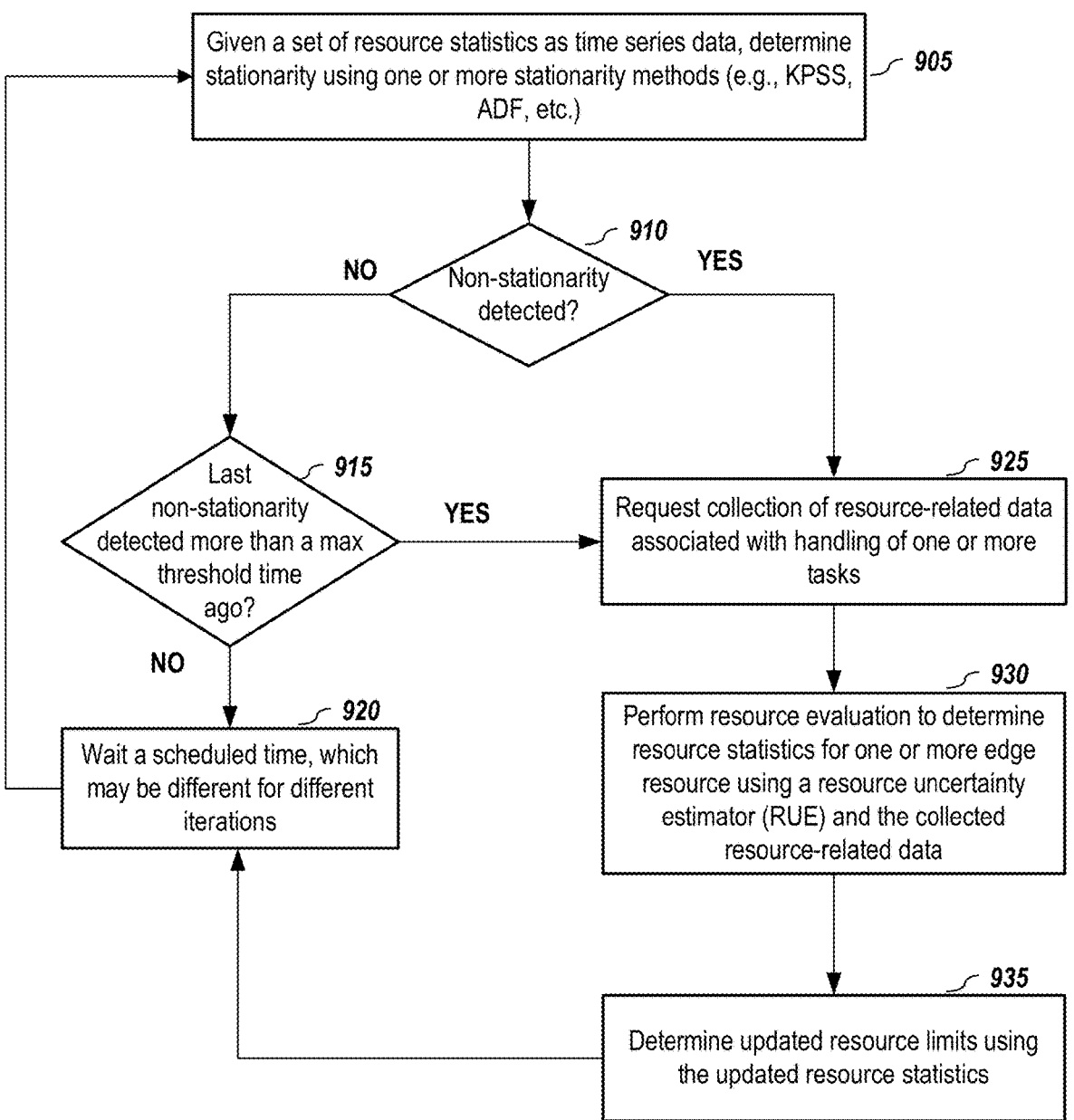
FIG. 9 depicts a methodology for monitoring the stationarity of an edge system or systems, according to embodiments of the present disclosure.

FIG. 9 depicts a methodology for monitoring the stationarity of an edge system or systems, according to embodiments of the present disclosure. Given, for a task, a time series of statistical resource demand values (e.g., resource statistics estimates 810 in FIG. 8) for one or more edge resources related to handling the task, stationarity drift may be gauged (905) using one or more stationarity methods. In one or more embodiments, the RUE 315 may generate resource statistics estimates for tasks according to a schedule (e.g., every 24 hours). The resultant data may be considered as time series data, which may be used by a stationarity method (e.g., KPSS, ADF, etc.) to determine whether the statistical moments (e.g., mean, variance, etc.) for one or more metrics related to an edge system have experienced drift.

In one or more embodiments, to be deemed non-stationary, the drift may have to meet certain criterion or criteria. For example, the drift may need to exceed a threshold level and/or may have to exceed a lower threshold level for two or more stationarity checks. Alternatively, the criteria may be that the drift meets or exceeds 5% normalized drift (e.g., +/−5% of first or second moment change) and a normalized resource change of 0.01 or above. In one or more embodiments, resource measures may be normalized based upon a set of references. Normalized resource units may be, for example, NCU for normalized CPU, NMU for normalized memory units, NNU for normalized network units, and NAU for normalized accelerator units. For example, a resource capacity may be normalized against a reference system—e.g., a reference system may be defined as having 100 CPU Intel SAPPHIRE RAPIDS, 128 GiB (gibibytes) of Memory, 10 Gb/s Network Capacity, 64 Gb DSA Mem/128 k PE/LB. So, a system with 32 CPU, 128 GiB of Memory, and 1 Gb/s is a system with 0.32 NCU, 1.0 NMU, and 0.1 NNU. It shall be noted that different criterion or criteria may be used for deeming stationary drift to have occurred.

Responsive to detecting (910) stationary drift for at least one statistical resource demand value for at least one edge resource for a task, the processes of data monitoring and resource statistics estimation such as described with reference to FIG. 4. For example, the following steps may be performed. First, collection of resource-related data associated with the task whose value(s) have shifted may be requested (925). In one or more embodiments, the task may be dispatched to a target edge system, in which the task is flagged to notify the target edge system to collect resource-related data associated with handling the task. It shall be noted that the task may be dispatched to a specific edge system if that edge system experienced the drift. Also, the task may be dispatched to a plurality of edge systems. In one or more embodiments, data may be collected for an evaluation time period in which data for one or more instances of the task is collected.

Alternatively, or additionally, in one or more embodiments, changes to a specific edge system may trigger reevaluation. For example, a change to hardware, software, or both at an edge system may prompt the agent to notify the local edge orchestrator, the global edge orchestrator, or both. Responsive to being notified of the change, resource-related data associated with handling the task may be collected for the edge system.

In one or more embodiments, after receiving the resource-related data associated with handling the task that was collected, a dataset comprising the newly collected resource-related data associated with handling the task may be used to determine resource statistics for one or more edge resources for the task. As noted above, the RUE may use the updated data and a M-PCM-OFFD methodology to re-compute resource statistics for one or more edge resources. Given the updated resource statistics, for the task, one or more resource demand values (e.g., LCL, UCL, mean, etc.) for one or more edge resources may be determined (935) using one or more of the resource statistics—which may be obtain in like manner as described above with respect to FIGS. 4 and 6. These resource demand values may then be stored (e.g., in the resource limits datastore 350 of FIG. 3) as used for future dispatching of the task.

In one or more embodiments, the methodology may comprise waiting (920) some time period and continue to evaluate stationarity. The scheduled time period may be the same or different for different iterations and/or different conditions. For example, the next iteration immediate after re-evaluation (steps 925-935) may be longer than for a subsequent iteration or iterations (e.g., if it is assumed that drift is less likely to occur in the short term) or may be shorter (e.g., if it is assumed that a significant change an edge system or the edge platform has occurred and drift may continue to be experienced). In one or more embodiments, the schedule may be continuous.

Responsive to not detecting (910) non-stationarity for any statistical resource demand values, a check may be made (915) regarding when the last time stationary drift was detected. If no stationary drift has been detected within a maximum threshold time period (e.g., 30 days), re-evaluation may still be triggered in which steps 925-935 are performed. Workloads change over time and the environment where such workloads run also changes. Even if stationary drift is deemed to have been detected, there may still be some drift resulting in the resource allocations being incorrect. Incorrect resource allocation can cause application SLO performance degradation, or, if overprovisioned, resulting in over-reservation of resources. Thus, it can be beneficial to periodically re-run the process to re-evaluate and analyze the applications.

Responsive to the last time non-stationarity was detected not exceeding a maximum threshold time, the methodology may comprise waiting (920) some time period before rechecking stationarity. As noted above, the scheduled time period may be the same or different for different iterations and/or different conditions. Consider, by way of illustration and not limitation, the following use case example. Assuming that resource statistics estimates for the short term are performed by the RUE on a 24-hour evaluation period, a new set of data 810 is added every 24 hours. If no stationary drift is detected in an iteration, the schedule may follow a geometric sequence in which stationarity is checked on the following days if no drift is detected: 1-2-4-8-16-32 (32=max threshold, in which re-evaluation is performed regardless). If stationary drift is detected, then the next iteration may start back at the beginning of the sequence.

In one or more embodiments, the occurrences of the non-stationarity (i.e., stationary drift) may be used to set or alter the schedule. For example, a regression analysis or machine learning model may be used to set a schedule for checking stationarity. Because the data collection and computation for the stationary check may be computationally costly, it is beneficial not to sample too frequently if the values are not changing.

Figure 10:
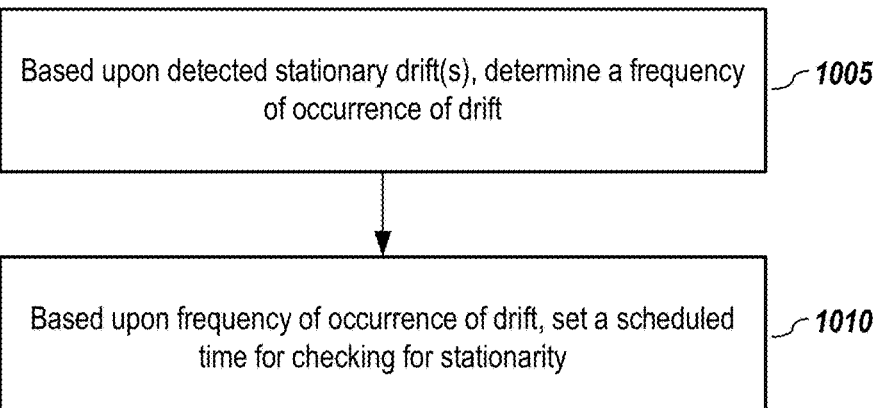
FIG. 10 depicts a methodology for setting a schedule for checking stationarity, according to embodiments of the present disclosure.

FIG. 10 depicts a methodology for setting a schedule for checking stationarity, according to embodiments of the present disclosure. In one or more embodiments, a frequency of occurrence of drift may be determined (1005) based upon detected non-stationary drifts. And, based upon the frequency of occurrence of drift, a scheduled time for checking for stationarity may be set (1010).

However, in one or more embodiments, resource demand load and stationarity may be continuously monitored using the available time series data. One or more autoregressive moving average techniques may be employed for the continuous monitoring. When a stationarity test fails, a reevaluation may be triggered to maintain estimate accuracy.

Regardless of the implementation, embodiments provide reliable estimates of application demand load and the statistical distribution in comparison to input and output distribution which enables the setting of lower and upper control limits that ensure stable operation for the maximum number of workloads.

D. Edge Application Resource Demand Load Scheduling Embodiments

As noted above, an edge orchestrator may be used to coordinate the deployment of applications and services to the most appropriate edge devices based on various factors (e.g., proximity, available resources, network conditions, performance requirements, and/or others). By distributing workloads intelligently, the edge orchestrator aims to minimize latency, improve responsiveness, and optimize the overall performance of edge applications. However, resource demand load scheduling/orchestration is associated with many challenges, such as lack of near real-time resource usage state, smaller resource pools, queuing and/or execution delay during utilization spikes, and/or others.

Accordingly, at least some disclosed embodiments provide an elegant application resource demand load scheduling framework that can be implemented in edge platforms. A local edge orchestrator 230 may receive an assignment (e.g., from a global edge orchestrator 235) to place or schedule one or more application jobs (which may comprise tasks or services) for performance by appropriate edge systems. The local edge orchestrator 230 may assess system resource capacity usage/utilization information to inform scheduling decisions. Such system resource capacity usage/utilization information may be obtained by edge sites/edge systems 220, agents 225, and/or other entities.

The local edge orchestrator 230 may employ various techniques (e.g., heuristic rules for determining candidate systems, modified best fit decreasing (mBFD) processes) to facilitate rapid scheduling of resource demand loads in a manner that efficiently balances multiple objectives, such as mitigating edge system overutilization, pursuing balanced distribution of resource demand loads over edge systems, ensuring satisfaction of service level objectives (SLOs), and/or others.

To facilitate scheduling in accordance with one or more embodiments, resource metrics (CPU, memory, network, accelerator, and/or storage metrics) may be normalized to a common reference system, which can facilitate rapid calculations and/or accelerated scheduling performance and may allow for efficient sorting and/or assignment based on largest normalized resource vectors. Such normalization may be performed for resource demand loads associated with job tasks as well as for assignable resource capacity associated with edge systems. Furthermore, multiple normalized resource dimensions may be represented with a single vector (e.g., via concatenation, vector bin packing, or other aggregation techniques), which can allow a scheduling system to efficiently account for all resources in the assignment of applications/tasks to systems.

For a given task to be scheduled/assigned, a scheduler/orchestrator may search for a set of candidate systems based on various constraints (e.g., indicated in the manifest, such as application priority, equipment equipage, service level objective requirements, software requirements, data location, etc.). In one or more embodiments, where no candidate system is found that complies with certain task constraints (e.g., data location, customer-specific site), a scheduler/orchestrator may supplant such constraints and search for alternative systems (e.g., using or emphasizing other criteria, such as network distance, input latency, etc.) that are capable of meeting service level objectives associated with the task. Furthermore, a scheduler/orchestrator may assess resource utilization trajectory information associated with edge systems (e.g., based on autoregressive moving average (ARMA) and utilization state data in near real-time) to define or modify the candidacy of systems for receiving tasks. Such functionality can provide a scheduling system with dynamic management capabilities to achieve multi-objective balance.

In one or more embodiments, a scheduler/orchestrator may schedule tasks by job (with jobs being treated first-in-first-out) and resource size in descending order (e.g., large to small) based on (aggregate) resource components modeled as resource vectors (e.g., normalized resource vectors). A system candidate list (e.g., defined based on constraints and/or resource utilization trajectory as discussed above) may be sorted in ascending order (e.g., small to large) based on (aggregate) available assignable system resource capacity (e.g., represented as normalized resource vectors). The tasks may then be assigned to the first candidate system that has sufficient system resource capacity to support the largest critical demand load vector for the task (e.g., the largest normalized vector representing a resource for performance of the task) and the other resource vectors for the task (e.g., the non-critical resources of the task). The order in which tasks become assigned may be selected to achieve various scheduling objectives (e.g., based on a reinforcement learning-derived makespan execution graph order, based on best fit decreasing bin packing heuristic, etc.).

Lower-priority and/or small tasks (e.g., batch execution tasks and/or short-lived tasks) may be treated and/or ordered separately from higher-priority tasks. The manifest associated with a job may indicate the priority for tasks. Low priority and/or small tasks may be assigned uniformly across candidate systems in accordance with a power-of-two-choices (POTC) framework (or other load balancing framework), which may contribute to balanced distribution of tasks across edge systems.

Furthermore, in one or more embodiments, a scheduler/orchestrator system may selectively enter an expedited mode (e.g., emphasizing speed over precision) if it is determined that the scheduler/orchestrator system is not meeting a service level objective (as defined in a manifest). For instance, the scheduler/orchestrator system may omit certain sorting and/or assessing processes discussed herein and proceed with conventional best fit decreasing (BFD) to rapidly schedule tasks.

Figure 11A:
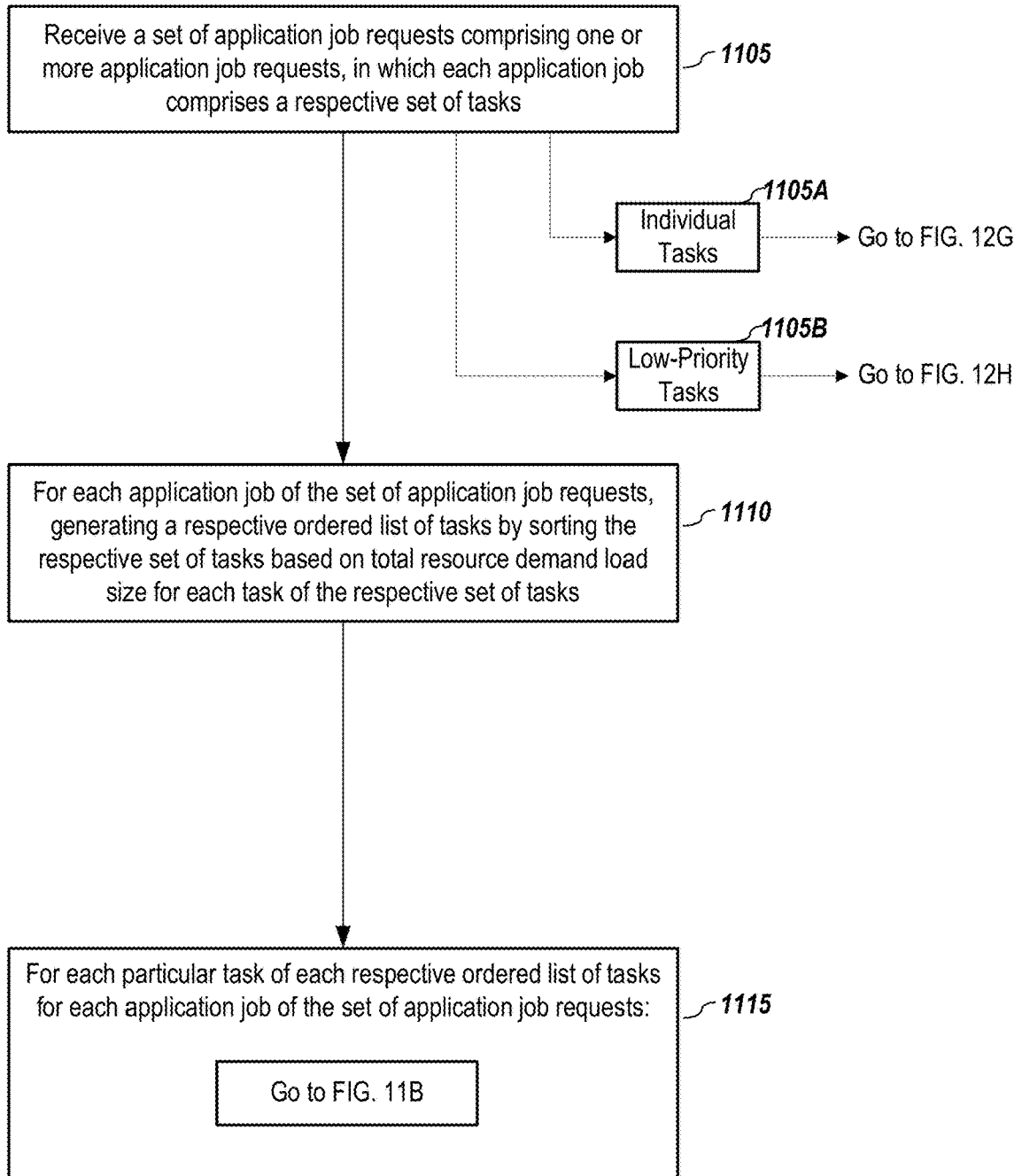
FIG. 11A and FIG. 11B depict a methodology for orchestrating edge resource demand load scheduling, according to embodiments of the present disclosure.
Figure 11B:
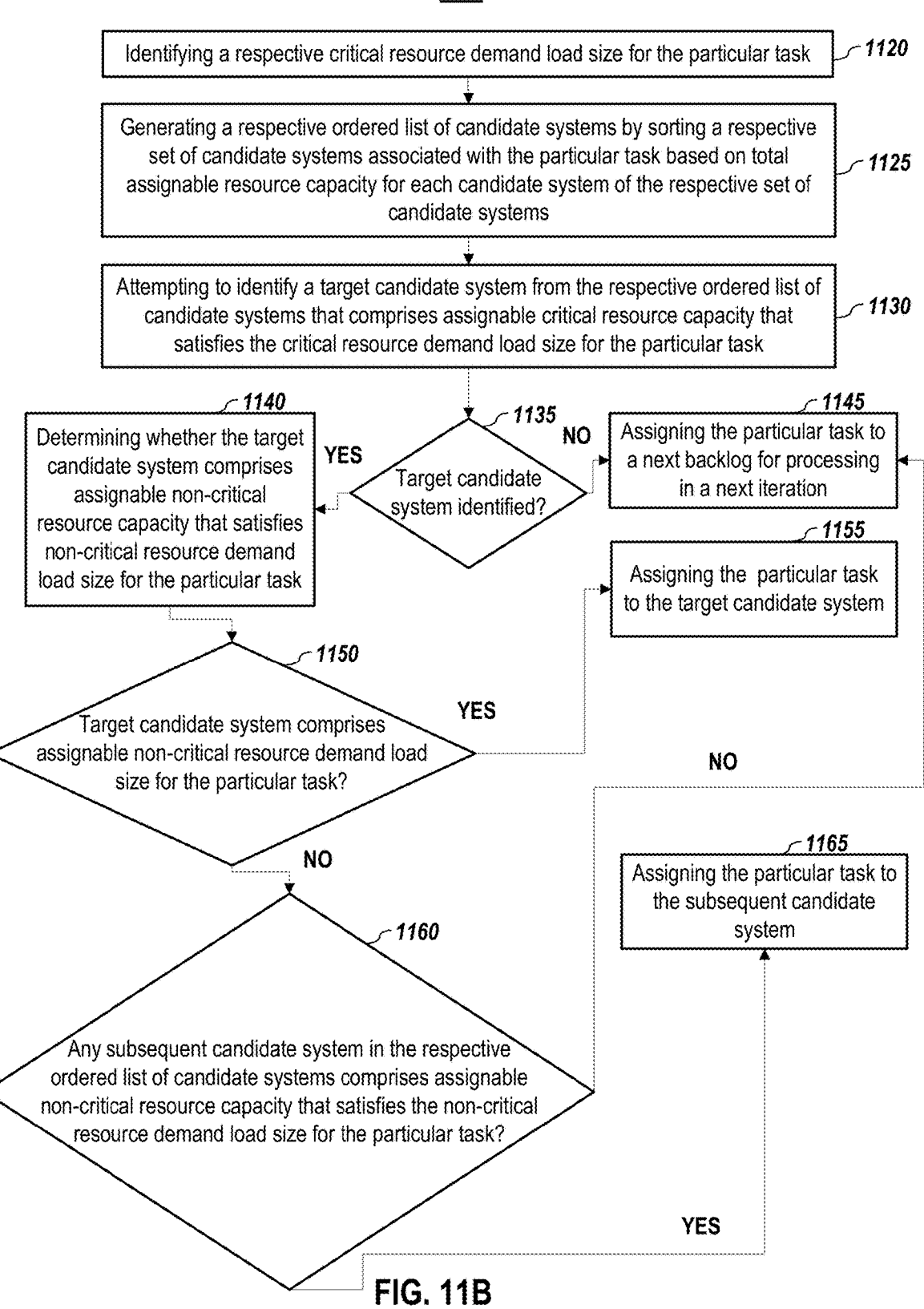
Figure 12A:
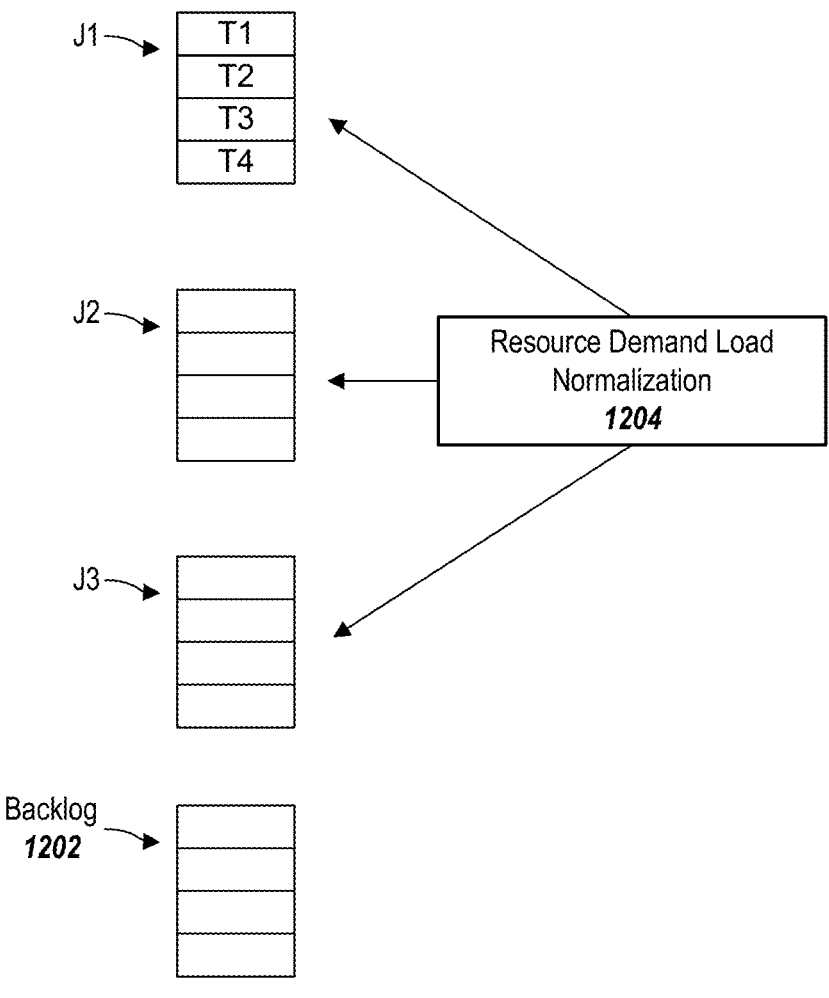

FIG. 11A and FIG. 11B depict a methodology 1100 for orchestrating edge resource demand load scheduling, according to embodiments of the present disclosure. In one or more embodiments, a system (e.g., a local edge orchestrator 230 or other information handling system) may receive a set of application job requests that includes one or more application job requests, in which each application job includes a respective set of tasks (1105). The set of application job requests may be regarded as a frontlog of jobs and may comprise any number of jobs. FIG. 12A provides a conceptual representation of a system receiving jobs J1, J2, and J3. As depicted in FIG. 12A, each job J1, J2, and J3 includes a set of tasks (or services), represented in FIG. 12A by adjacent rectangles (for ease of description, only the tasks of J1 are labeled "T1", "T2", "T3", and "T4"). A system may be configured to receive and process/schedule three jobs (with accompanying tasks) at a time (or any quantity of jobs). Each job may be associated with a manifest indicating service level objectives, job priority, and/or other information as described herein. FIG. 12A also depicts a backlog 1202, which may comprise tasks that were not successfully scheduled during a previous scheduling iteration. As will be described in more detail hereinbelow, a scheduling system may re-attempt the scheduling of tasks within the backlog 1202 during a current scheduling iteration (see FIG. 12G).

FIG. 12A also depicts resource demand load normalization 1204, whereby normalized representations (e.g., vector representations) of the resource requirements of the different tasks of the different jobs represented in FIG. 12A may be determined. Different resource dimensions (e.g., CPU, memory, network, storage, accelerator) may be represented by respective vectors, with the magnitude indicating the task demand load resource requirement (or, for systems, the assignable resource capacity). Resource dimension vectors may be combined (e.g., via vector bin packing, concatenation, or other techniques) for a system or task to obtain an aggregate representation of assignable resource capacity or resource demand load, respectively.

For example, task requirements may be normalized based on a reference value for each resource vector. Example units may comprise NCU for normalized CPU, NMU for normalized memory, NNU for normalized network, and NAU for normalized accelerator. In one or more embodiments, resource capacity is normalized against a reference system. By way of illustrative example, a reference system may have 100 CPU Intel SAPPHIRE RAPIDS, 128 GiB of Memory, 10 Gb/s Ntwk Capacity, 64 Gb DSA Mem/128 k PE/LB, whereas a new system may have 32 CPU, 128 GiB of Memory, 1 Gb/s, therefore sys is 0.32 NCU, 1.0 NMU, 0.1 NNU. Normalized demand load app/task values may be calculated based on the same system reference. For example, an app/task can require 2.0 CPU of Intel SR and 2 GiB of Mem and 100 Mb/s; therefore, the normalized app/task may be represented as 0.02 NCU, 0.16 NMU, 0.01 NNU. All normalized units may be dimensionless. Adjustments may be made with each new generation of systems and/or tasks, and all values may be adjusted at the basic units (e.g., CPU=core, memory=GB, Network=Gb/s). For instance, an AMD Gen Zen4 core may have 1.25× the computation capacity of an Intel SR, so if a system of AMD Zen4 is 64 cores, and the reference is Intel SR of 100 cores, a calculation of (64/100)*1.25=0.8 may indicate NCU in terms of assignable capacity for an AMD Zen4. If Demand Load was 4 cores of Intel SR and operating on an AMD Zen4 machine the calculation of (4/100)/1.25=0.032 may indicate units of CPU (NCU) for AMD Zen4 Demand Load.

Normalizing resource dimensions can account for differences in hardware, such as performance inequalities in CPU cores. For instance, an AMD CPU Core may have more raw CPU time than Intel CPU cores. In one example, a scheduler may convert a DEMAND LOAD to NCU, NMU, NNU, NAU at scheduling time when receiving a package (e.g., an assignment to schedule tasks). The scheduler may convert the RESOURCE CAPACITY to normalized values (e.g., at Day Zero Onboarding). After scheduling is complete, the scheduler may convert the DEMAND LOAD resource vectors back to real assignable values for vCPU/CPU, Memory, Network, DSA for Cloud Native Container Control assignment and IIS (Internet Information Services) assignment. Normalized units for CPU may be NCU and may be based on CPU core utilization. In addition to raw core numbers, the scheduler may maintain ISA/Generation conversion table for AWS, vCPU, GCP Core, Azure vCore, x86-64 Intel, x86-64 AMD, ARM-64 Cortex/Neo, and/or others. Minimum and Maximum may be specified for CPU elastic execution to target average utilization based on Demand Load capacity estimation.

The manifest may specify what data streaming accelerator (DSA) family and/or generation may be required or available. The resource vector may specify the level of SM utilization (GPU) and/or logic cells/Blocks utilization (FPGA). Memory model size may also be required but not normalized. Limit may be specified. Similar calculations may be performed for non-conventional utility (NCU) accelerator demand or machine capacity, and/or other types of accelerators (resulting in NAU units). Similar calculations may also be performed for memory, which may be specified in GiB based on limited memory (resulting in NMU units). For instance, a normalized system may be equipped with 128 GiB of memory.

Network may be specified in Mb/s and may be based on average bandwidth and/or limit bandwidth. Similar calculations may also be performed network (resulting in NNU units). For instance, average bandwidth and max bandwidth may be specified. QoS priority traffic may be required; a relative priority can be provided. Network Cost may be estimated and adjusted based on network distance. The NNU demand may be adjusted based on the following conversions for Task-Task Demand cost:

Same Host=0, Same Location=1, Same Domain=2, Different Domain=3

These factors may be used in calculating makespan minimization and cost heuristics A federated scheduler (e.g., global edge orchestrator 235) may pass key information such as resource vectors, ISA, Hardware, OS/Virtualization, and/or target guest OS to scheduler.

A system may be equipped with 1 Gb/s.

Storage may be measured and normalized to GiB. The reference system may be assumed to be equipped with 512 GiB including boot and system partitions.

Various resource dimensions discussed herein may be represented in a normalized vector form (e.g., aggregate or resource-specific) as discussed above, such as total resource demand load size, critical resource demand load size, non-critical resource demand load size, total assignable resource capacity, assignable critical resource capacity, and assignable non-critical resource capacity, which may be represented in the normalized resource vector framework discussed above in which resource demand load and assignable resource capacity may be normalized based on reference values for different resource types.

In the example of FIG. 12A, the tasks of the backlog 1202 may already have normalized resource vectors associated therewith from a previous scheduling iteration.

Referring again to FIG. 11A, an ordered list of tasks may be generated for each received application job by sorting the tasks of each job based on total resource demand load size (e.g., an aggregate normalized vector representation) of the tasks within each job. FIG. 12C provides a conceptual representation of such sorting where, within each job J1, J2, and J3, the tasks of the job become sorted in descending order by total resource demand load size, providing a respective ordered list of tasks associated with each different job. In one or more embodiments, tasks within each job are further divided by priority (as indicated in the manifest) prior to the sorting. For example, within a single job (e.g., J2), all priority 0 tasks may be sorted in descending order and may appear above all priority 1 tasks, which are separately sorted in descending order.

Figure 12B:
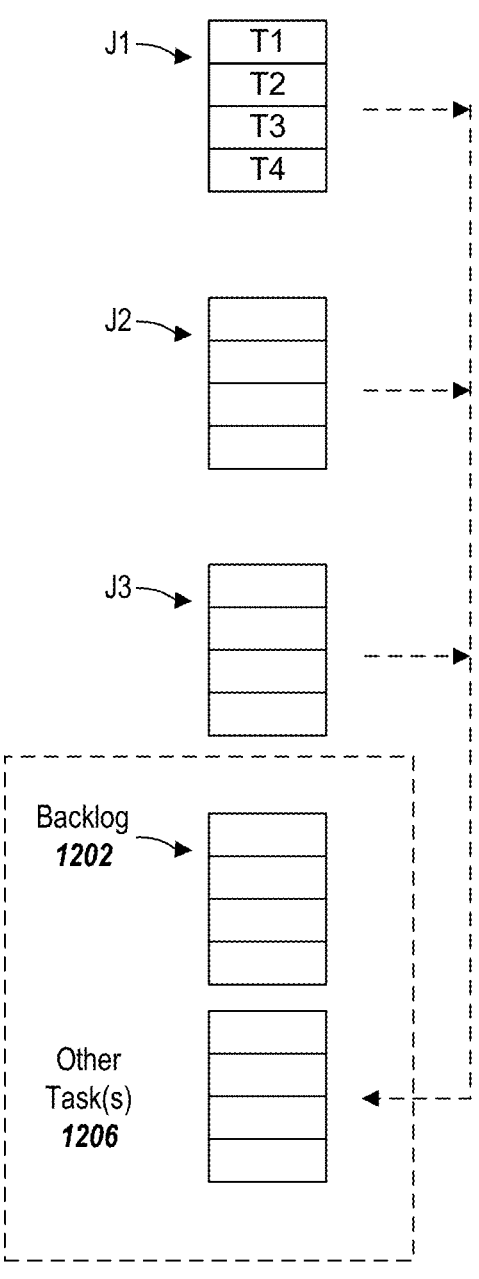

In one or more embodiments, the ordered lists of the various jobs being processed omit lower-priority tasks and/or individual tasks (e.g., where a job has a single task). For instance, FIG. 12B provides a conceptual representation of removing low-priority tasks and/or individual tasks from the task lists of the various jobs J1, J2, and J3 that become sorted to provide the respective ordered lists of tasks discussed above. In FIG. 12B, the omission (or removal from consideration) of low-priority tasks from the ordered lists of the jobs J1, J2, and J3 is represented by dashed lines extending from the different jobs J1, J2, and J3 toward other task(s) 1206. FIG. 12B depicts the backlog 1202 and the other task(s) 1206 bounded within a common dashed box, indicating that these tasks may comprise additional tasks that can be scheduled separately from the scheduling of the tasks of J1, J2, and J3 (as discussed in more detail with reference to FIGS. 12G and 12H). FIG. 11A also conceptually depicts distinguishing individual tasks 1105A and low-priority tasks 1105B from the application jobs of act 1105 that become sorted in accordance with act 1110. FIG. 11A further indicates that the scheduling of the individual tasks 1105A and/or the low-priority tasks 1105B may be treated separately (see FIGS. 12G and/or 12H, respectively).

Figure 12D:
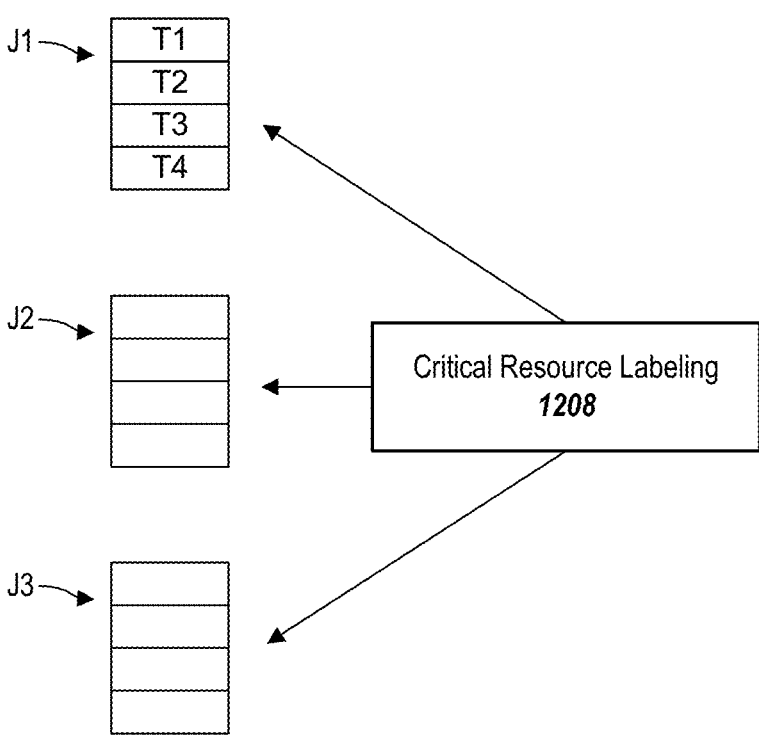

FIG. 11A indicates that various steps or acts may be performed for each task of each ordered list of tasks of each application job (1115). FIG. 11A also indicates that details of these steps or acts are shown and described with reference to FIG. 11B. FIG. 11B illustrates that, for each task of each ordered list of tasks, a critical resource demand load size may be identified or labeled (1120). As noted above, the critical resource demand load size for a task may comprise a highest normalized vector representation (e.g., with the highest magnitude) of a resource dimension for the task (e.g., CPU, memory, storage, network, accelerators). FIG. 12D provides a conceptual representation of critical resource labeling 1208 for each task of the various jobs J1, J2, and J3. As will be described hereinafter, identifying the critical resource demand load size may contribute to mitigating over-assignment of tasks to particular edge systems.

Figure 12E:
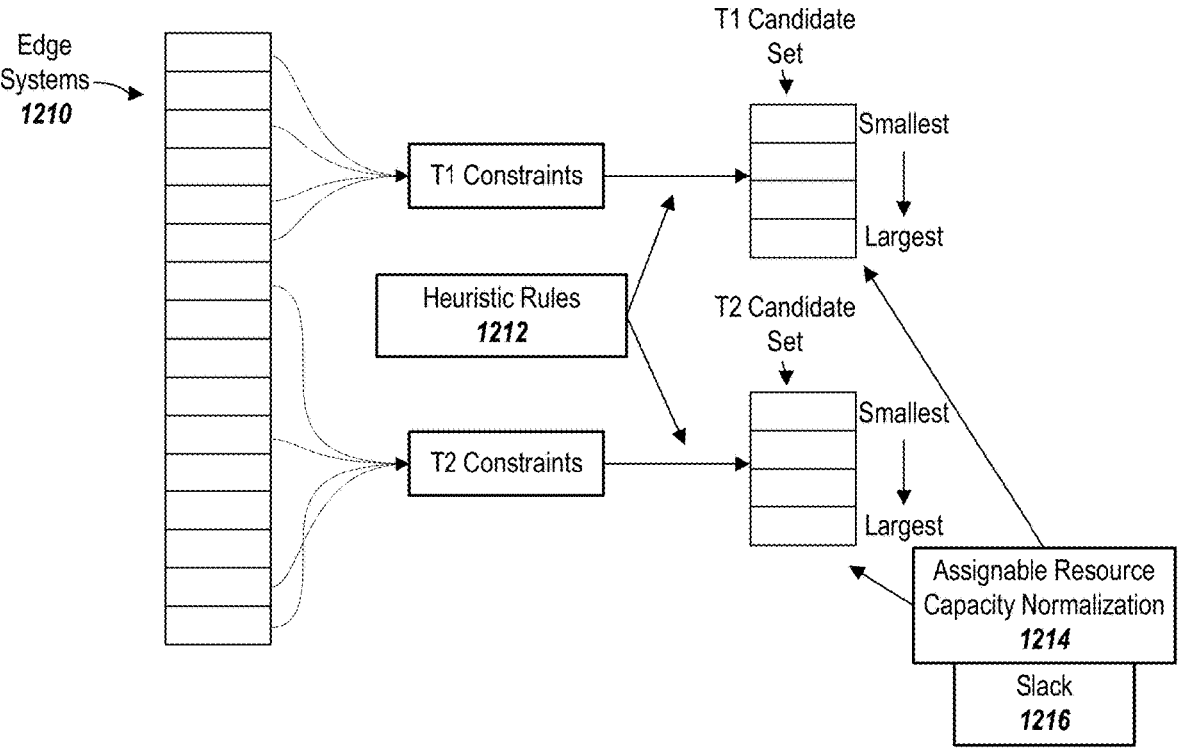

FIG. 11B furthermore depicts that, for each task of each ordered list of tasks (see 1115 of FIG. 11A), a respective ordered list of candidate systems may be obtained by sorting a respective set of candidate systems based on total assignable resource capacity (1125). FIG. 12E provides a conceptual representation of acquisition of task-specific sets of candidate systems (e.g., a respective set of candidate systems) and sorting of the task-specific sets of candidate systems based on total assignable resource capacity. For instance, FIG. 12E depicts edge systems 1210, which may comprise substantially all edge systems to which a local edge orchestrator 230 may potentially assign tasks (the edge systems are represented by vertically adjacent rectangles in FIG. 12E.

By way of illustrative example, FIG. 12E depicts constraints associated with tasks T1 and T2 of job J1 of the frontlog (or of the ordered list of tasks of J1). The constraints may be defined in the manifest of J1 and may include various factors/components. For instance, constraints for a task may include, but are not limited to, application priority, equipment equipage (DSA, Storage, Scalar CPU type, storage), application graph network affinity, and/or service level objective requirements (application response latency, application performance, application availability). Software system requirements (Hypervisor/OS/Runtime, etc.), data location (e.g., customer-specific sites/data), combinations thereof, and/or others. State and/or status information associated with the edge systems 1210 may be obtained (e.g., via the edge systems themselves, via an agent 225) to enable the orchestrator/scheduler to determine which edge systems satisfy the task-specific constraints. As noted above, available resource information for the edge systems may be obtained in a normalized vector format/framework (which can enable an orchestrator to readily determine which edge systems comply with task-specific constraints). For example, FIG. 12E conceptually depicts arrows extending from various edge systems 1210 to the T1 constraints and the T2 constraints, indicating particular edge systems 1210 that satisfy the T1 constraints or the T2 constraints. The initial set of edge systems that satisfy the T1 constraints may be regarded as an initial set of candidate systems that may potentially be used to satisfy the resource demand load associated with task T1. In one or more embodiments, additional operations are performed to refine the initial set of candidate systems to obtain a final or respective set of candidate systems that is specific to a particular task (e.g., task T1 in the present example).

For example, FIG. 12E depicts one or more heuristic rules 1212 that may be applied to the initial set of candidate systems to obtain a final or respective set of candidate systems (e.g., "T1 Candidate Set" or "T2 Candidate Set" in FIG. 12E). In one example, a heuristic rule 1212 indicates that if a customer-specific site is not available (e.g., no candidate system or site exists that complies with a particular data location specified in a constraints for a task), the system may search for alternative locations/sites that are within a network distance to attempt to find a candidate system that can satisfy service level objectives laid out in the task-specific constraints. For example, when applying the aforementioned heuristic, the system may effectively ignore the "data location" constraint and instead emphasize other criteria such as input latency, network distance, etc. to determine edge systems for the set of candidate systems.

Another example heuristic may comprise assessing resource utilization trajectory associated with systems of the initial set of candidate systems to determine whether initial candidate systems are likely to become strained if additional tasks are assigned thereto. A resource utilization trajectory for an edge system may take on various forms. In one example, resource utilization trajectory for a candidate system is determined based on an autoregressive moving average (ARMA) and/or autoregressive integrated moving average (ARIMA) of resource utilization for the candidate system. For instance, an agent 225 and/or edge device may monitor resource utilization at least over predetermined time periods (e.g., 24 hours) and maintain an ARMA or ARIMA of system resource capacity usage. The agent 225 and/or edge device may additionally obtain 1-minute snapshots of the edge system (which may comprise a physical or virtual system). Such data (e.g., ARMA/ARIMA average and snapshots) may be sent by agents 225 and/or edge devices according to any suitable protocol (e.g., QUIC multiplex connections), and such data may be represented according to the normalized vector framework for indicating resource dimensions discussed herein. Such information may be used by an orchestrator to determine resource utilization trajectory information for the edge system. If the resource utilization trajectory information satisfies one or more conditions, the orchestrator/scheduler may remove the associated edge system from the respective or final set of candidate systems (or downgrade the ranking of the associated edge system within the respective set of candidate systems). Such conditions may take on various forms. In one example, a condition for removing or downgrading an edge system is when the edge system is running (according to its state data) at a resource utilization capacity that is greater than 95% probability of the ARMA/ARIMA average and has increased in resource utilization by 1 standard deviation (sigma) within the preceding 24 hours. Other conditions and measures of resource utilization trajectory are within the scope of the present disclosure.

Upon obtaining the respective set of candidate systems (e.g., T1 Candidate Set and T2 Candidate Set in the example of FIG. 12E), the scheduler/orchestrator may sort the respective set of candidate systems to obtain an ordered list of candidate systems (1125 of FIG. 11B). An example of such sorting is shown in FIG. 12E via the "Smallest" to "Largest" sorting designation adjacent to the respective sets of candidate systems. In one or more embodiments, the task-specific ordered list of candidate systems is arranged in ascending order based on total assignable resource capacity (e.g., using aggregate normalized vectors indicating total assignable resource capacity for specific systems of the candidate set). FIG. 12E depicts assignable resource capacity normalization 1214, indicating that such normalized aggregate assignable resource capacity vectors may be obtained for each candidate system in the respective set of candidate systems, and that such vectors may be used to sort the candidate systems into the ordered list of candidate systems.

In one or more embodiments, the amount of resources indicated as available for any particular candidate system (by normalized vectors in the aggregate or for individual resource dimensions) is influenced by a slack parameter 1216 that may be selectively modifiable. For instance, assignable/available resource capacity may be defined as: Available Resourc=System Capacity−System Capacity In Use−Slack Parameter. The slack parameter may be selectively modified by users/administrators/entities and may provide an additional way to tune system performance (e.g., in anticipation of a surge, to promote load distribution across systems, etc.).

Figure 12F:
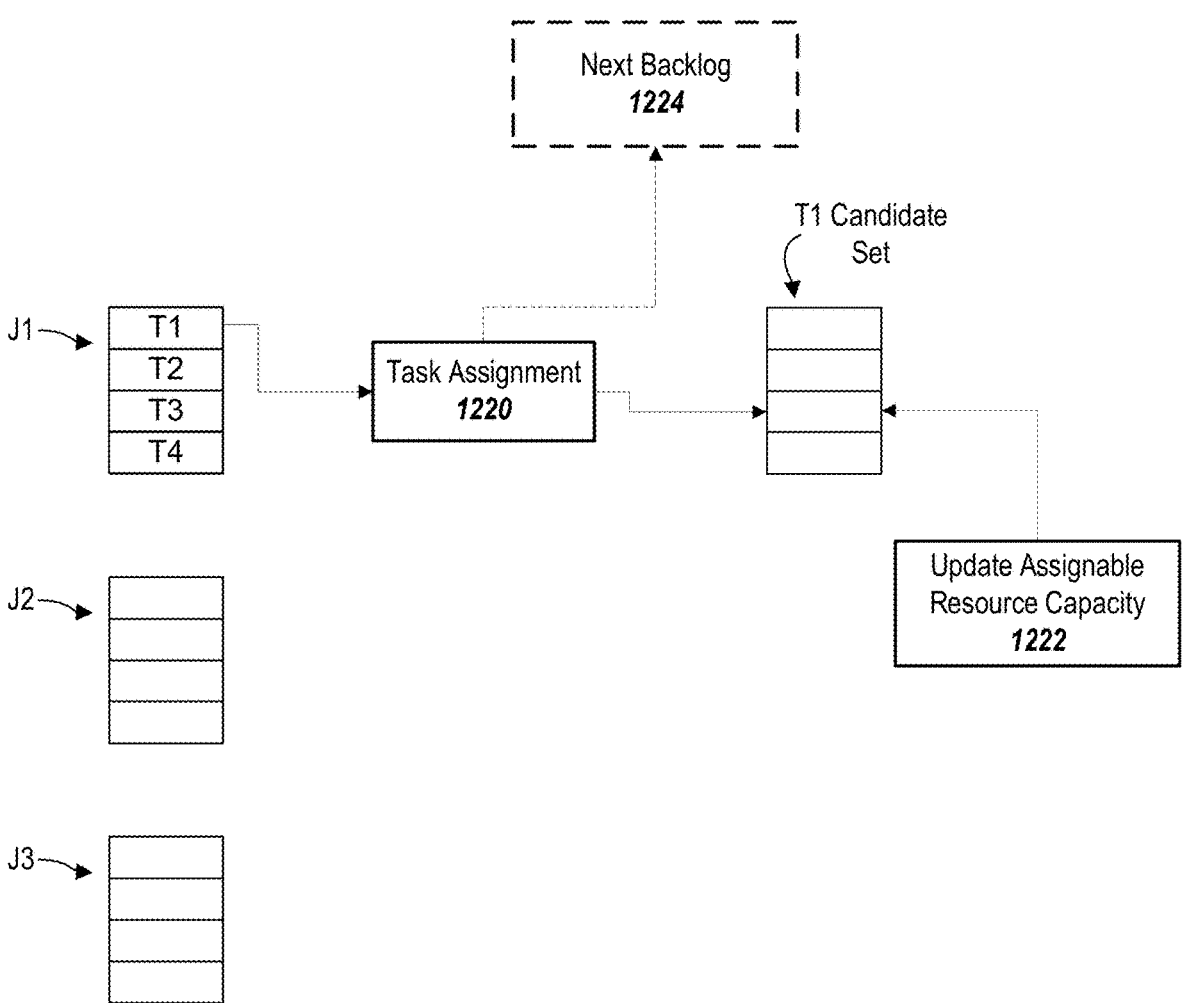

Using the heuristic rule(s) 1212, the orchestrator/scheduler may modify, refine, or obtain the respective set of candidate nodes (e.g., T1 Candidate Set and/or T2 Candidate Set in the example of FIG. 12E), which may be used to assign the tasks of the frontlog jobs to edge systems. FIG. 11B depicts attempting to identify a target candidate system from the respective ordered list of candidate systems (1130). FIG. 12F provides a conceptual representation of identifying a target candidate system for a particular task. FIG. 12F depicts the ordered list of tasks of job J1 obtained in accordance with the principles discussed herein with reference to FIGS. 12A-12D. For instance, the ordered list of tasks of job J1 in FIG. 12F may be sorted in descending order based on total resource demand load size. Furthermore, each task of job J1 in FIG. 12F may comprise an identified critical resource demand load size. FIG. 12F furthermore depicts the T1 candidate set (or respective ordered list of candidate systems) obtained in accordance with the principles discussed with reference to FIG. 12E. For instance, the ordered list of candidate systems (T1 candidate set) of FIG. 12F may be sorted in ascending order based on total assignable resource capacity.

FIG. 12F depicts task assignment 1220 being performed on task T1 of the ordered list of tasks for job J1. Task assignment 1220 may comprise searching for a target candidate system of the T1 candidate set (beginning with the top of the list where total assignable resource capacity is smallest) that has an assignable critical resource capacity that can satisfy the identified critical resource demand load size of task T1. In at least one or more embodiments, this initial search for a target candidate system may be performed without regard to other resource dimensions that are not identified as critical (e.g., non-critical resource dimensions). In one or more embodiments, only after identifying a target candidate system that can satisfy the identified critical resource demand load size of task T1 does the scheduler/orchestrator begin to consider non-critical resource dimensions (continuing down the T1 candidate set until a candidate system is found that satisfies non-critical resource dimensions). In one or more embodiments, such functionality may facilitate faster identification of assignable systems and may impose broader distribution of tasks to candidate systems, which can contribute to mitigated surges on select edge systems.

Stated differently, task assignment 1220 may entail assigning the task T1 to the first candidate system in the ordered list of candidate systems (T1 candidate set) that has an assignable critical resource capacity that is greater than the critical resource demand load size for task T1 AND has non-critical resource capacity that is greater than the non-critical resource demand load sizes for task T1. The "target candidate system" may thus comprise the first candidate system of the applicable ordered list of candidate systems that can satisfy the critical resource demand load size for the applicable task. In one or more embodiments, the target candidate system is also able to satisfy the non-critical resource demand load size(s) for the applicable task. In such cases, the scheduler assigns the task to the target candidate system. In one or more embodiments, the target candidate system is not able to satisfy the non-critical resource demand load size(s) for the applicable task. In such cases, after identifying the target candidate system, the scheduler may assess whether any subsequent candidate systems (e.g., further down the ordered list of candidate systems) are able to satisfy the non-critical demand load size(s) for the applicable task. If such a subsequent candidate system exists, the scheduler may assign the applicable task to that subsequent candidate system. If no such subsequent candidate system exists, the scheduler may assign the applicable task to a next backlog, where the applicable task may be considered/processed for scheduling again in a subsequent scheduling iteration.

FIG. 12F depicts task assignment 1220 being performed on task T1 to assign task T1 to a selected candidate system of the T1 candidate set (the selected candidate system may comprise a target candidate system or a subsequent candidate system, as described above). FIG. 12F also depicts updating assignable resource capacity 1222 for the selected candidate system to reflect the change in assignable resource capacity brought about by assigning task T1 to the selected candidate system. FIG. 12F furthermore depicts that task assignment 1220 may entail assigning a task to a next backlog 1224 (e.g., where no target and/or subsequent candidate system exists in the ordered list of candidate systems that can satisfy both the critical resource demand load size and the non-critical resource demand load size). A similar process may be performed to assign the other tasks of job J1 and for the tasks of jobs J2 and/or J3.

FIG. 11B details various aspects of assigning a task as described with reference to FIG. 12F. For instance, FIG. 11B depicts that, responsive to identifying a target candidate system that comprises assignable critical resource capacity that satisfies the critical resource demand load size for the particular task (1135), the scheduler/orchestrator may determine whether the target candidate system comprises assignable non-critical resource capacity that satisfies non-critical resource demand load size for the particular task (1140). Conversely, responsive to no target candidate system being identified (1135), a scheduler/orchestrator may assign the particular task to a next backlog for processing in a next scheduling iteration (1145).

FIG. 11B also depicts that, responsive to determining that the target candidate system comprises assignable non-critical resource capacity that satisfies non-critical resource demand load size for the particular task (1150) a scheduler/orchestrator may assign the particular task to the target candidate system (1155). Conversely, responsive to determining that target candidate system lacks assignable non-critical resource capacity that satisfies non-critical resource demand load size for the particular task (1150), a scheduler/orchestrator may determine whether any subsequent candidate system in the respective ordered list of candidate systems comprises assignable non-critical resource capacity that satisfies non-critical resource demand load size for the particular task (1160). In response to determining that a subsequent candidate system in the respective ordered list of candidate systems comprises assignable non-critical resource capacity that satisfies non-critical resource demand load size for the particular task (1160), a scheduler/orchestrator may assign the particular task to the subsequent candidate system (1165). Conversely, in response to determining that no subsequent candidate system in the respective ordered list of candidate systems comprises assignable non-critical resource capacity that satisfies non-critical resource demand load size for the particular task, a scheduler/orchestrator may assign the particular task to a next backlog for processing in a next scheduling iteration (1145).

Figure 12G:
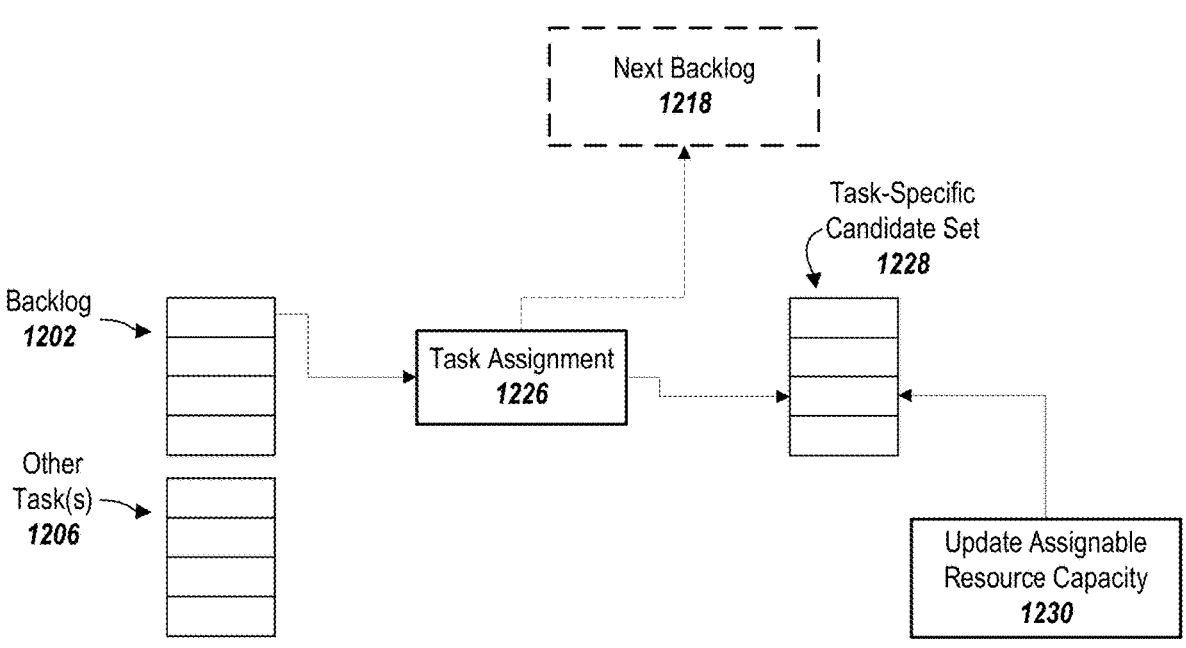

A similar process to that described hereinabove with reference to FIG. 12F may be followed to facilitate scheduling/assigning of the tasks of the backlog 1202 to edge systems. As described hereinabove, the backlog 1202 may comprise one or more backlog tasks (e.g., tasks that were not successfully scheduled in a previous scheduling iteration) and/or individual tasks (e.g., tasks that are the only task within a job). FIG. 12G depicts the backlog 1202 and its associated tasks (represented as vertically arranged rectangles). The tasks of the backlog 1202 may be sorted according to their critical resource demand load size.

FIG. 12G depicts task assignment 1226 performed on a first task of the backlog 1202. The first task of the backlog 1202 has an associated task-specific candidate set 1228 that comprises an ordered list of candidate systems that are sorted based on total assignable resource capacity. The task assignment 1226 for the first task of the backlog 1202 includes attempting to identify (using the ordering of the task-specific candidate set 1228) a target candidate system in the task-specific candidate set 1228 that comprises sufficient assignable critical resource capacity to satisfy the critical resource demand load size for the first task. If a target candidate system is identified, and it also has sufficient assignable non-critical resource capacity to satisfy non-critical resource demand load size(s) for the first task, the first task may be assigned to the target candidate system. If the target candidate system lacks sufficient assignable non-critical resource capacity, a subsequent candidate system from the task-specific candidate set 1228 may be sought out that has sufficient assignable non-critical resource capacity to satisfy the non-critical resource demand load size(s) for the first task. If no target candidate system is identifiable to satisfy the critical resource demand load of the first task, or if no subsequent candidate system is identifiable to satisfy the non-critical resource demand load of the first task, the first task may be assigned to a next backlog to potentially be processed in a subsequent scheduling iteration.

FIG. 12G depicts the first task of the backlog 1202 being assigned via task assignment 1226 to a selected candidate system of the task-specific candidate set 1228. The selected candidate system may comprise a target candidate system or a candidate subsequent system, as defined above. FIG. 12G also depicts updating of the assignable resource capacity 1230 of the selected candidate system of the task-specific candidate set 1228. FIG. 12G also conceptually depicts assigning of the first task of the backlog 1202 to the next backlog 1218 for potential subsequent treatment during a subsequent scheduling iteration. The processes described herein with reference to the first task of the backlog 1202 may be performed to assign (or attempt to assign/schedule) additional tasks of the backlog 1202 and/or other task(s) 1206 (e.g., individual or monolithic tasks moved to the other task(s) 1206 as described with reference to FIG. 12B).

Figure 12H:
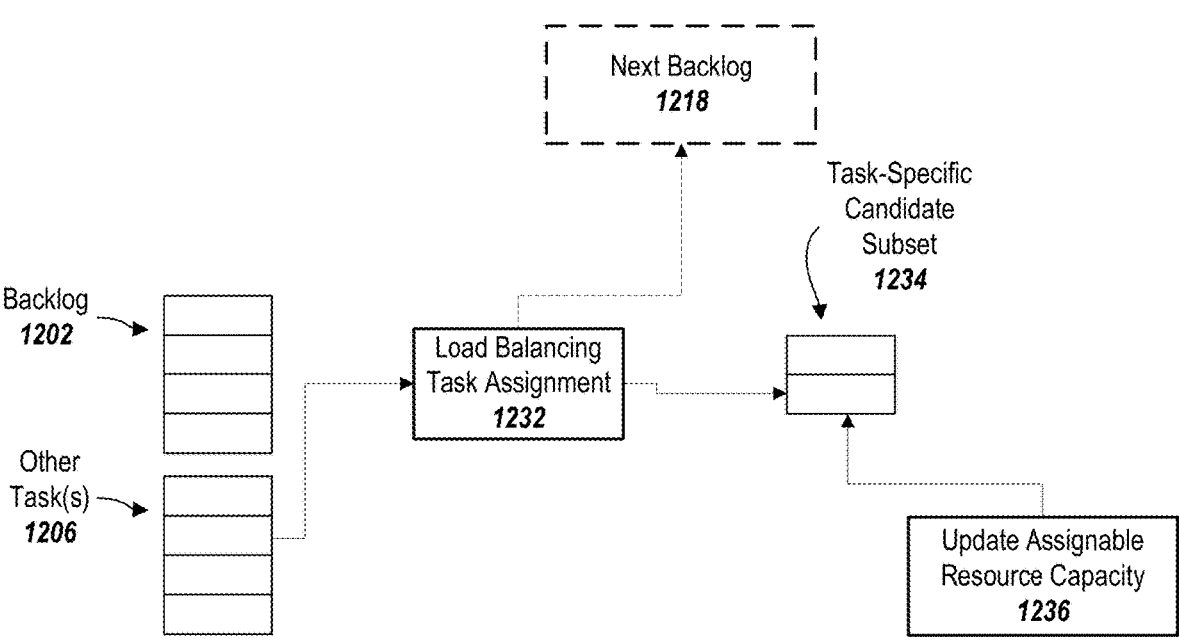

FIG. 12H provides a conceptual representation of the treatment of lower-priority tasks (e.g., as discussed with reference to FIGS. 11A and 12B. As noted above, low-priority tasks may be assigned separately from the processes used to assign high-priority tasks of a frontlog of jobs. FIG. 12H depicts load balancing task assignment 1232 being performed on a second task of the other task(s) 1206. The second task comprises a low-priority task. As with other tasks described herein, the second task may comprise a task-specific set of candidate systems to which the second task may be assigned. As shown in FIG. 12H, load balancing task assignment 1232 comprises selecting a task-specific candidate subset 1234, which is a subset of candidate systems from the task-specific set of candidate systems defined for the second task. In the example of FIG. 12H, the task-specific candidate subset 1234 includes two candidate systems, but any quantity of candidate systems may be utilized within the scope of the present disclosure. The task-specific candidate subset 1234 may be selected from the overall task-specific set of candidate systems for the second task in a random manner or according to another selection protocol. In some implementations, candidate systems that have assignable resource capacity are eligible for inclusion in the task-specific candidate subset 1234.

After selection of the task-specific candidate subset 1234, the load balancing task assignment 1232 may comprise assigning the second task to a candidate system of the task-specific candidate subset 1234 that has assignable resource capacity to satisfy the entire resource demand load associated with the second task (e.g., both critical and non-critical resource demand loads). FIG. 12H depicts the load balancing task assignment 1232 assigning the second task to the second candidate system of the task-specific candidate subset 1234. FIG. 12H also depicts updating of the assignable resource capacity 1236 of the second candidate system to reflect the allocation of resources for the performance of the second task. If the task-specific candidate subset 1234 includes no candidate system that can satisfy the resource demand load associated with the second task (or other task being assigned), the load balancing task assignment 1232 may include defining a new task-specific candidate subset (e.g., randomly) to attempt to find a candidate system that can support the resource demand load of the second task. In one or more embodiments, after a predetermined number of attempts, the second task (or other task being assigned) becomes assigned to the next backlog 1218.

In one or more embodiments, such as after a scheduling iteration or before a scheduling iteration, the tasks of the next backlog to be processed may be assessed to determine whether the tasks have been in a backlogged state in a manner that violates a sync policy of the scheduler/orchestrator (e.g., being in backlog for more than 10 scheduling iterations, or any quantity of scheduling iterations). In one or more embodiments, in response to determining that a task within the next backlog violates the sync policy, the scheduler/orchestrator may refrain from including the task in the next backlog. A fail command may be sent to a user or entity to facilitate addressing of the failure to assign the task.

E. Hypergraph Edge Resource Demand Load Representations and Uses

1. General Overview

As noted previously, edge systems do not normally have access to the resource usage state in real time or even near real time. Edge systems typically have smaller resource pools, which tends to result in less efficient operation with higher utilization spikes of resource consumption. Edge systems with high utilization will have excessive application queuing delays and/or application execution delays, which may limit the system's ability to execute with the required latency. Also, edge workloads are typically operating on a shared platform largely being moved from customized hardware. Users/customers generally do not have good estimates on the resource demand usage of these workloads. A predictive framework for effective demand resource load would be highly beneficial.

Accordingly, embodiments create probability distributions of edge application services/tasks demand resource load vectors and resource demand estimates. In one or more embodiments, previously characterized application services/tasks may be quickly searched to identify a known demand load resource profile that was previously created to be used as a good approximation or proxy for demand load resource estimation for a new task that does not yet have a demand load resource profile.

In one or more embodiments, good estimates for a new task resource demand load may be obtained without executing a full evaluation period for data collection. As disclosed above related to edge resource demand load estimation, embodiments can collect a repository of resource demand load usage, input characteristics (e.g., input workload for the application (e.g., the set of tasks for the application) or for a specific task, and output performance (e.g., the work that was performed by the application or by a specific task) over a time period (e.g., a 24-hour period) that can accurately determine the statistical moments of the uncertain resource demand load, which may be modeled as stochastic variables. In one or more embodiments, the data collection time creates a time period in which the application or task is operating based on initial demand resource load values that are typically provided by the user or customer. As noted previously, these values may be provided as part of the application job request (e.g., in a manifest, as part of service level objectives, etc.). However, initial demand resource load values are likely incorrect, which may expose sub-standard execution for a period of time. Embodiments herein seek to significantly mitigate the potential for sub-standard execution.

Figure 14:
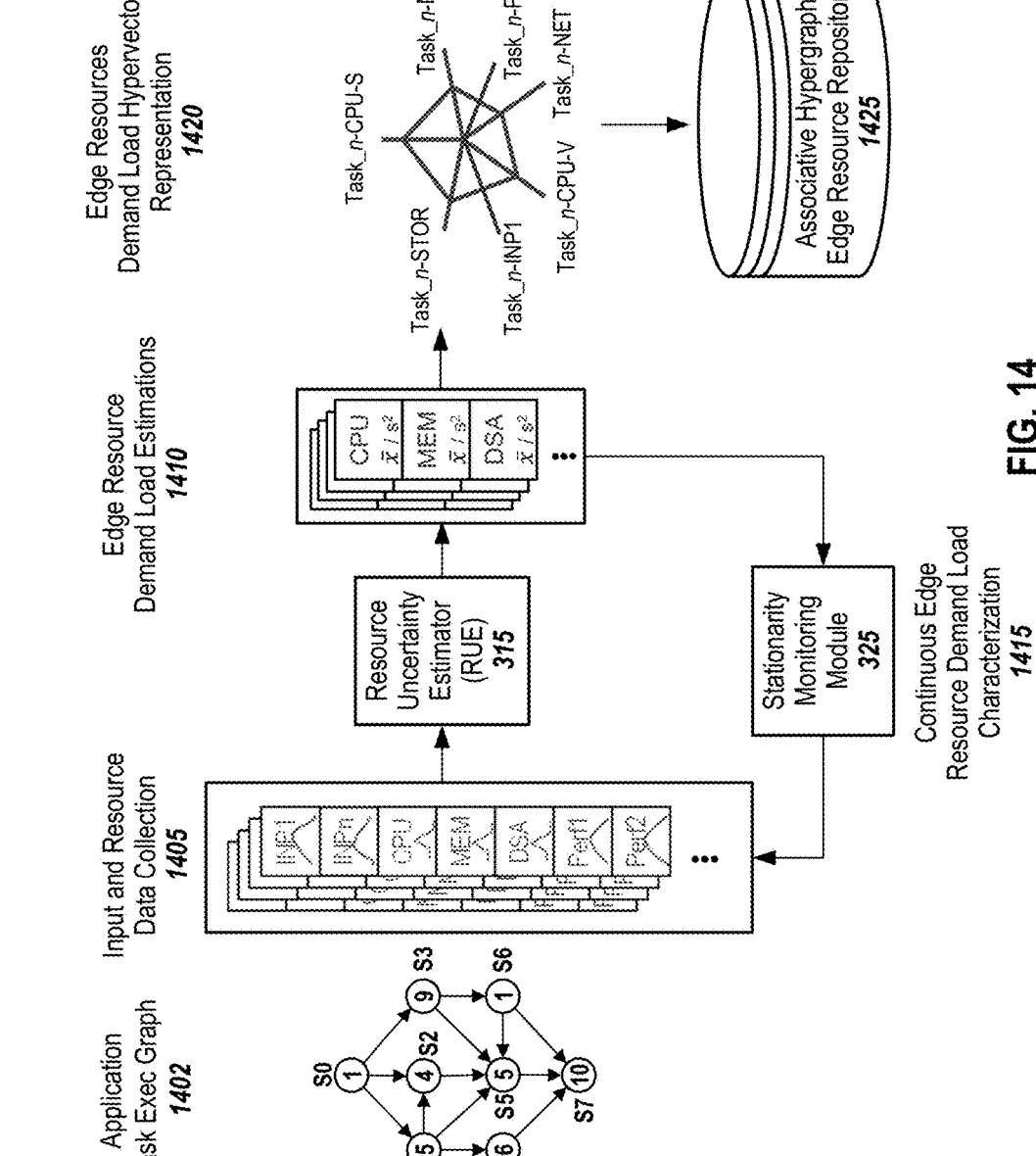
FIG. 14 graphically illustrates components and a methodology flow for generating an edge resource demand load hypervector representation for a hypergraph repository, according to embodiments of the present disclosure.

2. Embodiments of Edge Hypervector and Hyperspatial Representation Generation and Hypergraph Generation, Maintenance, and Use FIG. 13 depicts a methodology for generating an edge hypervector representation for a hypergraph, according to embodiments of the present disclosure. FIG. 14 graphically illustrates components and a methodology flow for generating an edge resource demand load hypervector representation 1420 for a hypergraph repository 1425, according to embodiments of the present disclosure. In one or more embodiments, the hypergraph repository 1425 may be a separate repository, may be the resource limits data store 350 of FIG. 3, or may be part of or integrated with the resource limits data store 350.

In one or more embodiments, an application request may be received, in which the application comprises a set of tasks (or services). The set of tasks of the application may be represented as a task execution graph 1402. Given a task from the set of tasks for the application, resource-related data 1405 associated with handling the task is collected (1305) for a set of instances of the task.

It shall be noted that resource-related data associated with handling the task may be collected from a plurality of instances of the task over an evaluation time. For example, data related to the handling of that task may be collected for a 24-hour period, and this collected data may be used in determining the resource statistics for that task. It shall be noted that other time periods may be used. The resource-related data associated with handling the task may also be collected from one edge system or from a plurality of edge systems handling the task over the same or different evaluation time periods. Note also that the methodologies herein may be performed to obtain resource demand values for each task from the set of tasks 1402 associated with the application job request and may also be performed for a set of application jobs.

In one or more embodiments, a dataset comprising the collected resource-related data 1405 associated with handling the task is used (1310) to determine resource statistics for one or more edge resources for the task. For example, as graphically illustrated in FIG. 14, the RUE 315 may take as input the collected resource-related data 1405 and use one or more statistical methodologies (e.g., M-PCM-OFFD, etc.) to determine resource statistics 1410 (e.g., mean and variance—although different measures (e.g., other measures, more measures (e.g., skewness, non-stationarity drift, etc.), or fewer measures) may be used for each resource of a set of resources (e.g., CPU, memory, storage, network, input characteristic(s), DSA, output performance, etc.). One skilled in the art shall recognize that the statistical values or moments for each resource of a task effectively form a probability density function for that resource for that task.

Given the resource statistics for the task, one or more resource demand values (or resource limits values) for one or more edge resources may be determined. For example, as discussed above in Section B, in one or more embodiments, one or more resource demand values for the task may comprise, for each edge resource of a set of edge resources: a lower control limit (LCL) for the edge resource, a mean for the edge resource, and an upper control limit for the edge resource. It shall be noted that different values (i.e., other values, more values, or fewer values) may be determined or included; for example, in one or more embodiments, the resource demand values may include skewness for one or more of the edge resource's probability distributions, drift information, one or more input characteristics for the task, and one or more output performance metrics associated with handling the task. Drift information may be obtained from stationarity monitoring, as discussed above in Section C. One skilled in the art shall recognize that drift information provides a temporal dimensionality to a hypervector representation for the resource demand for the task.

In one or more embodiments, the one or more resource demand values for the task may be formed (1315) into an edge resource demand load hypervector representation (e.g., graphically depicted as 1420 in FIG. 14). The hypervector representation 1420 may be a vector comprising the various values; alternatively, the values may be combined into a different dimensionality of values. For example, a machine learning encoder or embedder may be trained to receive the values as input and output a single value or representation, akin to word embedding or other types of embedding common in machine learning processes. Alternatively, the values may be formed into a vector that is hashed into a representation. One skilled in the art shall recognize that there are a number of ways to represent a set of data that may be used herein.

Regardless of how the hypervector representation is formed, the hypervector representation may be added (1320) to an associative hypergraph edge resource repository 1425 for future use as explained in more detail below with respect to FIGS. 15A, 15B, and 16.

Figure 15B:
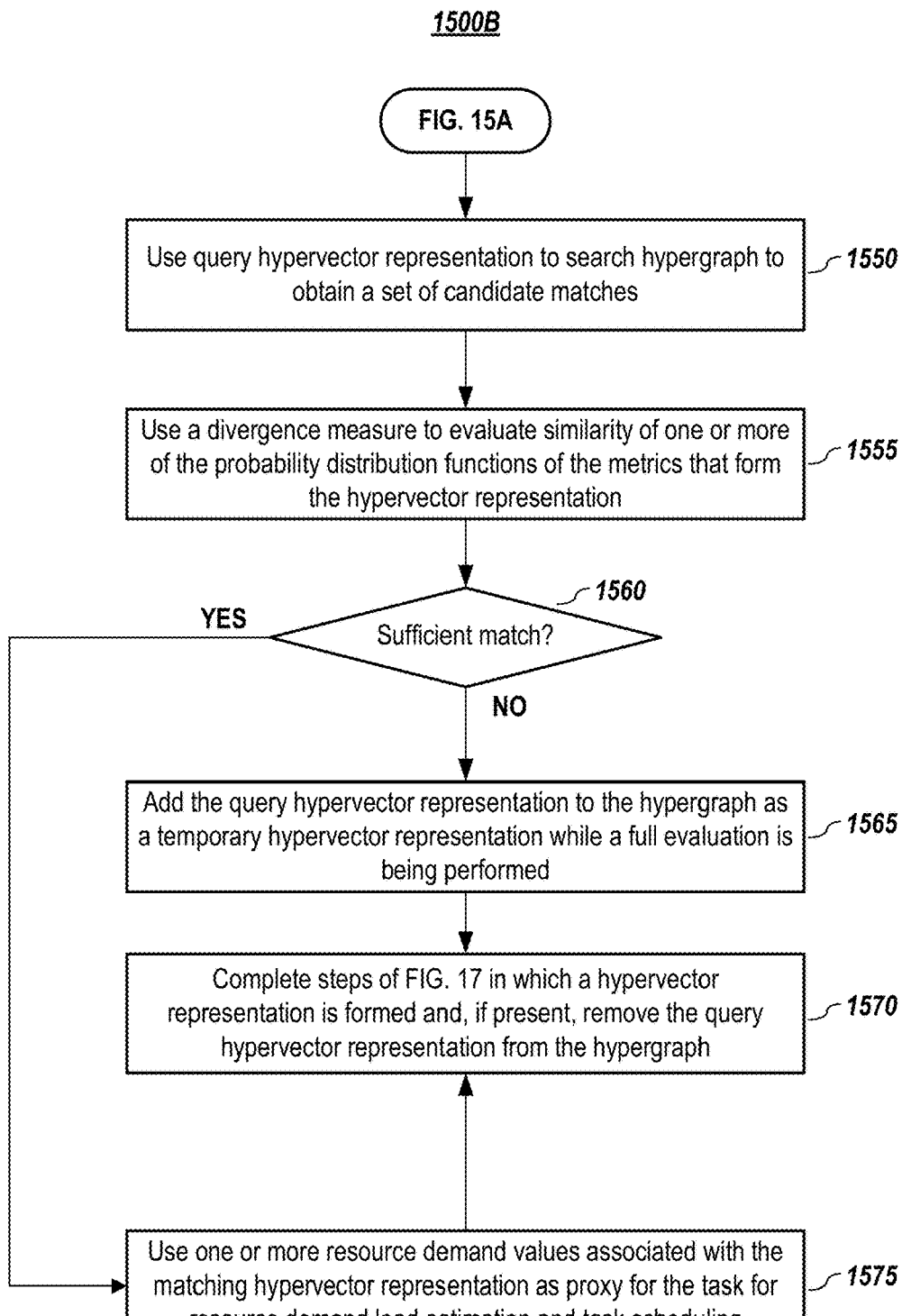
Figure 16:
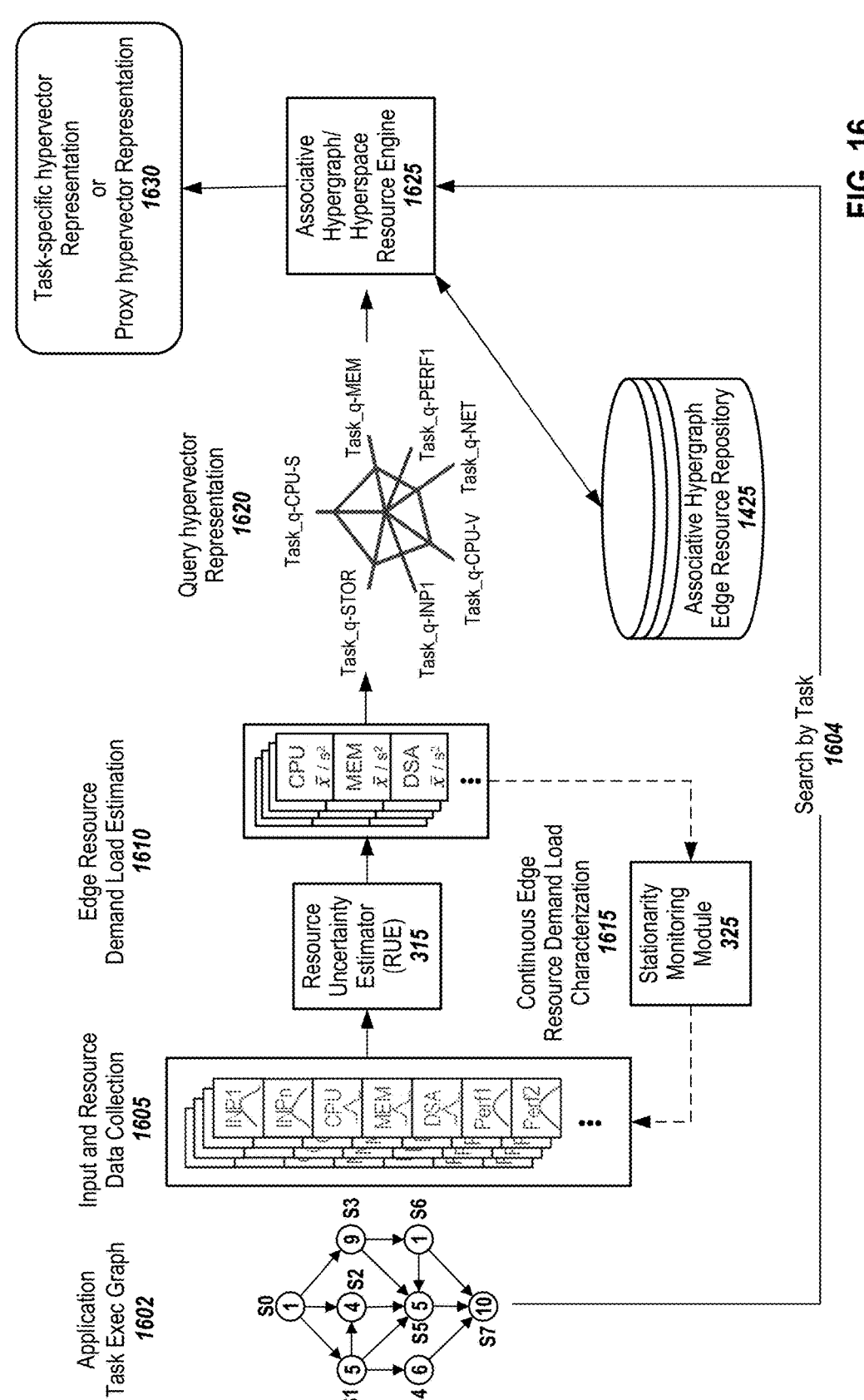
FIG. 16 graphically illustrates components and a methodology flow, according to embodiments of the present disclosure.

FIGS. 15A & 15B depict a methodology for generating an edge hypervector representation for a hypergraph, according to embodiments of the present disclosure. FIG. 16 graphically illustrates components and a methodology flow, according to embodiments of the present disclosure.

In one or more embodiments, an edge orchestrator may receive (1505) a request for a task to be performed. As noted previously, the request for a task to be performed may be an atomic task, but more commonly, the task request is part of an application request 1602 that involves a set of tasks which comprises that task.

A search 1604 of the edge hypergraph edge resource repository 1425 may be performed initially to determine (1510) whether an edge resource demand profile already exists for that task (e.g., a method of FIG. 13 has been performed and a hypervector representation for that task exists in the repository). If the hypergraph 1425 contains an edge hypervector representation for that specific task, the hypervector representation 1630 specific to that task may be output by a query module (e.g., associative hypergraph/ hyperspace resource engine 1625) that queries the repository 1425. More details about the associate hypergraph/hyperspace repository and search are provided in the next section, Section F. One or more resource demand values associated with that edge hypervector representation may be used (1515) for resource demand load estimation for dispatching the task to an edge system.

However, responsive to determining (1510) that the hypergraph does not contain an edge hypervector representation for the task, the following steps may be performed. In one or more embodiments, the task may be dispatched (1520) to an edge system using initial demand resource values. The initial demand resource values may be provided as part of the application request (e.g., in service level objectives or via other supplied information). The user-provided estimates typically are not accurate but may be sufficient to initially dispatch the task. Resource-related data 1605 associated with handling the task may then be collected (1525) for a time period (e.g., 30 minutes to 2 hours). A dataset comprising the resource-related data associated with handling the task may be used (1530) to determine resource statistics for one or more edge resources for the task, and some or all of the resource statistics may be used to determine one or more resource demand values 1610 for one or more edge resources for the task. In one or more embodiments, the resource demand values may include one or more of the resource statistics (e.g., mean, variance, skewness), drift, a lower control limit for each of the one or more edge resources, one or more input characteristics for the task, and one or more output performance metrics associated with handling the task, other data (e.g., edge system identifier, time, etc.), or any combination thereof. A query edge hypervector representation 1620 that is associated with the one or more resource demand values for the one or more edge resources for handling the task may be formed (1535). Note that, in one or more embodiments, the steps 1525-1535 mirror or closely follow the methodology of FIG. 13; however, a shorter time period is being used, which allows the edge network to be more responsive.

Turning next to FIG. 15B, the query edge hypervector representation (e.g., 1620 in FIG. 16) may be used to search the hypergraph repository 1425 to obtain a set of candidate edge hypervector representations. Example embodiments for searching the hypergraph repository are discussed below in Section F.

In one or more embodiments, a divergence measure may be used (1555) to evaluate similarity of one or more probability density functions of the resources of the query edge hypervector representation relative to each of the candidate edge hypervector representations to determine whether one of the candidate edge hypervector representations is a sufficient match with the query edge hypervector representation to act as a proxy edge hypervector representation for the task.

For example, in one or more embodiments, the probability density functions (pdfs) of the resources (e.g., CPU, memory, storage, network, DSA) and the input and output characteristics associated with the edge hypervector representation may be searched to identify a best match from the top n best matches.

A Jensen-Shannon Divergence (JSD) method, which measures the similarity of the pdfs and resolves to a metric value on the interval of [0-1] where 0=identical distribution and 1=maximally different, may be used to perform the comparisons against the top matches. JSD is a measure of the similarity and distance of two probability distributions in information theory based on mutual entropy and the Kullback-Leibler divergence. The JSD formula is shown below:

$$JSD\,(P\|Q) = \frac{1}{2}\,D(P\|M) + \frac{1}{2}\,D(Q\|M),$$

where:

$$M = 1/2\,(P+Q);$$

and

D is the Kullback-Leibler (KL) Divergence:

$$D\,(P\|Q) = \sum_{x \in X}\,P(x)\,\log\!\left(\frac{P(x)}{Q(x)}\right)\!.$$

In one or more embodiments, the top match may be identified based upon a set of one or more rules. For example, the best match may be the one with the closest overall distributions similarity as measured by the JSD values. Alternatively, some of the resources may have different weightings or thresholds in determining the best match—that is, the pdf for one resource (e.g., CPU) may require more similarity than another resource's pdf (e.g., storage). In one or more embodiments, one or more threshold levels may be set. For example, if a JSD mean value is not less than 0.05 or if a single resource component's JSD mean value is above 0.15, then the candidate hypervector representation may be dismissed as a poor match, even if it was the best overall match.

If a candidate hypervector representation is a suitable match with the query edge hypervector representation, it may act as a proxy edge hypervector representation 1630 for the task. That is, in one or more embodiments, one or more resource demand values associated with the matching proxy hypervector representation may be used (1575) for resource demand load estimation and task scheduling for the new task.

In one or more embodiments, even if a candidate hypervector representation is a suitable match with the query edge hypervector representation, the process may proceed (1570) to obtain an edge hypervector representation of the task at issue. For example, the methodology of FIG. 13 may be used to form an edge hypervector representation for the task, which can be stored in the hypergraph.

In one or more embodiments, responsive to determining that none of the candidate edge hypervector representations is a sufficient match with the query edge hypervector representation, the query edge hypervector representation may be added (1565) to the hypergraph as a temporary edge hypervector representation. By adding the query edge hypervector representation as a temporary edge hypervector representation, when another instance of the same task is received, the query edge hypervector representation may be used for resource demand load estimation and task scheduling.

Because the query edge hypervector representation is based upon limited data collection, in one or more embodiments, a more complete data collection may be performed to obtain a more accurate/representative edge hypervector representation. Thus, the process may obtain (1570) an edge hypervector representation of the task at issue by using a methodology such as that depicted in FIG. 13, and this non-query edge hypervector representation replaces the temporary query edge hypervector representation for the task in the hypergraph.

In one or more embodiments, the process of collecting data for the non-query edge hypervector representation may involve restarting the collecting process (e.g., a full 24-hour data collection period) or may include some or all of the data used to form the query edge hypervector representation (e.g., the data collected during a 30-minute or 2-hour data collection period). In any event, at completion of an edge resource demand load estimation process, for all resource vectors for the task, the output statistics, such as the mean and variance, are recorded for future operations processes (e.g., for dispatching/scheduling when a request for that task is received again). As noted previously, other resource demand values may also be recorded and associated with the edge hypervector representation for that task, such as a lower control limit that reflects the minimum level of resource recorded that maintained service level objective(s), input characteristic(s), output performance, skewness, drift, etc.

While not depicted in FIGS. 15A & 15B, in one or more embodiments, edge hypervector representations may be shared across a larger region of an edge ecosystem. For example, while a local edge orchestrator may maintain a hypergraph of edge hypervector representations handled by edge sites within its domain, it may share some or all of this information with other edge domains, core domains, cloud domain, and/or with a global edge orchestrator (e.g., global edge orchestrator 235 of FIG. 2). Thus, in one or more embodiments, if a local edge orchestrator does not have a resource demand estimate profile for a new task, it may check whether a peer local edge orchestrator has one and may use it before searching for a proxy hypervector representation in a hypergraph. Similarly, query hypervector representations may also be shared, thereby further accelerating the processing by not requiring a short-term data collection time period. In one or more embodiments, the resources of edge systems and other relevant processing factors (e.g., SLOs) may be considered when looking at peers for resource demand estimate profiles.

One skilled in the art shall recognize that embodiments herein provide several benefits. For example, embodiments improve the application/task demand resource load profiling process by early operation of a task by rapid scheduling to an edge system with no time delay or almost no time delay. Second, overall system stability is increased because if an edge hypervector representation exists, it contains representative values based upon actual collected data that may be continually monitored and updated, and if an edge hypervector representation does not exist, a good proxy may be obtained after a short period of evaluation. Third, the overall system stability will be improved because eventually all tasks that have been handled will have derived application/task demand load resource profiles to use that are more accurate than current approaches (e.g., using customer service level objectives data). Fourth, embodiments are very computationally efficient in comparison to other alternatives (e.g., AI/machine learning alternatives) for comparing the pdfs. For example, the Jenson-Shannon Divergence process is computationally efficient, which helps the edge orchestrator promptly ascertain a good proxy edge hypervector representation so that the task can be scheduled based upon realistic resource demand estimates. Fifth, embodiments skillfully leverage mutual information characterization of other tasks to be applied to other unique signature and application analysis that may characterize other application parameters for use in operational processes. Sixth, embodiments contemplate the vast scale of tasks that must be handled in edge environments so that they can be characterized through application/task resource demand load estimation processes. Embodiments lower the number of characterization processes of demand load resources by a significant number based on edge platform deployment patterns. If a large number of application tasks are duplicates deployed to other sites, embodiments may comprise sharing such information (e.g., sharing edge resource repository information or combining it at higher levels, including at a global level), which lowers the number of collections and characterizations of resource demand load estimates that need to be performed. One skilled in the art shall recognize other benefits, which are not enumerated here for sake of brevity.

F. Embodiments of Associative Hyperspace Resource Demand Knowledge Management

1. General Overview

As noted previously, in edge environments, the scheduling processes are much more challenging—making demand load resource estimation and its accuracy an important factor for edge platform execution environments. It is also important to efficiently represent the complex network behaviors of edge nodes. The prior section introduced the use of edge hypervector representations and hypergraphs as solutions to help leverage historical data to support the accuracy of the estimates.

The absence of good estimates of resource demand usage of edge workloads represents a serious problem that can directly affect the stability of the edge platform operations. While past operations may be monitored to help gain insights, observations conducted over longer timescales tend to reveal that handling of tasks for applications is non-stationary. As a result, naïve observation of past operations is insufficient—periodic or continuous re-evaluation may be required to more accurately understand current resource demand usage.

However, even regular re-evaluation may not be sufficient given the number and complexity of tasks and edge systems. Accordingly, as used in the prior section, embodiments leverage semantic information represented in one or more complex hypergraph spaces to better estimate resource demand usage. By gathering knowledge around semantic relationships related to edge nodes and edge resources, such a knowledge management system not only captures structural representations but also the behavior of these applications. Over time, this information helps to support the analytic ability of the knowledge management system and its semantic search, and may be integrated with continuous testing to help to determine the statistical degree of validity of resource demand load estimates. Such a knowledge management system helps avoid strong assumptions that can lead to erroneous interpretations and poor edge performance.

Accordingly, in one or more embodiments, edge platform monitoring capability may include a knowledge management system that comprises a semantic hyperspace representation of historical applications behaviors and dataset analysis. It provides an analytics capability to support continuous testing in determining the statistical degree of validity of the resource demand load estimate by leveraging a qualitative semantic distance that may be evaluated in a just-in-time manner.

2. Embodiments of Associative Hyperspace Resource Demand Knowledge Management

An important aspect of edge ecosystems is to provide a stable execution environment for applications. In one or more embodiments, an edge orchestrator may use a deployment pattern of elastic resource execution. An edge orchestrator may deploy tasks with a minimum guaranteed resource level and a maximum not-to-exceed resource level, with the average of these levels providing an average level of execution. When an edge platform has the correct output statistical characterization (e.g., first and second moments (i.e., mean and variance)), stable operation within SLO can be achieved and maintained.

Complex heterogeneous edge deployments tend to be highly distributed and networked with many-to-many interactions between the edge nodes. While a hypergraph representation is a good modelling methodology, embodiments herein extend the hypergraph representation methodology to incorporate the concept of a hyperspace and hyperspace representations. The extension of dimensionality to form hyperspace representations may be along one or more dimensions, such as time, type, geography, drift, node interactions, etc. Furthermore, in one or more embodiments, edge nodes may be abstracted or considered as agents in a multi-agent system, in which such nodes are viewed as cooperating computing systems. Such a paradigm allows for the capture of semantic data/metadata, such as the resource-related dimensions of a hypervector as discussed in the previous section (although it shall be noted that various values (i.e., measures/parameters/dimensions/etc.) may be excluded, included, etc.).

FIG. 17 depicts a methodology for generating hypervector/hyperspace representations that may be used in edge operations, according to embodiments of the present disclosure. In one or more embodiments, for each edge system from a set of edge systems, an edge hypervector representation for handing a task at the edge system is obtained (1705). It shall be noted that while the illustrated embodiments center on tasks, edge hypervector or hyperspace representations may be generated based upon different criteria.

The edge hypervector representation may be generated by collecting resource-related data associated with handling the task at the edge system and using a dataset comprising the resource-related data associated with handling the task to determine resource statistics for one or more edge resources for the task. Note that the dataset may contain more data, such as historic data, data from other sites, etc. One or more resource demand values for one or more edge resources may be determined or computed using one or more of the resource statistics.

Embodiments may leverage, for each of the probability density functions, the resource uncertainty estimation framework, which may be a component of an edge orchestration system resource allocation/scheduling system, to accelerate the estimation of the demand load usage statistical moments (e.g., mean and variance) and may leverage a continuous stationarity test module. Integration allows reinforcement of the estimates with better accuracy and precision. For example, the RUE may take as input collected resource-related data and use one or more statistical methodologies (e.g., M-PCM-OFFD, etc.) to determine resource statistics (e.g., mean, variance, and skewness—although different measures (e.g., other measures, more measures, or fewer measures) may be used for each resource of a set of resources (e.g., CPU, memory, storage, network, DSA, etc.), as well as other metrics, such as input characteristic(s) and output performance. In one or more embodiments, a hypervector representation may comprise these statistical values, may comprise values derived from the statistical values (e.g., LCL, UCL, etc.), or some combination thereof.

In one or more embodiments, an edge hypervector representation may comprise stationary drift data related to at least one of the resource statistics. In Section C (above), stationarity evaluation embodiments were presented that monitor drift of one or more values. When drift is detected as having occurred, adjustments may be made to ensure the accuracy of estimates. The short-term challenge is having the orchestrator obtain an accurate estimate of resource demand load for scheduling selection of edge endpoints. Embodiments of this section extend the process of detecting stationary state by integrating the knowledge accumulated with the continuous capture of the applications operations and behavior over time and/or by looking at metrics at varying levels within the edge ecosystem (e.g., near edge, far edge, edge domains, core domains, cloud domains, etc.). In one or more embodiments, drift information may be integrated into a representative hyperspace to be leveraged for operational processes, such as monitoring, scheduling, continuous edge resource demand load characterization, etc.

In one or more embodiments, the edge hypervector representation may also include data from historical data. For example, historical data may be analyzed (e.g., for trends, patterns, self-similarity, drift, etc.), and this information may be included in or with the edge hypervector representation.

Returning to FIG. 17, one or more hyperspatial representations for a task may be created (1710). A hyperspatial representation for the task may be generated based upon one or more dimensionalities. Semantic distance may be used to qualitatively measure one or more relationships between the probability elements defining the hyperspace.

A hyperspace knowledge base may be used to represent a complex set of resources (CPU, memory, accelerators, networking, storage, etc.) as a multidimensional space, correlated with an input function from multiple sources of data (e.g., an average of 4 to 5 dimensions). The output dimensions may include service level objectives correlated with the resource representations. A task or an applicant may have an accurate and unique representation created as a probability hyperspace, which may be used in operations, such as discussed in Section E, above. Such embodiments support the leveraging of these associations with a smaller dataset (e.g., 30-minute collections versus a 24-hour collection) and execute against this knowledge management system, enabling a better performance result compared to using often inaccurate customer estimates. This enabling function provides an associated hyperspace representation of applications, their workloads, their output, and their performance. An indexing system may be used based on hyperdimensional computation to enhance searching speed and accuracy. The hyperspatial representations may be indexed based on high dimensional vector representation of the space. In one or more embodiments, the hypervector space may be clustered based on the space distributions creating a hyperspatial tag that is searchable and unique.

Figure 18:
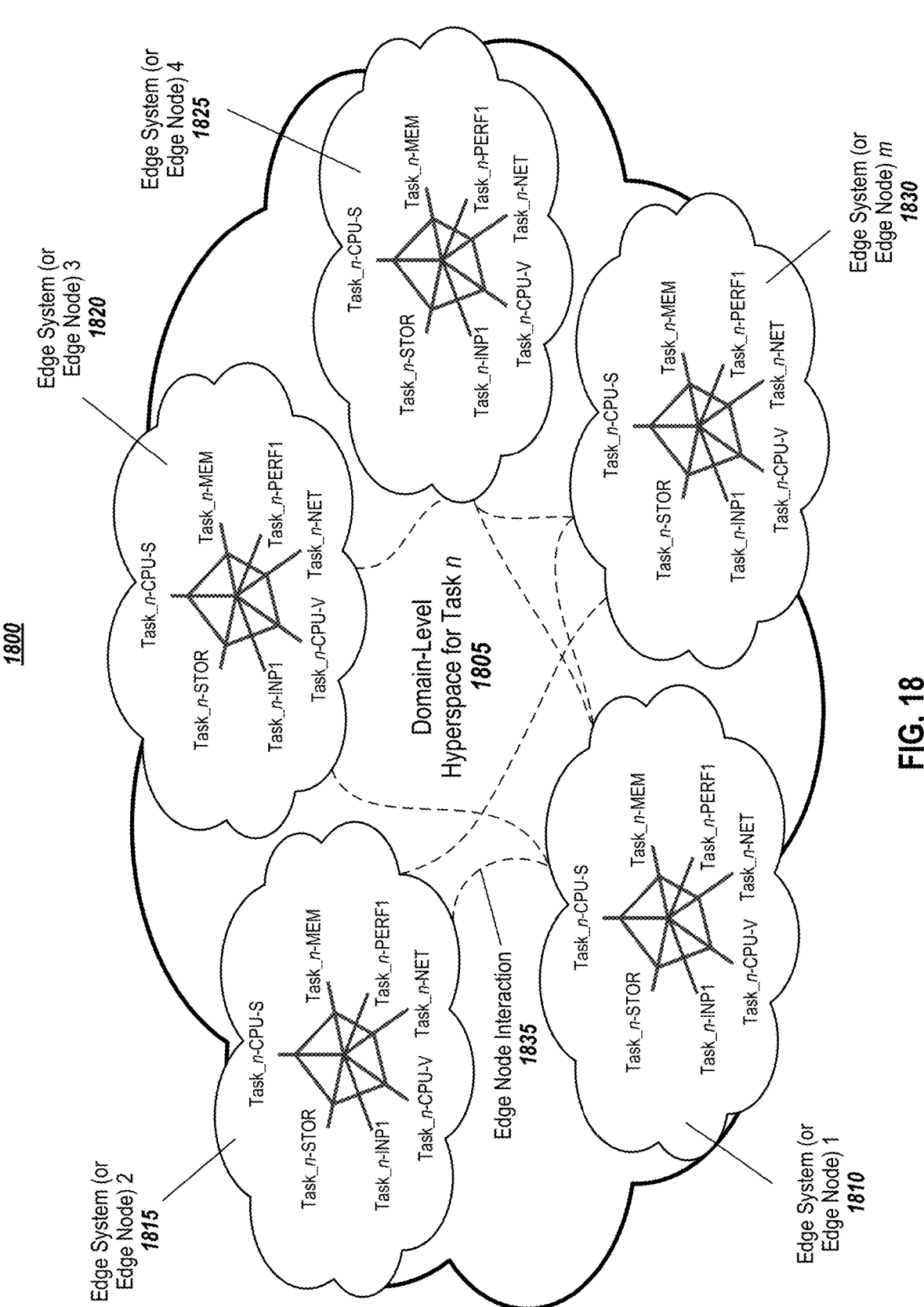
FIG. 18 illustrates the edge demand load using a hyperspace knowledge structure, according to embodiments of the present disclosure.

For example, as depicted in FIG. 18, a higher-tier edge hyperspatial representation for a task may be formed from a set of lower tier edge hypervector and/or hyperspace representations. FIG. 18 illustrates the edge demand load using a hyperspace knowledge structure, according to embodiments of the present disclosure. The multiple dimensions illustrated (seven in this case as an example but it could be many more) offer a view into the many-to-many interactions, and the figure shows how this forms a space.

A hypervector representation for a task (i.e., task n) has been obtained for each of a set of edge systems 1810-1830. The edge systems may be edge systems of a common edge domain. A combination of these hypervector representations form a domain-level hyperspace 1805 for task n. The hyperspace may be a cluster of the hypervectors.

In one or more embodiments, the hyperspace 1805 may be represented by a single representation (e.g., a hyperspace representation vector may be an average of all component hypervector representations, a tag/index, or other methods including machine learning encoding or embedding, etc. may be used).

In one or more embodiments, as graphically illustrated in FIG. 18, the hyperspace may include additional data/metadata, such as interactions 1835 between nodes.

Figure 19:
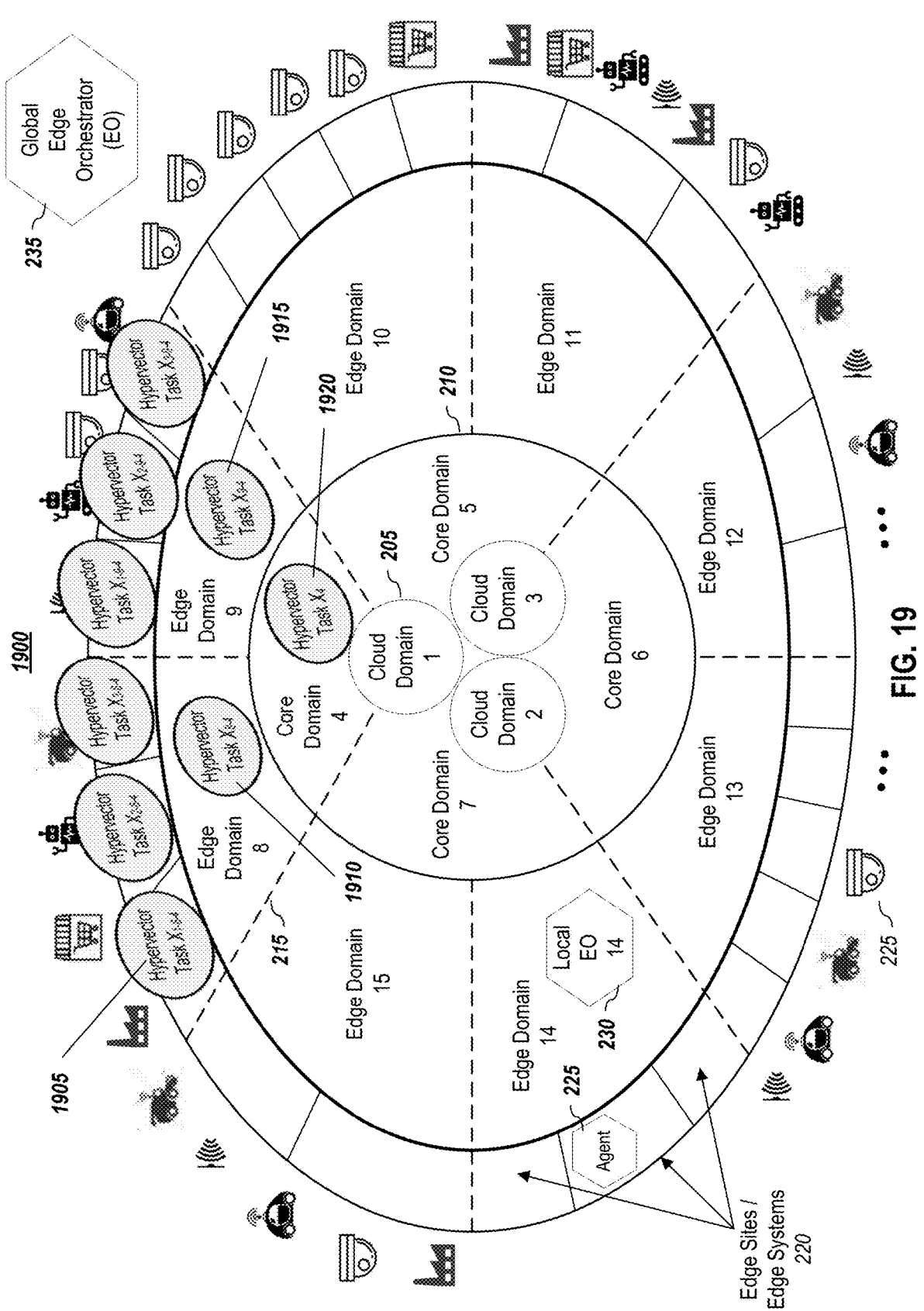
FIG. 19 depicts a set of hypervector and hyperspatial representations for task X, according to embodiments of the present disclosure.

Note that this tiering process may be repeated through one or more additional levels. By way of additional example, FIG. 19 depicts a set of edge hypervector and hyperspatial representations for task X, according to embodiments of the present disclosure. For example, hypervector representation 1905 represents task X for edge site 1 of edge domain 8 of core domain 4 (hence the hypervector index of 1-8-4). These lowest tier representations may be formed into a hyperspace at the domain level (e.g., hyperspatial representation 1910, which represents edge domain 8 of core domain 4). And, the edge domain level hyperspatial representations (e.g., hyperspaces 1910 and 1915) may be formed into a core domain hyperspace for task X (e.g., hyperspace 1920). In one or more embodiments, the global edge orchestrator 235 may contain a repository of all representations and may share some or all of the repository with domains in the edge ecosystem 1900. Note that, in one or more embodiments, geographic information or network location related information may be included in or with the representations.

Figure 20:
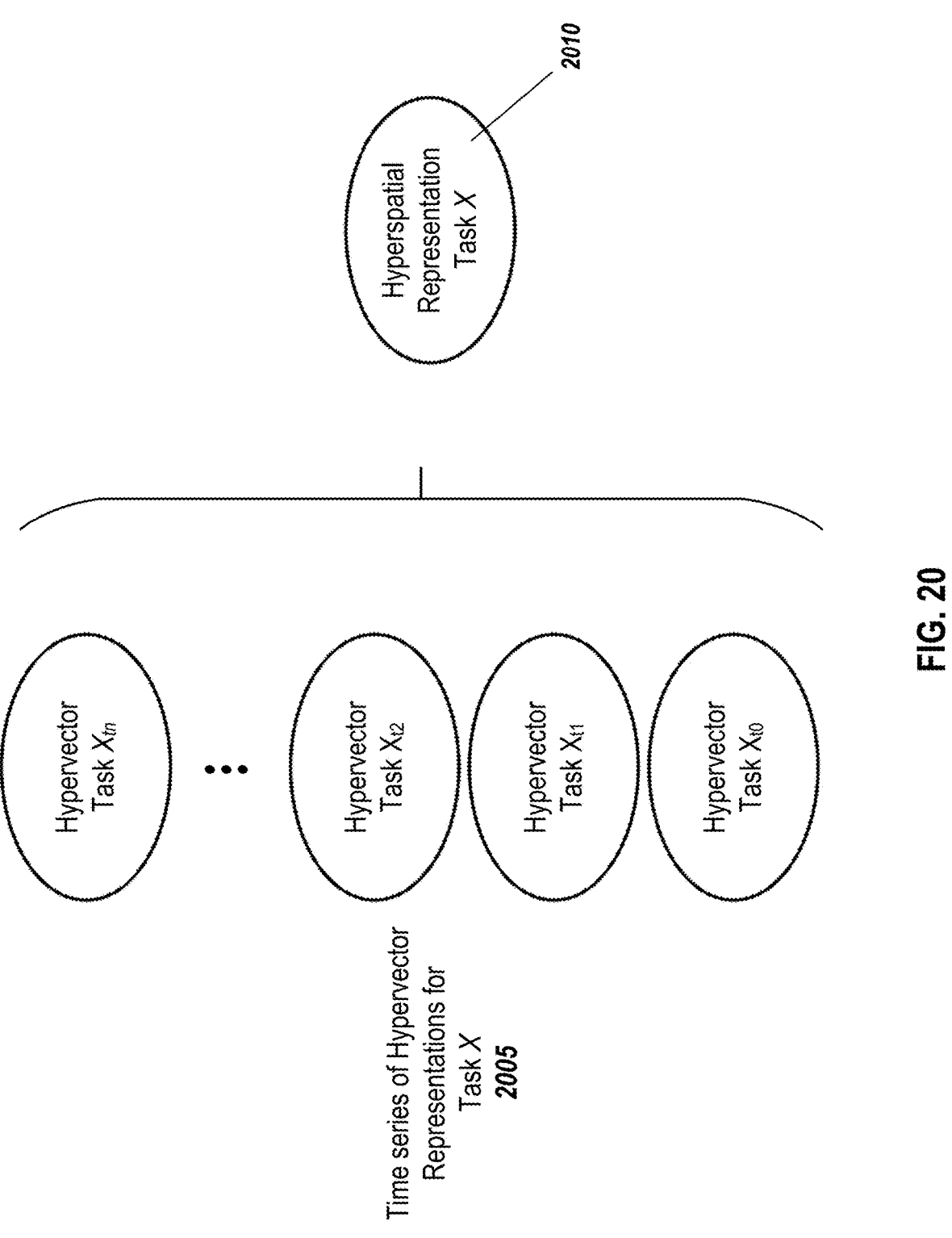
FIG. 20 graphically illustrates an example of a time series of hypervectors for a task (e.g., task X), which may be formed into a hyperspatial representation, according to embodiments of the present disclosure.

By way of yet another example, a time series of hypervector or hyperspatial representations may be formed into hyperspace(s). As noted above, such information can be useful to determine shifts over time within an edge system. FIG. 20 graphically illustrates an example of a time series 2005 of hypervectors for a task (e.g., task X), which may be formed into a hyperspatial representation 2010, according to embodiments of the present disclosure.

It shall be noted that while the hyperspaces were formed along the task metric, one or more different dimensions may be used to form hyperspaces. These hyperspaces may be formed in addition or as an alternative to hyperspaces formed based upon different dimension(s). Furthermore, hypervectors and/or hyperspaces may be formed into hyperspaces using one or more clustering methods, such as k-nearest neighbor clustering, hierarchical clustering, k-means clustering, distribution-based clustering, centroid-based clustering, density-based clustering, grid-based clustering, mixture model clustering, affinity propagation clustering, etc.

Returning to FIG. 17, the various hypervector/hyperspaces be indexed (1715) in the database or repository. Several methodologies exist for indexing data repositories and for graphs or hyperspaces. In one or more embodiments, one or more hashing functions may be used to index the representations. Indexing helps facilitate rapid searching, which is important both for the timing of the operational decision-making in the edge ecosystem and given the vast dimensionality of the hyperspace(s).

Given the indexed hyperspace(s), query searches may be performed (1720) using the hypergraph/hyperspace repository to obtain information for one or more operational processes in the edge environment. For example, the methodologies discussed in the prior section may query such a repository when trying to estimate metrics to help with scheduling.

Figure 21:
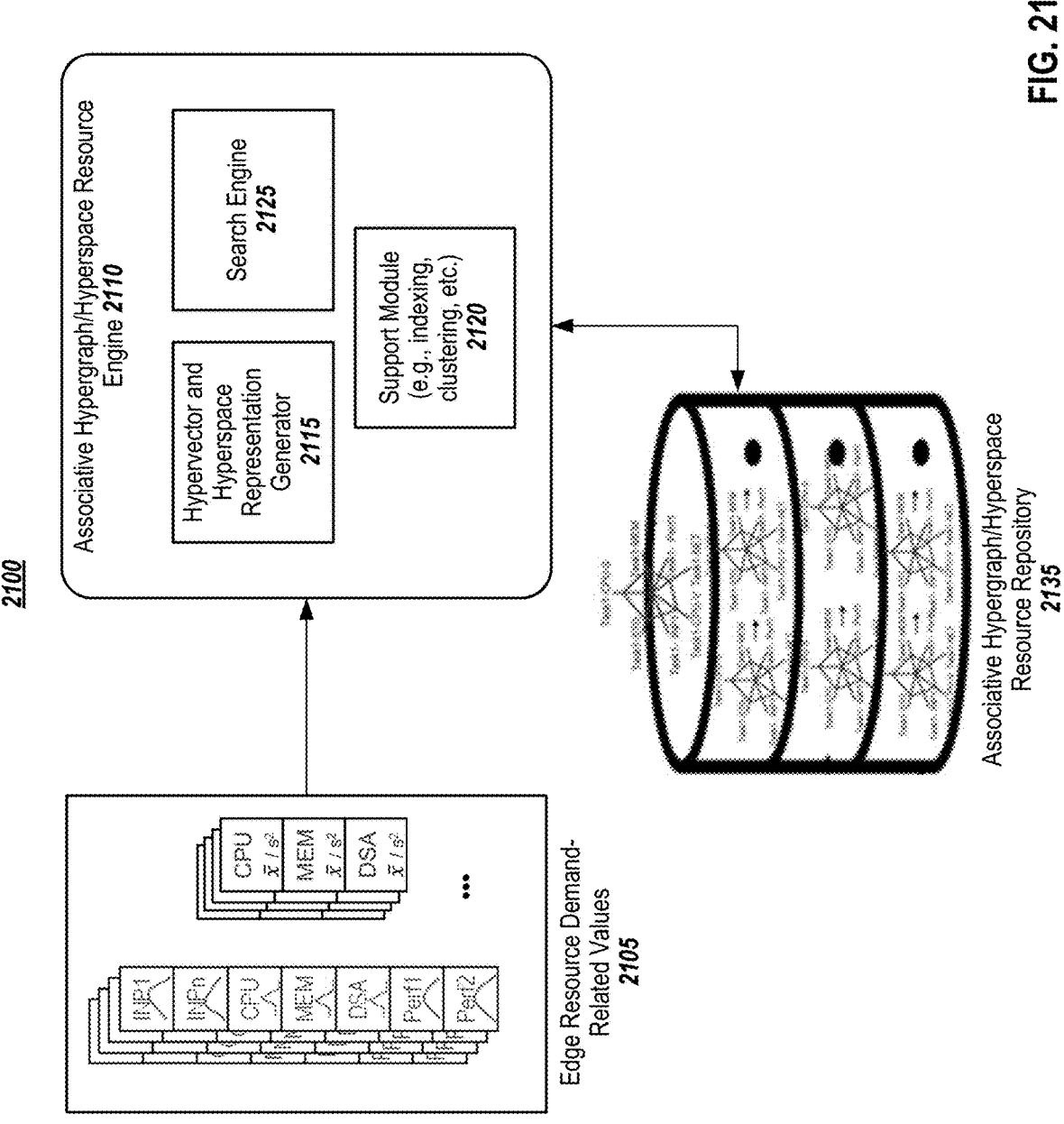
FIG. 21 depicts a system and flow for hypervector/hyperspace generation and management, according to embodiments of the present disclosure.

FIG. 21 depicts a system and flow for hypervector/hyperspace generation and management, according to embodiments of the present disclosure. As shown, edge resource demand-related value 2105 (and/or other collected or generated data) may be input into an associative hypervector/hyperspace resource engine 2110. In one or more embodiments, the engine 2110 may reside within one or more edge orchestrators.

In one or more embodiments, the engine 2110 may comprise a hypervector and hyperspace representation generator 2115 that may perform one or more of the methods described herein to generate hypervector representations, hyperspaces, and hyperspace representations. A support module 2120 may perform supporting functions such as clustering, indexing, etc. The engine 2110 may also comprise a search engine 2125. The search engine 2125 may provide an interface for searching a hyperspace/hypergraph and returns relevant results, if any. In one or more embodiments, the search engine 2125 may comprise a number of search and search-related functions for querying an associative hypergraph(s)/hyperspace(s) resource repository 2135. As illustrated, the repository may comprise tiers of hypergraph(s)/hyperspace(s).

In one or more embodiments, the search engine may comprise or perform a plurality of search or search-related functions. For example, the search engine may comprise a comparator that examines various factors when determining search results. The functions and factors may be performed at different stages or under different conditions-such as using semantic distance of representations to obtain an initial set of candidate representations and then may perform divergence analysis of distributions associated with those representations to further refine the search. Thus, the search engine 2125 provides hyperspatial search based on high dimensional hypervector computation for fast and computationally efficient searching. In one or more embodiments, hardware acceleration (e.g., using GPUs) may be employed to simulate the hyperspatial representation in a high dimensional vector space and provide faster results.

It shall be noted that embodiments herein comprise a number of benefits. First, using multidimensional spaces is beneficial. For example, multidimensional spaces can carry data/metadata, long-term observations, and behavioral aspects, as well as complex relationships, such as many-to-many relationships between the spaces and what those spaces represent (e.g., components). In one or more embodiments, semantic search capability provides a platform to make both broad and specific semantic queries.

Second, multiple dimensions/spaces related to edge systems may be considered separately and/or concurrently by the hypervectors and hyperspaces. Using hyperspaces allows for representation of a space with random and/or related components.

Third, using represented hyperspace(s) allows for qualitatively computing the semantic distance between datasets during short-term and long-term observations.

Fourth, the complexity of the random and/or related relationships and composition of the multidimensional spaces and the rich semantic metadata that is gathered during an observation or observations can be captured by the hyperspaces and can be accessed using the various search capabilities.

Fifth, insights via hypervector representations and/or hyperspatial representations of all aspects (e.g., input, output, performance, and resource consumption) of application operation (or its component tasks) based on statistical characterization can be readily access using an indexable knowledge base of applications (and/or tasks). This repository can provide valuable data and insights that may be used for a variety of planning and operational uses.

G. Embodiments for Edge System Resource Capacity Dynamic Policy Planning

1. General Overview

Resource system capacity planning is an important function for edge system endpoint and control zones to meet availability and performance objectives. Control zones may be defined as systems where edge orchestrator(s) and centralized functions operate.

Edge workloads may primarily be data processing, device management, analytics, computer vision, inferencing, and networking in nature. Edges also manage mobility and operate across wide area networks, which adds dynamic challenges. Edges also operate in heterogeneous hardware environments with wide variance of hardware performance. All of this differs from workloads for cloud and IT. These workloads are primarily workloads initiated and controlled by human-machine interactions (e.g., e-commerce, search, web services, IDE, IT, AI training, etc.). Thus, the cloud and edge workloads have fundamentally different execution patterns.

The workloads also have different interarrival patterns. Cloud/core workloads typically manifest uncoordinated behavior, which is statistically desirable behavior as it causes smoothing at scale. Edge workloads tend to experience much more coordinated behavior as they operate in unison, timed with workdays, store hours, security events, networking events, system malfunctions, etc., which may cause unpredictable spikes in performance over unpredictable time cycles. This behavior does not smooth with scale; generally, it will tail distribute as scale increases. Lastly, there is ample documentation that modern workloads have a trend of self-similarity, which is also reflected in both Internet traffic and mobile telecommunications access. This environment also creates a challenging environment to perform trend analysis on system resource capacity. The implications are that edge system capacity can significantly benefit from an elegant and dynamic resource allocation framework or frameworks for workload demand load.

Accordingly, embodiments herein help predict edge system resource capacity. Edge endpoint system resource capacity may be defined as the level of capacity of an edge endpoint system, which considers the resources of the edge system, such as the number of CPU cores, bytes of memory, bandwidth of networks, bytes of storage, memory of a GPU/FPGA of a domain specific accelerator, etc. The resource capacity may be defined per information handling system, which are deployed at edge sites. An edge site may be considered as a location with a collection of one or more systems serving a set of workloads across multiple use cases and a limited number of business verticals. Note that an edge site may serve multiple edge sites in a hierarchical order. For example, a near edge system may serve or interact with a plurality of far edge systems.

As illustrated previously (e.g., FIGS. 1 and 2), edge sites may be organized into domains/zones under the control of an edge orchestrator, and the entire platform may be controlled by a federated controller (e.g., a global edge orchestrator). The edge endpoint system resource capacity may be assessed at the site level as the workloads are highly determinant in the consumption of edge system resource capacity.

Each system's resource capacity is utilized by applications that are deployed, which had demand load usage (i.e., level of system resource capacity required by the workload to execute). The rate that the capacity is consumed may be based on several properties, such as the demand load usage execution patterns, which may be statistically characterized (see, for example, Sections B-E, above), and the arrival/departure pattern statistical properties, which may be based on queuing theory. An edge endpoint system resource capacity is typically consumed on a non-linear system basis that may be modeled as fractal dimensions at a given blocking probability.

Accordingly, presented herein are embodiments that use fractional calculus and wavelets to develop a system resource characteristic or characteristics that are specific to an edge site and, given a platform-derived service level objective of a blocking probability, can provide an estimate of served resource load for system capacity management planning. This information enables edge platform operators to perform trend analysis and accurately predict system exhaustion and associated capital investment requirements.

The following provides system design parameters and some of the rationales:

For edge platform managed systems, forecast planned capacity requirements (including a resource margin to enable application elastic executions resource) are important to predict system exhaustion and replacement.

Factors such as application interarrival distributions, execution distributions, and departure distributions may affect offer load characteristics.

Currently, most solutions are dependent on Poisson or similar predictable statistical point processes (e.g., independent and identically distributed (IID) random exponential arrival distributions and normal distributed execution times), which does not accurately reflect operations of edge systems.

Stationarity may be considered as a function of the evaluation interval. In short range analysis, the assumption of at least weak-stationarity (e.g., first moment) may be assured, but over the long-range timescales for system resource capacity should be assumed to be non-stationary.

Use of regression methods (e.g., linear or logistic) and/or machine learning (ML)/neural network (NN) trained on historical data are largely ineffective due to:

(1) regression requires either normally distributed data or a very large sample set;

(2) there exist several studies of modern applications that indicate the arrival and execution patterns are autocorrelated and Alpha-stable scaled (e.g., self-similar long-range dependence), which should be analyzed using non-linear fractal dimensional analysis;

(3) the system level telemetry of resource usage is of high dimensionality due to multiple resources (e.g., CPU/memory/storage/network/etc.), multiple logical/virtualized resources, and/or partition systems that contribute to system resource utilization. Therefore, effectively training a ML technique is largely untenable (e.g., support vector machine (SVM), boosting, autoencoders, etc. are unlikely to converge with high state space); and (4) the resources characteristic usage is continuous valued but discrete in time and stationary over short periods of time, but non-stationary over the long-range forecast interval.

Accordingly, in one or more embodiments, a multi-fractional spectrum (e.g., fractional exponent/Hurst parameter or exponent) may be determined. Wavelets may be employed to determine the fractional order derivative and linear regression parameters to determine first order parameters for a prediction model. In one or more embodiments, a characteristic prediction model may be based on interarrival and the derived parameters to predict performance. A policy may be used to select equation parameters based on derived Holder or Hurst exponent and parameters such as periodicity/statistical parameters. Hardware acceleration may be used to accelerate the wavelets and model parameter estimation.

In one or more embodiments, the outcome may be at varying levels (e.g., edge-site-level and domain-level) of resource characteristics that can estimate the level of demand resource load/usage that can be supported by resource capacity at a given blocking probability. The edge site level may be calculated across all servers at an edge site, and the domain level may be run on an edge domain across all servers within the edge domain. Predicted system utilization may also be calculated from this characteristic. The resource characteristic may be modeled as a non-linear function of system resource capacity versus demand resource load/usage for a given blocking probability establish by the platform SLO.

2. Embodiments for Edge System Resource Capacity Dynamic Policy Characterization and Planning Embodiments herein enable the characterization of non-linear and non-gaussian resource demand load usage patterns; and from these resource demand load usage patterns, embodiments enable a predictive framework for capacity forecasting in edge systems. Note that embodiments may use customer-provided grouping by site location or domain to characterize resource demand load usage at varying levels-allowing a platform operator to understand complete view of capacity at useful levels. As the platform is upgraded and reconfigured, the capacity trend analysis may be dynamically updated.

Figure 22:
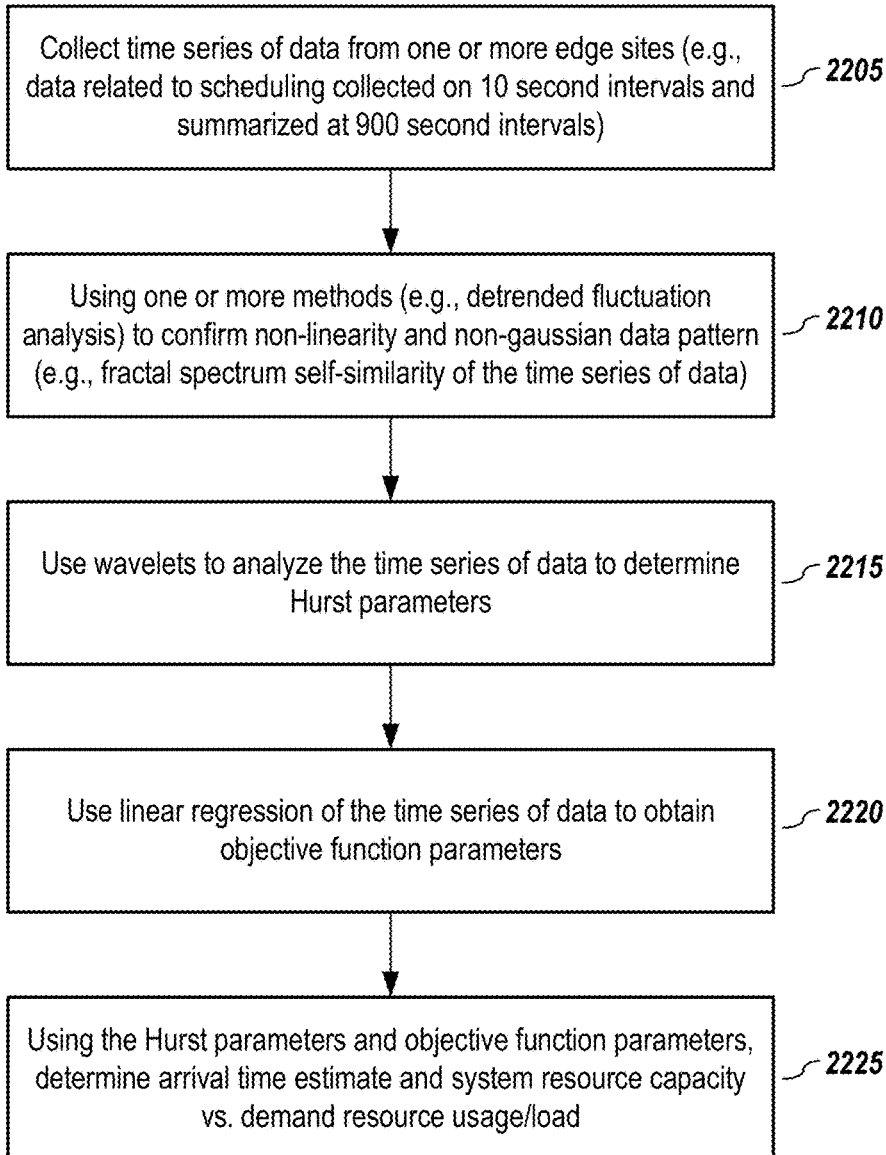
FIG. 22 depicts a methodology for determining system resource capacity versus demand resource usage or load, according to embodiments of the present disclosure.

FIG. 22 depicts a methodology for determining system resource capacity versus demand resource usage or load, according to embodiments of the present disclosure. That is, given a certain capacity of the system and blocking percentage, what is the number of tasks that can be handled by the system? In one or more embodiments, a time series of data from one or more edge systems is collected (2205). For example, data related to scheduling may be collected on 10 second intervals and summarized at 900 second intervals—although data collection and summarizing may be performed at different intervals. Data collection at short time scales and averaging the different datapoints across resource pools enables the ability to quickly identify anomalous behavior. In one or more embodiments, the collected data may be any of the types of data collected in the prior sections or may be different types of data.

Given the collected data, an edge orchestrator may perform (2210) one or more methods to confirm non-linearity and non-gaussian data pattern of the time series of data. For example, in one or more embodiments, a detrended fluctuation analysis (DFA) may be used to confirm fractal spectrum self-similarity degree of the data. The exponent obtained via the DFA may be considered similar to a Hurst exponent except that DFA is well suited for signals whose underlying statistics (such as mean and variance) are non-stationary.

If the data is linear and gaussian, then its analysis is much more straightforward; however, the nature of the edge data is unlikely to fall within this category. Having confirmed that the data is non-linear and non-gaussian data, the edge orchestrator may then use wavelets to analyze (2215) the time series of data to determine a Hurst parameter or parameters. That is, parameters for an objective function may be obtained by taking the derivative with respect to time using the fractional order derivative from fractional calculus (i.e., using the wavelets).

Figure 23:
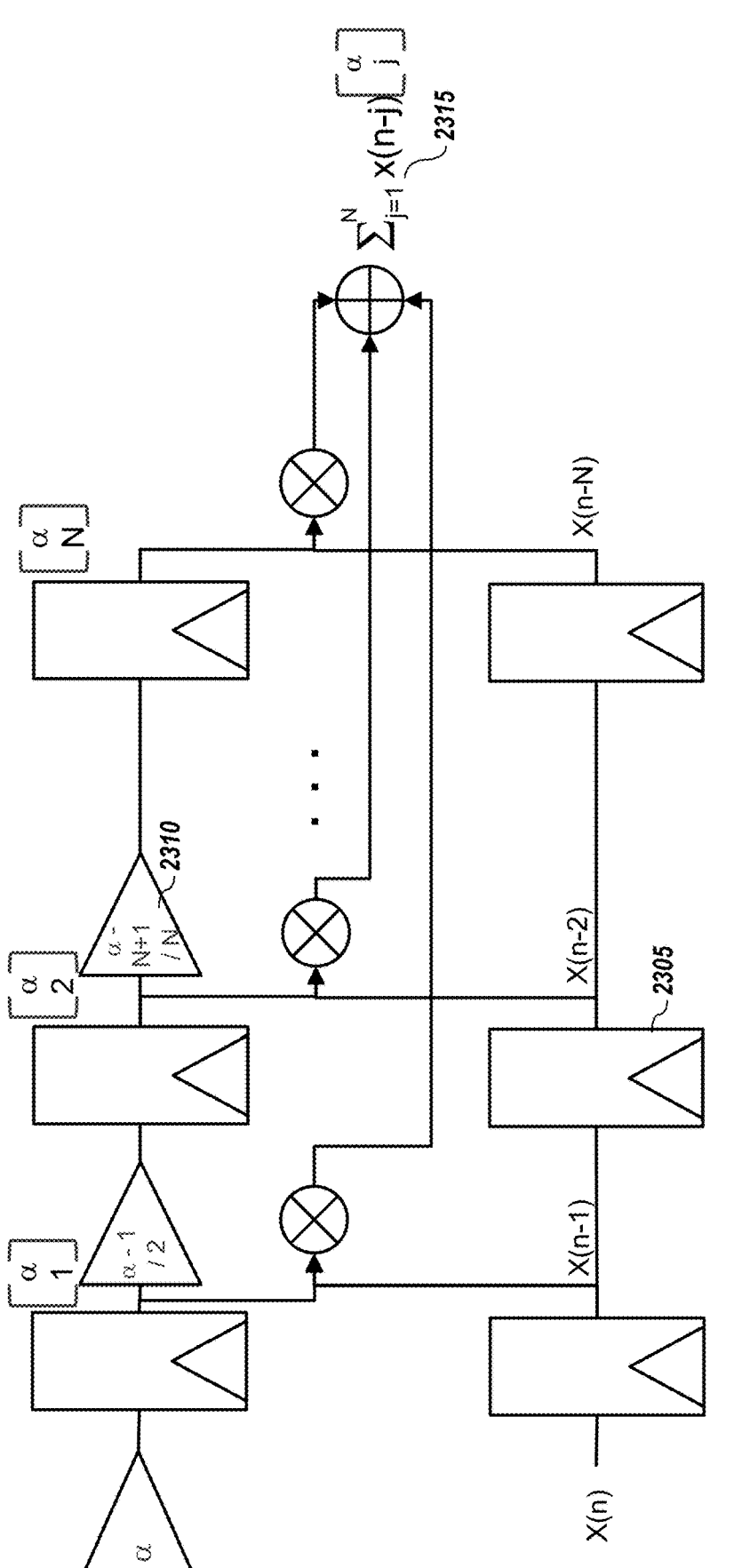
FIG. 23 graphically illustrates an example wavelet transformer, according to embodiments of the present disclosure.

Wavelets perform a type of spectral analysis and are related to Fourier transforms, but unlike Fourier transforms, they do not require a specific timeline for evaluation of the spectrum. Wavelets can determine spectral properties of complex waveforms that cannot be done by Fourier transforms. FIG. 23 graphically illustrates an example wavelet transformer, according to embodiments of the present disclosure. A wavelet transformer can derive the Hurst exponents/Fractal dimension. In the depict example, X(n) represents a set of data from the time series of data at different time scales, and $\alpha_1$-$\alpha_N$ are the Hurst parameters. The boxes (e.g., box 2305) represent filters, and the triangles (e.g., item 2310) represent mixers. The end result 2315 is obtained from a summing operation. Note that, in embodiments, the wavelet transform process may be performed offline on periodic basis (e.g., weekly basis) using the wavelet transforms to determine the fractal dimension.

Returning to FIG. 22, a linear regression of the time series of collected resource telemetry intervals may be used (2220) to provide estimates of objective functional parameters for forecasting time series of the resource load. In one or more embodiments, the objective function may be of the following form:

$$W(t+1) = aW(t) + b$$

where a and b are the objective functional parameters to be estimated using linear regression.

Given the Hurst parameters (or Holder exponents) and the objective function parameters, the following equation may be used to determine (2225) arrival time estimates of tasks and may be used to determine system resource capacity vs. demand resource usage/load:

$$\text{Estimated } X(t) = a \sum_{j=1 \text{ to } j'} (\alpha) X(t-j) + b$$

where:

$$(\alpha)_j = \frac{(a)(a-1)(a-2) \ldots (a-j+1)}{(j)(j-1)(j-2) \ldots 1}$$

$(\alpha)$=the Hurst parameter;

a and b are the objective functional parameters; and j' is the number of time series data.

In one or more embodiments, a table of data may be generated given the final estimates of system resource capacity vs. demand resource usage/load at different blocking probabilities. For example, a queuing method (e.g., Erland model) may be used, given different blocking probabilities, to generate a table. This information may be used to predict potential issues and/or for planning purposes, such as needed areas of expansion.

FIG. 24 depicts a methodology for analyzing system resource capacity versus demand resource usage/load for planning purposes, according to embodiments of the present disclosure. In one or more embodiments, the site and/or domain capacities and demands may be summed (2405) across all the site systems or domains to determine their capability. This information may be analyzed (2410) to determine degree of convergence, which is helpful in determining aspects related to the system. This information can indicate if workloads have shifted or if there is some issue degrading system performance.

For example, based upon the estimated resource capacity versus demand resource load for the edge system, analysis may be performed (e.g., trend analysis) to identify an instance in which the demand resource load will exceed the resource capacity. Based upon the analysis, one or more actions may be taken. Responsive to identifying an instance (or instances) in which the demand resource load exceeds the resource capacity, one or more actions may be taken (2415) to avoid/eliminate or mitigate effects of the demand resource load exceeding the resource capacity. For example, if the estimated data indicates a potential overcapacity issue, more edge capacity may be added to the edge network, quality of service features could be added to tasks, the blocking may be increased, etc. If aspects of the system are being underutilized, the blocking level may be reduced, more tasks may be accepted, edge capacity may be taken offline or shifted to other uses, etc.

It shall be noted that additional analyses may be performed with this generated data. FIG. 25 depicts a methodology for trend analysis to predict capacity exhaustion, according to embodiments of the present disclosure. In one or more embodiments, linear regression trend analysis may be used (2505) to gauge trends in demand resource load versus system capacity to predict capacity exhaustion and required new capacity placement. Note that the trend analysis may be performed at various levels (i.e., at a resource level, site level, regional level, etc.). If the predicted demand resource load at some future point outstrips the predicted system capacity, then more resources can be added to the system to handle the increase. In this way, the edge network system can stay ahead of network performance degradation and maintain SLOs.

One skilled in the art shall recognize that embodiments herein can provide several benefits for analysis and prediction of trends within the edge network system and can do so at varying levels of the network system. Aspects of the current disclosure may also be applied beyond edge system capacity management. For example, in one or more embodiments, aspects of the current disclosure may operate across each edge platform resource vector—allowing identification of resource exhaustion of any of the resource vectors (e.g., CPU, memory, storage, network, DSA, etc.) and targeted capacity relief. By way of further example, aspects may also be applied to other areas of the edge platform, including storage performance and other non-capacity-related systems (e.g., ML accelerator performance).

Furthermore, by building embodiments into on-platform architectural constructs, the trend analysis may be automatically and regularly performed, which results in analyses being automatically adjusted based on updates to individual resources (e.g., updates), to sites, to domains, and to the overall topology or system.

H. Embodiments for Edge System Level Resource Capacity Performance Prediction

1. General Overview

Presented above were embodiments for estimating tasks resource demand load given limited high dimensional data. These embodiments represent major breakthroughs in the ability to provide schedulers with predictive insights for system assignment and management. However, a challenging issue with edge systems is the constrained resource environment dictates an elastic execution model into shared space. Even with software-defined runtimes and execution environments, applications may interact through resource execution profiles in uncertain and difficult to predict patterns. While the same innovative approach may be applied in the same technical manner, it may be difficult to implement given technical hurdles such as dimensionality. Each task may be represented by, for example, seven to eleven dimensions of data (e.g., five resources, an input characteristic, and an output performance characteristic). However, edge endpoint systems may have physical systems and virtual systems (virtualization or containers); thus, it is possible to have over 100+ dimensional data. In addition, the input and performance characteristics are typically not tractable at a system level. This presents a major challenge for short-term system behavior.

Embodiments herein utilize long-range planning techniques (discussed in the prior section) in conjunction with resource uncertainty estimation (discussed above in several sections) to determine a predictive model for gauging the system in the short-term—particularly looking for coordinated behavior resource demand spikes that may be avoided with dynamic controls. For example, embodiments may leverage models constructed from use of queuing system based on updates to site/topology and resource uncertainty estimation (e.g., M-PCM-OFFD). Predicting system resource demand load with respect to available system resource capacity on a short-time cycle allows for proactive application management to avoid aperiodic system resource exhaustion and potential Service Level Objective (SLO) violations.

In the short-term (e.g., 24 hours, although different time periods may be considered) workloads can generally be assumed to have stationary behavior and can be characterized by MPCM/OFFD for high dimensional resource spaces or regression techniques for low dimensional spaces. However, short-term system characterization cannot be assumed to be completely stationary for systems as the resource profiling may be based on the aggregate behavior of the sum of the workloads operating in the physical and virtual machines. In addition, edge workloads are considered to have self-similar, long-range dependence based on an Alpha-Stable or other distribution family and may require fractal dimensional open-form analyses. Accordingly, embodiments may employ a recursive detrended fluctuation analysis to solve and create a predictive framework. However, this type of analysis may be computationally intensive and may not be well suited for near real-time analysis, especially when the underlying data is highly dimensional (i.e., a system-level analysis is likely to be heavily dimensionalized due to system virtualization (100+ dimensions)).

Most existing techniques do not try to act in real time or near real time. Other techniques act after a resource deficiency has occurred. The use of these techniques is problematic for edge for multiple reasons. First, an edge state is not directly accessible in near real-time due to its distributed nature. Secondly, the opportunities for application re-balancing are much more limited due to the number of serving systems at an edge site and operating restrictions in terms of latency in comparison to Cloud platforms. Accordingly, what is needed are systems and methods that address the issues of resource capacity management, especially in the short term.

2. Embodiments for Edge System Level Resource Capacity Performance Prediction

Embodiments herein make use of the resource uncertainty analysis combined with a long-term (e.g., 1 week, although other time periods may be used) predictions to allow for a short-term (e.g., 24 hours, although other time periods may be used) analysis to anticipate dynamic resource events and take proactive action(s) to limit the impact and maximize ability to meet Service Level Objectives (SLOs).

Systems at edge sites and edge domains may be characterized for long-term planning. Each new system on-boarded in a site (and by definition, a domain) may be configured to contribute data to a Detrended Fluctuation Analysis/wavelet transform in determining the Hurst exponents for long-range dependence. In one or more embodiments, once this is completed, a resource characteristic of demand resource load to system resource capacity may be derived for any blocking probability using a queuing-type model (e.g., a modified Erlang-B or Erlang-C model) but substituting the self-similar Alpha stable distribution. An Erlang model can determine the amount of resources (e.g., system resource or normalized system resources) needed given a resource demand load and the service level (e.g., blocking probability) desired to be achieved.

Figure 26:
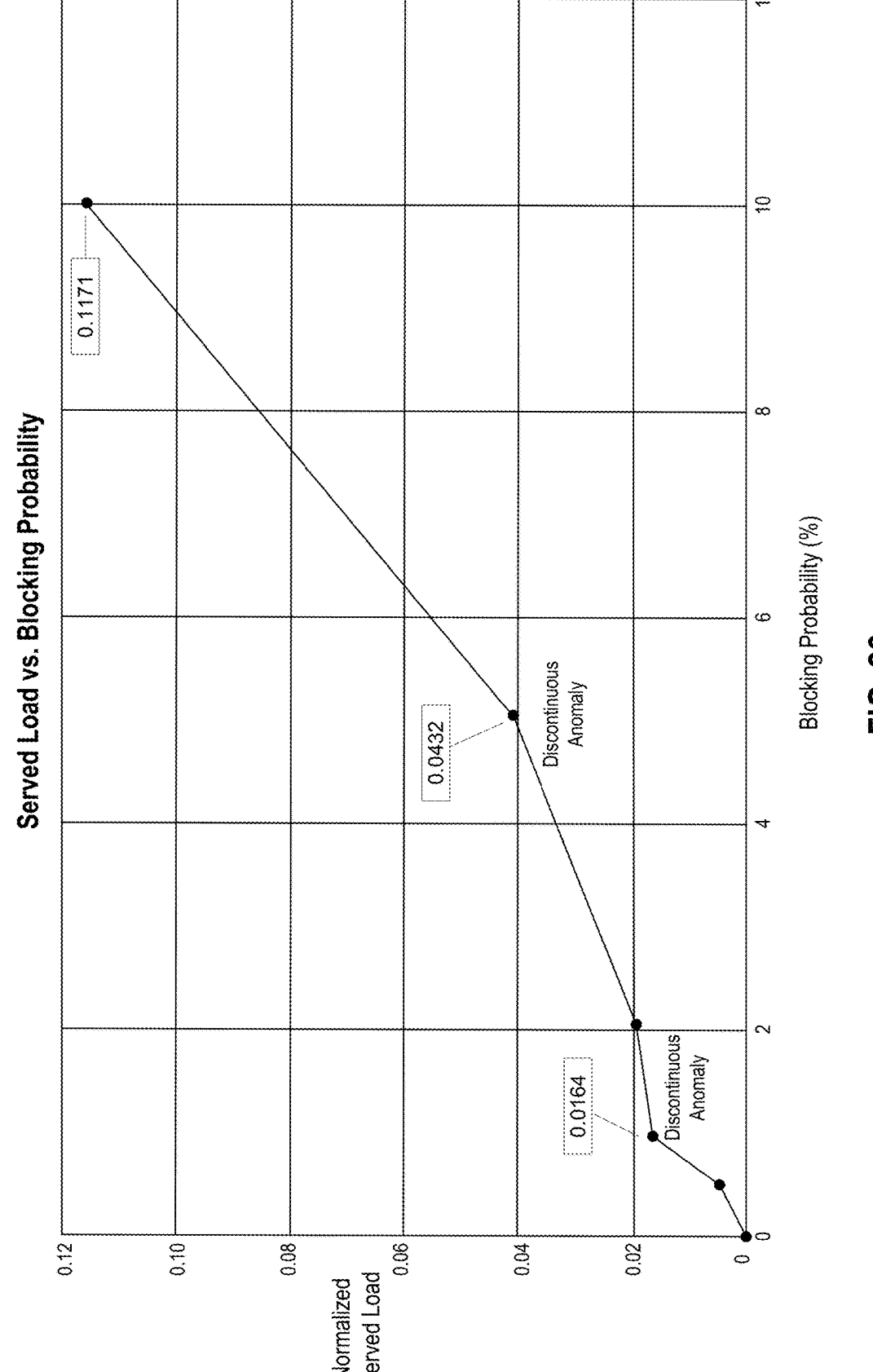
FIG. 26 depicts an example generated graph of served load versus various blocking probabilities, according to embodiments of the present disclosure.

In one or more embodiments, the nominal blocking probability may be determined by edge platform policy as defined by a platform administrator. The blocking probability may be recalculated at different levels (which is computationally efficient), and a predictive curve for system performance in the presence of large demand load may be derived. This can provide an asymptotic approach to instability as the levels of demand load may vary non-linearly with the linear variation in traffic load. FIG. 26 depicts an example generated graph of served load versus various blocking probabilities, according to embodiments of the present disclosure. In one or more embodiments, where there is discontinuity in the graph (i.e., changes in slope of characteristic), there is a change in served demand load at a discontinuous rate, which may indicate instability to demand load. Note that such an analysis may be performed at different levels and for different metrics. For example, each resource vector may be examined for discontinuities/disparities.

The potential for unstable blocking behavior does not dictate that the system will behave. A finer estimate may be beneficial. Accordingly, in one or more embodiments, a RUE process or processes may be applied across a set of dimensions to select data to characterize statistical moments of the overall system. This may be completed on the resource outputs with an aggregate demand collected historically. Based on the characteristics derived from the analysis of the long-term system capacity resource, a RUE process or processes may be run at the levels of aggregate system capacity resource load to derive the statistical moments. This gives a system-level statistically quantified view of the overall capacity demand curve and ability. This approach provides a "memory" and where a RUE process or processes should characterize. The RUE-calculated variance will increase widely at the areas of aggregate demand indicating potential coordinated resource demand load usage spikes.

In one or more embodiments, an edge system (or an edge orchestrator of an edge system, such as a global edge orchestrator) may then monitor incoming overall system telemetry for the resource-level autoregressive moving average for system demand load approaching a region of instability that could indicate coordinated demand moments and/or other predictors that the system may experience overload. If it detects this state, it sets a condition for a Lifecycle Management (LCM) orchestration system of potential system overload, and the LCM may increase thresholds for replication (e.g., replication of tasks), more aggressively evict low priority tasks, and/or where latency SLO permits, initiate the move of tasks to another edge site. These indicators may be used as "hints" for LCM control strategies for an edge system to allow it to provide near real-time control.

FIG. 27 depicts a methodology for predicting edge resource capacity performance, according to embodiments of the present disclosure. In one or more embodiments, on a set basis (e.g., on a weekly basis), the long-term system resource capacity of an edge system may be characterized (2705) utilizing the self-similar/fractal dimensional process, such as that depicted in the prior section. For example, an embodiment of the methodology described in FIG. 22 may be used to determine resource capacity. Note that this may be performed for each resource vector, for a subset of the resource vectors, or may be performed as a generalized total resource measure. Note also that this may be performed at various levels of an edge system (e.g., for an edge site, an edge domain, . . . , for the entire edge system).

Given the determined resource capacity from the prior step, for each of one or more different blocking percentages, a queuing-type model may be used to determine (2710) a forecasted resource demand load that can be served for that blocking percentage. In one or more embodiments, the forecasted resource demand load may represent a forecast of the number of tasks times the average resource demand/task across an edge area of interest (e.g., an Edge domain). Forecasted/expected resource demand loads may be determined for 1%, 2%, 5%, and 10% blocking percentages—although different percentages and different numbers of blocking percentages may be used.

In one or more embodiments, the queuing-type model may be a modified Erlang distribution model (e.g., a multivariate Erlang mixture, in which the k parameter is selected based on Fractional Order Derivate obtained using a methodology from Section G, above).

In one or more embodiments, a resource uncertainty estimation (RUE) process or processes may be used to obtain (2715) short-term resource demand load. For example, using one or more of the methodologies described in Section B (above), short-term resource demand load estimates may be obtained. The short-term resource demand load may be compared (2720) to the various forecasted resource demand loads. To the extent that the short-term resource demand load diverges from the forecasted resource demand loads, one or more actions may be taken (2725) to avoid/eliminate or mitigate the disparity or disparities.

For example, in one or more embodiments, an LCM module may monitor for such disparities or detect trending of demand load that meets resource vector control strategies to minimize probability of system resource exhaustion. Upon detecting such a condition, the LCM may limit replication of additional tasks to the system, may evict low priority batch tasks to other systems, may send task to other systems if SLO latency permits, may increase the blocking percentage, or may take other actions.

One skilled in the art shall recognize that embodiments help proactively characterize and detect conditions that may affect overall performance, result in SLO violation, or result in unstable system behavior. By using predefined system characterization of demand load to system resource capacity and RUE processing to predict potential conditions that could result in system resource overload, the edge system gains short-term system control. Embodiments provide indicator(s) that the system may be approaching a coordinated behavior that may impact system performance. One skilled in the art shall recognize that embodiments may be implemented at different levels and may invoke a wide variety of system controls that can avoid congestion and other overload conditions.

I. Information Handling System/Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 28:
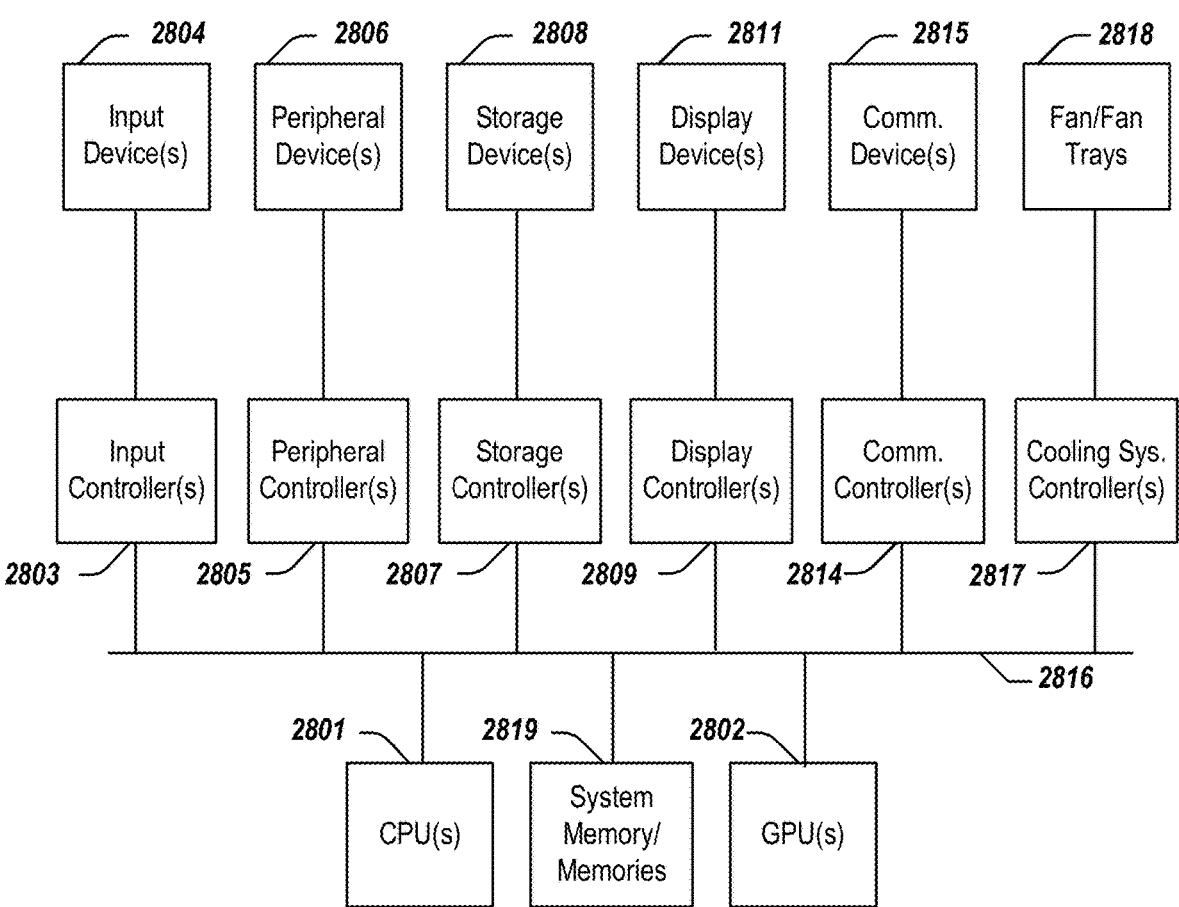
FIG. 28 depicts a simplified block diagram of an information handling system, according to embodiments of the present disclosure.

FIG. 28 depicts a simplified block diagram of an information handling system (or computing system), according to embodiments of the present disclosure. It will be understood that the functionalities shown for system 2800 may operate to support various embodiments of a computing system— although it shall be understood that a computing system may be differently configured and include different components, including having fewer or more components as depicted in FIG. 28.

As illustrated in FIG. 28, the computing system 2800 includes one or more CPUs 2801 that provides computing resources and controls the computer. CPU 2801 may be implemented with a microprocessor or the like and may also include one or more graphics processing units (GPU) 2802 and/or a floating-point coprocessor for mathematical computations. In one or more embodiments, one or more GPUs 2802 may be incorporated within the display controller 2809, such as part of a graphics card or cards. The system 2800 may also include a system memory 2819, which may comprise RAM, ROM, or both.

A number of controllers and peripheral devices may also be provided, as shown in FIG. 28. An input controller 2803 represents an interface to various input device(s) 2804, such as a keyboard, mouse, touchscreen, stylus, microphone, camera, trackpad, display, etc. The computing system 2800 may also include a storage controller 2807 for interfacing with one or more storage devices 2808 each of which includes a storage medium such as magnetic tape or disk, or an optical medium that might be used to record programs of instructions for operating systems, utilities, and applications, which may include embodiments of programs that implement various aspects of the present disclosure. Storage device(s) 2808 may also be used to store processed data or data to be processed in accordance with the disclosure. The system 2800 may also include a display controller 2809 for providing an interface to a display device 2811, which may be a cathode ray tube (CRT) display, a thin film transistor (TFT) display, organic light-emitting diode, electroluminescent panel, plasma panel, or any other type of display. The computing system 2800 may also include one or more peripheral controllers or interfaces 2805 for one or more peripherals 2806. Examples of peripherals may include one or more printers, scanners, input devices, output devices, sensors, and the like. A communications controller 2814 may interface with one or more communication devices 2815, which enables the system 2800 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2800 comprises one or more fans or fan trays 2818 and a cooling subsystem controller or controllers 2817 that monitors thermal temperature(s) of the system 2800 (or components thereof) and operates the fans/fan trays 2818 to help regulate the temperature.

In the illustrated system, all major system components may connect to a bus 2816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 29:
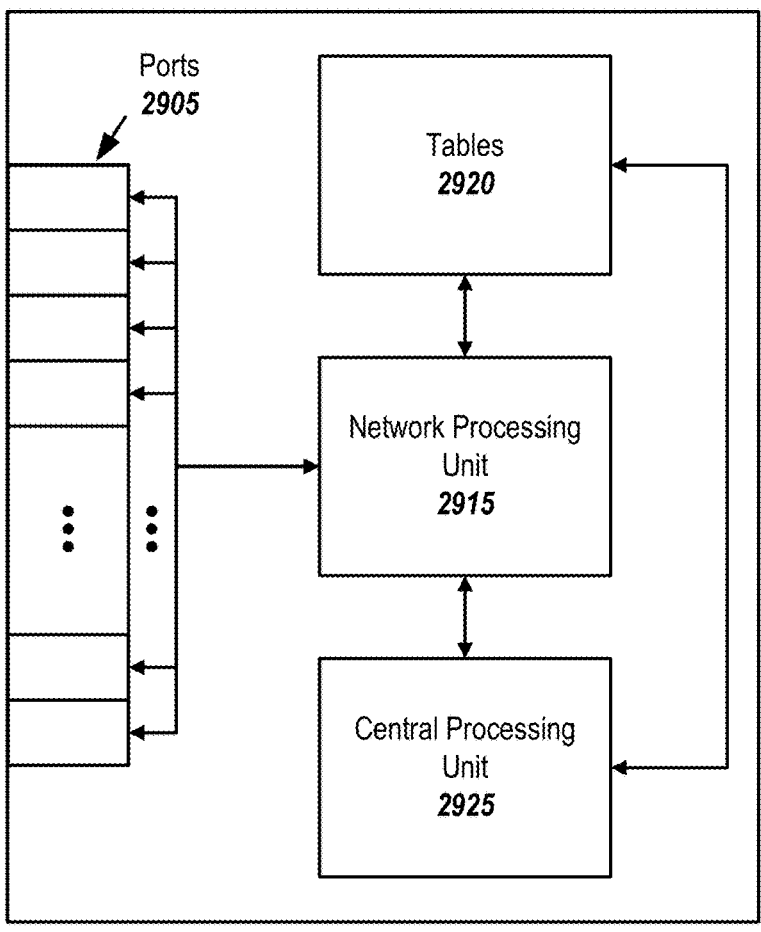
FIG. 29 depicts an alternative block diagram of an information handling system, according to embodiments of the present disclosure.

FIG. 29 depicts an alternative block diagram of an information handling system, according to embodiments of the present disclosure. It will be understood that the functionalities shown for system 2900 may operate to support various embodiments of the present disclosure although it shall be understood that such system may be differently configured and include different components, additional components, or fewer components.

The information handling system 2900 may include a plurality of I/O ports 2905, a network processing unit (NPU) 2915, one or more tables 2920, and a CPU 2925. The system includes a power supply (not shown) and may also include other components, which are not shown for sake of simplicity.

In one or more embodiments, the I/O ports 2905 may be connected via one or more cables to one or more other network devices or clients. The network processing unit 2915 may use information included in the network data received at the node 2900, as well as information stored in the tables 2920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various processor-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A processor-implemented method for orchestrating edge resource demand load scheduling, the method comprising:

given a set of application job requests comprising one or more application job requests, in which each application job comprises a respective set of tasks:

for each application job of the set of application job requests, generating a respective ordered list of tasks by sorting the respective set of tasks based on total resource demand load size for each task of the respective set of tasks; and for each particular task of each respective ordered list of tasks for each application job of the set of application job requests:

identifying a respective critical resource demand load size for the particular task;

generating a respective ordered list of candidate systems by sorting a respective set of candidate systems associated with the particular task based on total assignable resource capacity for each candidate system of the respective set of candidate systems;

attempting to identify a target candidate system from the respective ordered list of candidate systems that comprises assignable critical resource capacity that satisfies the critical resource demand load size for the particular task;

if the target candidate system is identified, determining whether the target candidate system comprises assignable non-critical resource capacity that satisfies non-critical resource demand load size for the particular task; and if the target candidate system comprises assignable non-critical resource capacity that satisfies the non-critical resource demand load size for the particular task, assigning the particular task to the target candidate system.

2. The processor-implemented method of claim 1, wherein the total resource demand load size, the respective critical resource demand load size, the non-critical resource demand load size, the total assignable resource capacity, the assignable critical resource capacity, and the assignable non-critical resource capacity are represented in a normalized resource vector framework in which resource demand load and assignable resource capacity are normalized based on reference values for different resource types.

3. The processor-implemented method of claim 1, wherein the respective set of candidate systems is determined by:

defining an initial set of candidate systems using a set of constraints associated with the particular task; and defining the respective set of candidate systems based on an assessment of resource utilization trajectory for one or more candidate systems of the initial set of candidate systems.

4. The processor-implemented method of claim 1, wherein the total assignable resource capacity for each candidate system of the respective set of candidate systems is based at least in part on a selectively modifiable slack parameter.

5. The processor-implemented method of claim 1, wherein the respective ordered list of tasks is sorted in descending order based on the total resource demand load size for each task of the respective set of tasks, and wherein the respective ordered list of candidate systems is sorted in ascending order based on the total assignable resource capacity for each candidate system of the respective set of candidate systems.

6. The processor-implemented method of claim 1, further comprising:

if the target candidate system is not identified, assigning the particular task to a next backlog for processing in a next iteration; or if the target candidate system fails to comprise assignable non-critical resource capacity that satisfies the non-critical resource demand load size for the particular task, determining whether any subsequent candidate system in the respective ordered list of candidate systems comprises assignable non-critical resource capacity that satisfies the non-critical resource demand load size for the particular task, and (i) in response to determining that a subsequent candidate system comprises assignable non-critical resource capacity that satisfies the non-critical resource demand load size for the particular task, assigning the particular task to the subsequent candidate system, or (ii) in response to determining that no subsequent candidate system comprises assignable non-critical resource capacity that satisfies the non-critical resource demand load size for the particular task, assigning the particular task to a next backlog for processing in a next iteration.

7. The processor-implemented method of claim 6, further comprising:

in response to assigning the particular task to the target candidate system or the subsequent candidate system, updating the total assignable resource capacity for the target candidate system or the subsequent candidate system.

8. The processor-implemented method of claim 1, further comprising:

given a set of additional tasks comprising one or more individual tasks or one or more backlog tasks associated with a previous iteration:

generating an ordered list of additional tasks by sorting the set of additional tasks based on critical resource demand load size for each additional task of the set of additional tasks; and for each particular additional task of the ordered list of additional tasks:

generating a respective ordered list of additional candidate systems by sorting a respective set of additional candidate systems associated with the particular additional task based on total assignable resource capacity for each additional candidate system of the respective set of additional candidate systems;

attempting to identify an additional target candidate system from the respective ordered list of additional candidate systems that comprises assignable critical resource capacity that satisfies the critical resource demand load size for the particular additional task;

if the additional target candidate system is identified, determining whether the additional target candidate system comprises assignable non-critical resource capacity that satisfies non-critical resource demand load size for the particular additional task;

if the additional target candidate system comprises assignable non-critical resource capacity that satisfies the non-critical resource demand load size for the particular additional task, assigning the particular additional task to the additional target candidate system;

if the additional target candidate system is not identified, assigning the particular additional task to a next backlog for processing in a next iteration; and if the additional target candidate system fails to comprise assignable non-critical resource capacity that satisfies the non-critical resource demand load size for the particular additional task, determining whether any additional subsequent candidate system in the respective ordered list of additional candidate systems comprises assignable non-critical resource capacity that satisfies the non-critical resource demand load size for the particular additional task, and (i) in response to determining that an additional subsequent candidate system comprises assignable non-critical resource capacity that satisfies the non-critical resource demand load size for the particular additional task, assigning the particular additional task to the additional subsequent candidate system, or (ii) in response to determining that no additional subsequent candidate system comprises assignable non-critical resource capacity that satisfies the non-critical resource demand load size for the particular additional task, assigning the particular additional task to a next backlog for processing in a next iteration.

9. The processor-implemented method of claim 1, wherein the respective ordered list of tasks omits one or more low-priority tasks associated with the application job, and wherein the processor-implemented method further comprises:

for each particular low-priority task of the one or more low-priority tasks:

selecting a subset of candidate systems from a respective set of candidate systems associated with the particular low-priority task, wherein each candidate system of the subset of candidate systems comprises assignable resource capacity;

if a particular candidate system of the subset of candidate systems comprises assignable resource capacity that satisfies a resource demand load associated with the particular low-priority task, assigning the particular low-priority task to the particular candidate system;

if no particular candidate system of the subset of candidate systems comprises assignable resource capacity that satisfies the resource demand load associated with the particular low-priority task, selecting a new subset of candidate systems from the respective set of candidate systems to obtain a particular candidate system that comprises assignable resource capacity that satisfies the resource demand load associated with the particular low-priority task; and if no particular candidate system of the new subset of candidate systems comprises assignable resource capacity that satisfies the resource demand load associated with the particular low-priority task, assigning the particular low-priority task to a next backlog for processing in a next iteration.

10. One or more information handling systems collectively comprising:

one or more processors; and one or more non-transitory computer-readable medium or media comprising one or more sets of instructions which, when executed by at least one of the one or more processors, cause steps to be performed comprising:

given a set of application job requests comprising one or more application job requests, in which each application job comprises a respective set of tasks:

for each application job of the set of application job requests, generating a respective ordered list of tasks by sorting the respective set of tasks based on total resource demand load size for each task of the respective set of tasks; and for each particular task of each respective ordered list of tasks for each application job of the set of application job requests:

identifying a respective critical resource demand load size for the particular task;

generating a respective ordered list of candidate systems by sorting a respective set of candidate systems associated with the particular task based on total assignable resource capacity for each candidate system of the respective set of candidate systems;

attempting to identify a target candidate system from the respective ordered list of candidate systems that comprises assignable critical resource capacity that satisfies the critical resource demand load size for the particular task;

if the target candidate system is identified, determining whether the target candidate system comprises assignable non-critical resource capacity that satisfies non-critical resource demand load size for the particular task; and if the target candidate system comprises assignable non-critical resource capacity that satisfies the non-critical resource demand load size for the particular task, assigning the particular task to the target candidate system.

11. The one or more information handling systems of claim 10, wherein the total resource demand load size, the respective critical resource demand load size, the non-critical resource demand load size, the total assignable resource capacity, the assignable critical resource capacity, and the assignable non-critical resource capacity are represented in a normalized resource vector framework in which resource demand load and assignable resource capacity are normalized based on reference values for different resource types.

12. The one or more information handling systems of claim 10, wherein the respective set of candidate systems is determined by:

defining an initial set of candidate systems using a set of constraints associated with the particular task; and defining the respective set of candidate systems based on an assessment of resource utilization trajectory for one or more candidate systems of the initial set of candidate systems.

13. The one or more information handling systems of claim 10, wherein the respective ordered list of tasks is sorted in descending order based on the total resource demand load size for each task of the respective set of tasks, and wherein the respective ordered list of candidate systems is sorted in ascending order based on the total assignable resource capacity for each candidate system of the respective set of candidate systems.

14. The one or more information handling systems of claim 10, wherein the steps to be performed further comprise:

if the target candidate system is not identified, assigning the particular task to a next backlog for processing in a next iteration; or if the target candidate system fails to comprise assignable non-critical resource capacity that satisfies the non-critical resource demand load size for the particular task, determining whether any subsequent candidate system in the respective ordered list of candidate systems comprises assignable non-critical resource capacity that satisfies the non-critical resource demand load size for the particular task, and (i) in response to determining that a subsequent candidate system comprises assignable non-critical resource capacity that satisfies the non-critical resource demand load size for the particular task, assigning the particular task to the subsequent candidate system, or (ii) in response to determining that no subsequent candidate system comprises assignable non-critical resource capacity that satisfies the non-critical resource demand load size for the particular task, assigning the particular task to a next backlog for processing in a next iteration.

15. The one or more information handling systems of claim 10, wherein the steps to be performed further comprise:

given a set of additional tasks comprising one or more individual tasks or one or more backlog tasks associated with a previous iteration:

generating an ordered list of additional tasks by sorting the set of additional tasks based on critical resource demand load size for each additional task of the set of additional tasks; and for each particular additional task of the ordered list of additional tasks:

generating a respective ordered list of additional candidate systems by sorting a respective set of additional candidate systems associated with the particular additional task based on total assignable resource capacity for each additional candidate system of the respective set of additional candidate systems;

attempting to identify an additional target candidate system from the respective ordered list of additional candidate systems that comprises assignable critical resource capacity that satisfies the critical resource demand load size for the particular additional task;

if the additional target candidate system is identified, determining whether the additional target candidate system comprises assignable non-critical resource capacity that satisfies non-critical resource demand load size for the particular additional task;

if the additional target candidate system comprises assignable non-critical resource capacity that satisfies the non-critical resource demand load size for the particular additional task, assigning the particular additional task to the additional target candidate system;

if the additional target candidate system is not identified, assigning the particular additional task to a next backlog for processing in a next iteration; and if the additional target candidate system fails to comprise assignable non-critical resource capacity that satisfies the non-critical resource demand load size for the particular additional task, determining whether any additional subsequent candidate system in the respective ordered list of additional candidate systems comprises assignable non-critical resource capacity that satisfies the non-critical resource demand load size for the particular additional task, and (i) in response to determining that an additional subsequent candidate system comprises assignable non-critical resource capacity that satisfies the non-critical resource demand load size for the particular additional task, assigning the particular additional task to the additional subsequent candidate system, or (ii) in response to determining that no additional subsequent candidate system comprises assignable non-critical resource capacity that satisfies the non-critical resource demand load size for the particular additional task, assigning the particular additional task to a next backlog for processing in a next iteration.

16. The one or more information handling systems of claim 10, wherein the respective ordered list of tasks omits one or more low-priority tasks associated with the application job, and wherein the steps to be performed further comprise:

for each particular low-priority task of the one or more low-priority tasks:

selecting a subset of candidate systems from a respective set of candidate systems associated with the particular low-priority task, wherein each candidate system of the subset of candidate systems comprises assignable resource capacity;

if a particular candidate system of the subset of candidate systems comprises assignable resource capacity that satisfies a resource demand load associated with the particular low-priority task, assigning the particular low-priority task to the particular candidate system;

if no particular candidate system of the subset of candidate systems comprises assignable resource capacity that satisfies the resource demand load associated with the particular low-priority task, selecting a new subset of candidate systems from the respective set of candidate systems to obtain a particular candidate system that comprises assignable resource capacity that satisfies the resource demand load associated with the particular low-priority task; and if no particular candidate system of the new subset of candidate systems comprises assignable resource capacity that satisfies the resource demand load associated with the particular low-priority task, assigning the particular low-priority task to a next backlog for processing in a next iteration.

17. A non-transitory computer-readable medium or media comprising one or more sequences of instructions which, when executed by at least one processor, cause steps to be performed comprising:

given a set of application job requests comprising one or more application job requests, in which each application job comprises a respective set of tasks:

for each application job of the set of application job requests, generating a respective ordered list of tasks by sorting the respective set of tasks based on total resource demand load size for each task of the respective set of tasks;

for each particular task of each respective ordered list of tasks for each application job of the set of application job requests:

identifying a respective critical resource demand load size for the particular task;

generating a respective ordered list of candidate systems by sorting a respective set of candidate systems associated with the particular task based on total assignable resource capacity for each candidate system of the respective set of candidate systems;

attempting to identify a target candidate system from the respective ordered list of candidate systems that comprises assignable critical resource capacity that satisfies the critical resource demand load size for the particular task;

if the target candidate system is identified, determining whether the target candidate system comprises assignable non-critical resource capacity that satisfies non-critical resource demand load size for the particular task; and if the target candidate system comprises assignable non-critical resource capacity that satisfies the non-critical resource demand load size for the particular task, assigning the particular task to the target candidate system.

18. The non-transitory computer-readable medium or media of claim 17, wherein the total resource demand load size, the respective critical resource demand load size, the non-critical resource demand load size, the total assignable resource capacity, the assignable critical resource capacity, and the assignable non-critical resource capacity are represented in a normalized resource vector framework in which resource demand load and assignable resource capacity are normalized based on reference values for different resource types.

19. The non-transitory computer-readable medium or media of claim 17, wherein the respective set of candidate systems is determined by:

defining an initial set of candidate systems using a set of constraints associated with the particular task; and defining the respective set of candidate systems based on an assessment of resource utilization trajectory for one or more candidate systems of the initial set of candidate systems.

20. The non-transitory computer-readable medium or media of claim 17, wherein the respective ordered list of tasks is sorted in descending order based on the total resource demand load size for each task of the respective set of tasks, and wherein the respective ordered list of candidate systems is sorted in ascending order based on the total assignable resource capacity for each candidate system of the respective set of candidate systems.

* * * * *